US007447330B2

(12) United States Patent
Yamasaki

(10) Patent No.: US 7,447,330 B2
(45) Date of Patent: Nov. 4, 2008

(54) IMAGE CAPTURING APPARATUS

(75) Inventor: Masafumi Yamasaki, Hachioji (JP)

(73) Assignee: Olympus Corporation (JP)

( * ) Notice: Subject to any disclaimer, the term of this patent is extended or adjusted under 35 U.S.C. 154(b) by 564 days.

(21) Appl. No.: 11/103,247

(22) Filed: Apr. 11, 2005

(65) Prior Publication Data

US 2005/0231599 A1 Oct. 20, 2005

(30) Foreign Application Priority Data

Apr. 14, 2004 (JP) ............................. 2004-119483
Aug. 3, 2004 (JP) ............................. 2004-227211

(51) Int. Cl.
*G06K 9/00* (2006.01)
(52) U.S. Cl. .................. 382/100; 348/207.99
(58) Field of Classification Search ................. 382/100,
382/171, 173, 103, 106, 107; 348/14.15,
348/73, 74, 115, 135, 138, 807.99, 208.14
See application file for complete search history.

(56) References Cited

U.S. PATENT DOCUMENTS

| 3,679,823 | A | * | 7/1972 | Corrigan, Jr. ................ 386/52 |
| 5,933,125 | A | * | 8/1999 | Fernie et al. .................... 345/8 |
| 6,041,161 | A | * | 3/2000 | Okamoto et al. ............. 386/112 |
| 6,424,370 | B1 | * | 7/2002 | Courtney ..................... 348/143 |
| 6,600,870 | B1 | * | 7/2003 | Okamoto et al. ............... 386/65 |
| 7,030,909 | B2 | * | 4/2006 | Grosvenor et al. ..... 348/207.99 |
| 2004/0155968 | A1 | * | 8/2004 | Cheatle et al. ......... 348/207.99 |

FOREIGN PATENT DOCUMENTS

| JP | 07-240889 | 9/1995 |
| JP | 08-191411 | 7/1996 |
| JP | 11-164186 | 6/1999 |
| JP | 2003-116102 | 4/2003 |
| JP | 2003-178078 | 6/2003 |
| JP | 2004-056397 | 2/2004 |
| JP | 2006-050164 | 2/2006 |

OTHER PUBLICATIONS

Office Action issued by Japanese Patent Office on Aug. 19, 2008 in connection with corresponding Japanese application No. 2004-227211 with cited refrences translated.

* cited by examiner

*Primary Examiner*—Anand Bhatnagar
(74) *Attorney, Agent, or Firm*—Ostrolenk, Faber, Gerb & Soffen, LLP

(57) ABSTRACT

The present invention provides an image capturing apparatus which captures moving images using a head mounted camera, records the obtained moving image data in a disk drive unit by dividing the moving image data into multiple blocks, records program chain information indicating the playback sequence of this moving image data, elapsed time relative from the time when the moving image data of each block is shot, biological information such as line-of-sight direction information detected simultaneously with the moving image data, the angular velocity information of the head, and the like, and information for detecting elapsed time relative from the time when this biological information is detected, in the disk drive unit, and automatically subjects the moving image data to editing such as cutting, blurring correction, zooming, electronic zooming, or the like based on the recorded biological information.

8 Claims, 41 Drawing Sheets

FIG.47

| TIME | IMAGE | AUDIO | ANGULAR VELOCITY | IMAGE | AUDIO | ANGULAR VELOCITY | ----- | LINE OF SIGHT | TIME | ----- |

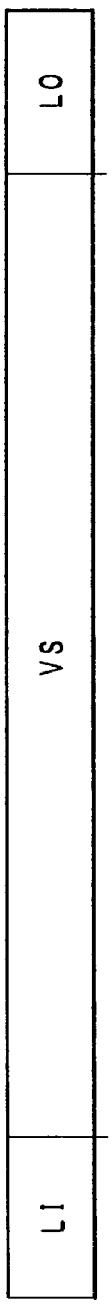

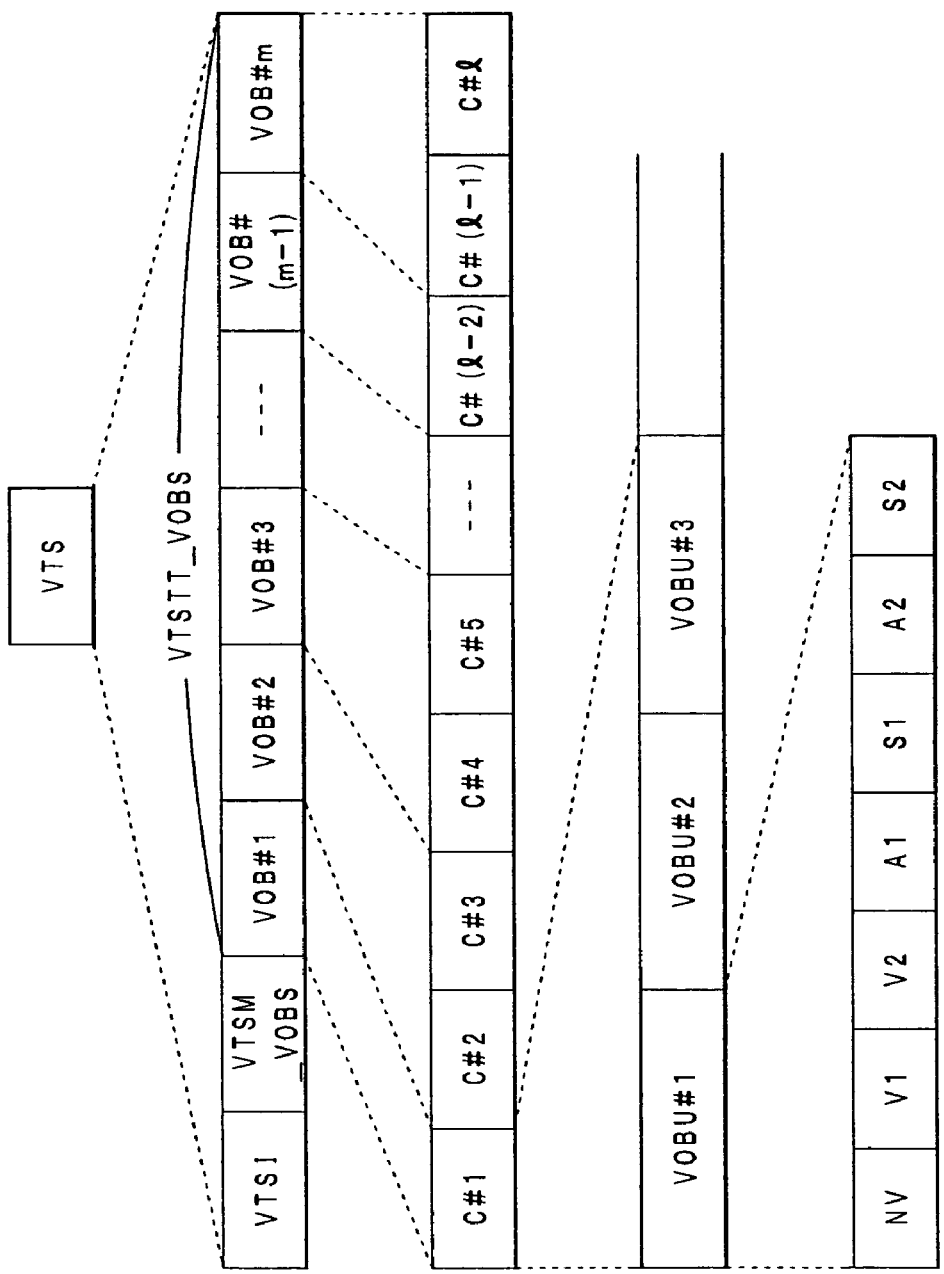

FIG. 55A

VTSI

FIG. 55B

| VTSI_MAT | --- | VTS_PGCIT |

FIG. 55C

| VTS_PGCI#1 | --- | VTS_PGCI#k |

FIG. 55D

| PGC_GI | C_PBI#1 | --- | C_PBI#m |

FIG. 55E

| CBM | CBT | SPF | IAF | STCDF | C_PBTM | SACF | C_FVOBUC_LVOBU_SA | C_FVOBU_SA |

| NO | EDT_STM | EDT_ETM | EDT_DAT |

IMAGE CAPTURING APPARATUS

This application claims benefit of Japanese Application No. 2004-119483 filed in Japan on Apr. 14, 2004 and Japanese Application No. 2004-227211 filed in Japan on Aug. 3, 2004, the contents of which are incorporated by this reference.

BACKGROUND OF THE INVENTION

1. Field of the Invention

The present invention relates to an image capturing apparatus, and more specifically, relates to an image capturing apparatus configured so as to record moving image data by dividing the moving image data into multiple blocks.

2. Description of the Related Art

Conventionally, a display device which is mounted on the head of a person for observing images, a photographing device which is mounted on the head of a person for photographing, and a device including both functions, have been known.

For example, the head mounted display device disclosed in Japanese Unexamined Patent Application Publication No. 7-240889 can perform photographing while displaying and observing an image being photographed by a television camera device on a display device mounted on the head, and also can perform selective intake of external light via the display device by operating a control switch provided on the television camera device as necessary.

Also, the image recording device disclosed in Japanese Unexamined Patent Application Publication No. 11-164186 of which a eyeglass frame includes an image capturing unit or the like can photograph a subject in the same direction as the line of sight of a photographer by directing the photographing lens of the image capturing unit in the same direction as the photographer. In addition, with this Japanese Unexamined Patent Application Publication No. 11-164186, a technique for superimposing and displaying an image photographed by the image capturing unit over the subject due to external light by providing a goggle-type personal liquid crystal projector including a casing portion having light transparency in the image capturing unit is disclosed.

However, with the head mounted display device disclosed in Japanese Unexamined Patent Application Publication No. 7-240889, a photographer needs to dedicate himself/herself to photographing operations while observing a photographing image on the display device at the time of photographing, so for example, in the event of photographing various types of an event such as a athletic meet, festival, or the like, the photographer himself/herself cannot enjoy the event as much as directly observing a real subject, and consequently, has a bigger burden due to this. Also, in the event of observing computerized images in closed space for a long time, tiredness unlike that of natural observation of directly looking at a subject is an empirical fact.

Also, with the image recording device disclosed in Japanese Unexamined Patent Application Publication No. 11-164186, simply providing the eyeglass-type frame with the image capturing unit cannot perform observing a subject and recognizing a photographing range simultaneously, so the photographer needs to look aside from the subject once to confirm the image display unit of the camera body side separately provided. On the other hand, with the configuration wherein the image capturing unit is provided in the personal liquid crystal projector, an image to be displayed and a subject to be transmitted may be brought into view simultaneously, but the photographer is forced to focus attention on the image to be displayed at the time of photographing, resulting in a hurdle for the photographer himself/herself to enjoy an event or the like.

Thus, with the aforementioned techniques, it is difficult for a photographer to behave naturally as persons other than the photographer at the time of photographing, resulting in placing the photographer under constraint due to photographing operation, and imposing a burden on the photographer.

In addition, with the conventional techniques, the device to be mounted on the head and the other device are connected with a cable, resulting in inconvenience such as the photographer getting into a hassle with the cable when carrying the device, the cable causing an obstacle to the photographer moving, and the like.

SUMMARY OF THE INVENTION

Accordingly, it is an object of the present invention to provide an image capturing apparatus with which a photographer can perform photographing easily without feeling burden, which is convenient for carrying and also excels in mobility.

Briefly, the present invention is an image capturing apparatus, comprising: a moving image data recorder to record (sometimes referred to interchangeably herein as "recording means") moving image data by dividing the moving image data into multiple blocks, and also recording moving image playback program chain information indicating the playback sequence of the moving image data and elapsed time relative from the time when the moving image data in each block is shot; and a biological information recorder to record biological information, which is information detected at the same time as the moving image data prior to editing, for editing the moving image data, and information for detecting elapsed time relative from the time when the biological information is detected.

The above and other objects, features and advantages of the present invention will become more clearly understood from the following description referring to the accompanying drawings.

BRIEF DESCRIPTION OF THE DRAWINGS

FIG. 47 is a diagram illustrating the configuration in time-series of the signal output from a communication control unit with the first embodiment;

FIGS. 53A through 53D are diagrams illustrating the logical configuration of a disk according to the first embodiment;

FIGS. 54A through 54E are diagrams illustrating the file configuration of a video title set VTS according to the first embodiment;

FIG. 55A through FIG. 55E are diagrams illustrating the configuration of video title set management information VTSI according to the first embodiment;

FIGS. 61A through 61C are diagrams illustrating the configuration of a navigation pack according to the first embodiment;

FIG. 63 is a diagram illustrating the recording format of editing data according to the first embodiment;

DETAILED DESCRIPTION OF THE PREFERRED EMBODIMENTS

Description will be made below regarding an embodiment of the present invention with reference to the drawings.

Figure 1:
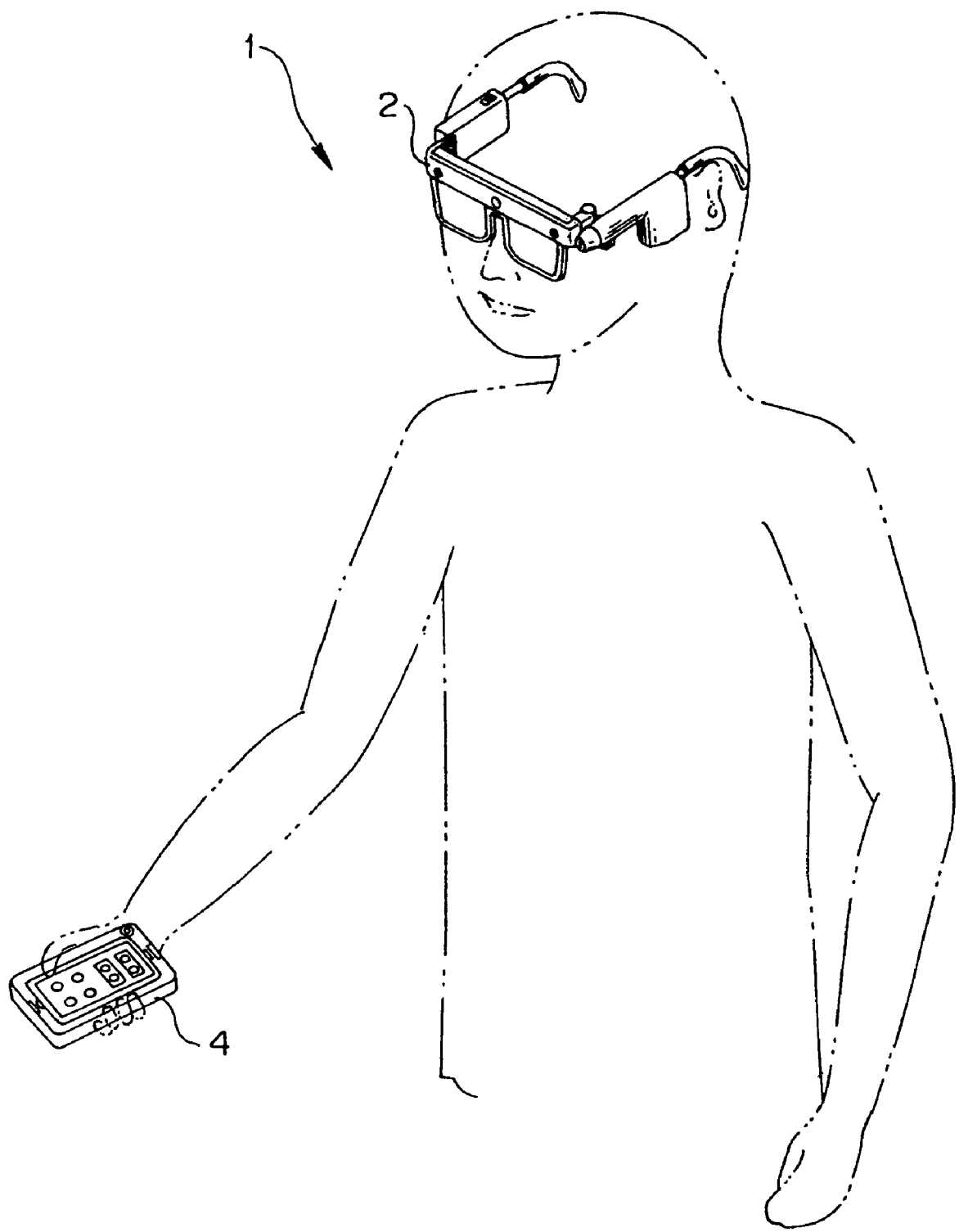
FIG. 1 is a perspective view illustrating a type of usage of an image system according to a first embodiment of the present invention.
Figure 72A:
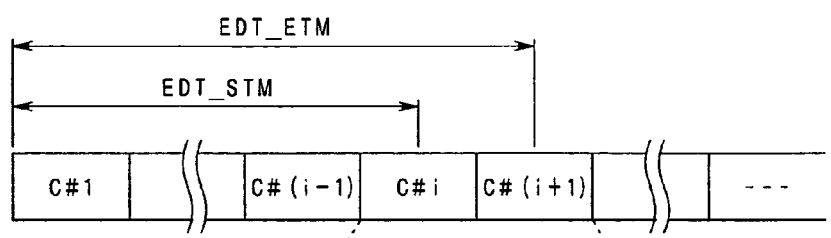
FIGS. 72A and 72B are diagrams illustrating an example when an editing start time and editing end time are straddled over two cells with the first embodiment.
Figure 72B:
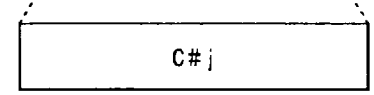

FIGS. 1 through 72B illustrate a first embodiment of the present invention, wherein FIG. 1 is a perspective view illustrating a type of usage of an image system 1.

As illustrated in FIG. 1, this image system 1 is classified broadly into a head mounted unit 2 in a general eyeglass shape including a function for photographing an image, and an image recording/editing device 4 including a function for remote-controlling the head mounted unit 2 by wireless-communicating with the head mounted unit 2 and also wireless-receiving image data photographed by the head mounted unit 2 to record and edit this data.

The image system 1 includes a function for capturing still images and moving images, so also serves as an image capturing apparatus.

The head mounted unit 2 is configured so as to be capable of practically directly observing a subject to be observed at the time of see-through display, and also so as to photograph the subject. As can be understood from the shape of general eyeglasses, this head mounted unit 2 is used by being mounted on the head generally as with general eyeglasses for eyesight-correcting, and downsizing and weight saving is also considered so as to approximate to general eyeglasses as much as possible.

The image recording/editing device 4 is configured so as to wireless-transmit various types of operating signals for image capturing to the head mounted unit 2, wireless-receive and record the image photographed by the head mounted unit 2, and edit the recorded image. This image recording/editing device 4 is provided with later-described second operating switches 171 (see FIGS. 11 and 5), and later-described second operating switches 171 are switches for a photographer remote-controlling relatively frequently performed operations such as control of see-through display and control of photographing actions and the like of the head mounted unit 2. Accordingly, with this image recording/editing device 4, downsizing and weight saving is considered within a permissible range so as to become a small enough size for the photographer to hold with a single hand. Also, this image recording/editing device 4 is configured so as to be used even in various types of a situation such as a situation in which this is attached to a belt or the like, a situation in which this is stored in an inside pocket of a jacket, or the like.

These head mounted unit 2 and image recording/editing device 4 are separately configured from each other with the present embodiment, and thus, improvement of mounted feeling due to downsizing and weight saving of the head mounted unit 2, improvement of operability due to employing the image recording/editing device 4, and the like are considered.

In addition, the head mounted unit 2 and the image recording/editing device 4 are wireless-communicated as described above, so the photographer is released from inconvenience of cable wiring and restricted feeling to be caused when connecting the both with cables, and can freely lightly perform operations without such restrictions. Since a device to be used by being mounted on the head is required for high-mobility and high-operability, employing such a configuration is particularly effective.

Figure 2:
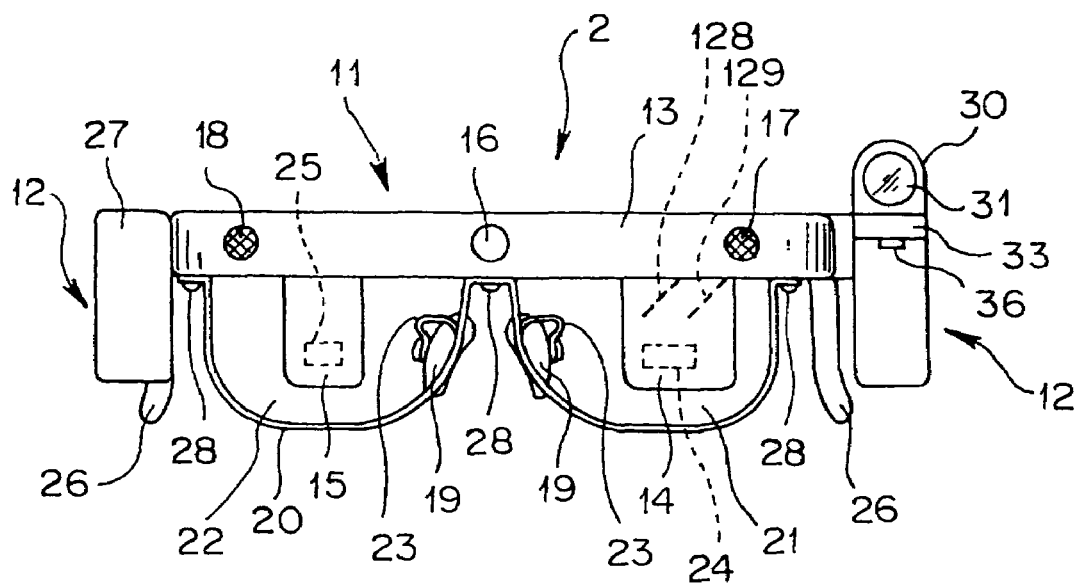
FIG. 2 is a front view illustrating a head mounted unit according to the first embodiment.
Figure 3:
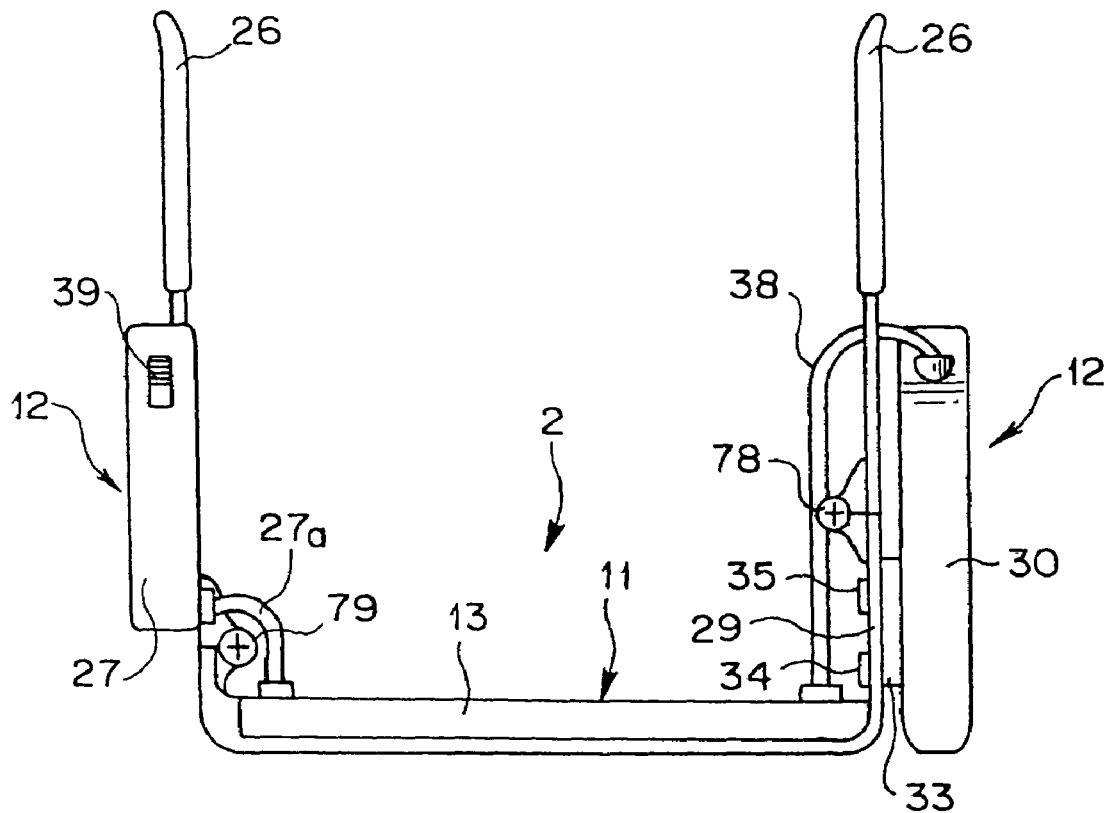
FIG. 3 is a top view illustrating the head mounted unit according to the first embodiment.
Figure 4:
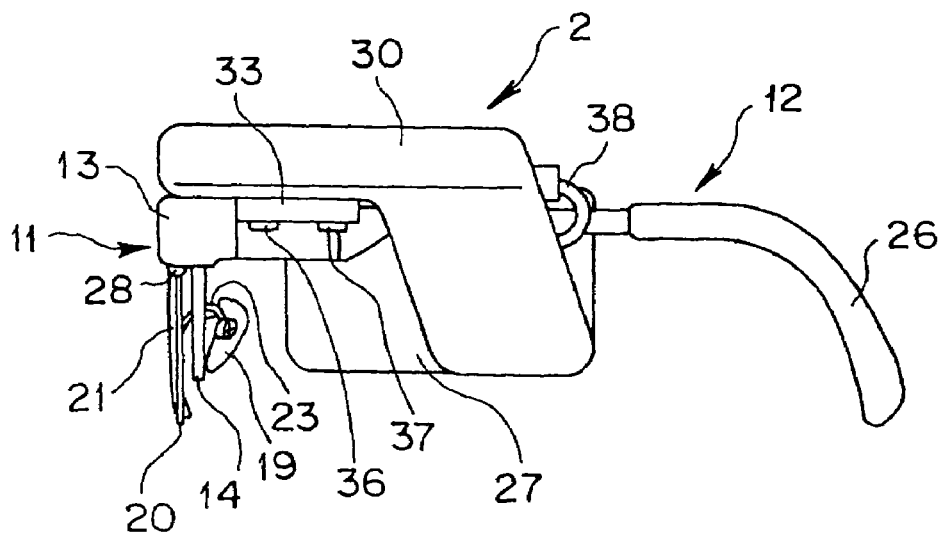
FIG. 4 is a right-side view illustrating the head mounted unit according to the first embodiment.

Next, description will be made regarding the external view and outline of the head mounted unit 2 with reference to FIG. 2 through FIG. 4. FIG. 2 is a front view illustrating the head mounted unit 2, FIG. 3 is a top view of the head mounted unit 2, and FIG. 4 is a right-side view of the head mounted unit 2.

This head mounted unit 2 comprises a front portion 11 equivalent to lenses, a rim, a bridge, endpieces, and the like in general eyeglasses, temple portions 12 which extend from both left and right sides of this front portion 11 to the rear thereof (opposite side as to a subject) and are capable of folding as to the front portion 11.

The front portion 11 comprises a frame portion 13 serving as holding means including part of the image display optical system, part of the line-of-sight-direction detection optical system, electrical circuits, and the like.

With this frame portion 13, a projecting-light emitting unit 16 serving as distance measurement means to be used for measuring a distance to a subject is provided in a generally center portion thereof, and a first microphone 17 and a second microphone 18 for recording audio from the subject side in a stereo manner are provided in both left and right sides thereof respectively.

In addition, transparent optical members 14 and 15 serving as light guiding members corresponding to both left and right eyes are attached to the frame portion 13. Of these transparent optical members 14 and 15, the transparent optical member 14 is used for detecting a known line-of-sight direction, and the transparent optical member 15 is used for displaying an image. These transparent optical members 14 and 15 are formed so as to become a required minimum size to fulfill each function.

An HOE (Holographic Optical Element) 24, half mirror 128, and HOE 129 are disposed in the transparent optical member 14 respectively, and on the other hand, an HOE 25 serving as a combiner is disposed in the transparent optical member 15.

In addition, lenses 21 and 22 for adjusting eyesight, which are disposed on the subject side of the transparent optical members 14 and 15, are detachably attached to the frame portion 13.

More specifically, a rim 20 serving as attachment means for attaching the lenses 21 and 22 can be attached to the frame portion 13 with screws 28 on the center side, the left side of the left eye, and the right side of the right eye, for example.

A pair of nose pads 19 for mounting this head mounted unit 2 on the bridge of the nose by supporting the bridge of the nose from the left and right sides are provided on the rim 20 via a pair of clings 23.

With such a configuration, removing the screws 28 allows the rim 20, lenses 21 and 22 to be removed, and also facilitates the lenses 21 and 22 to be replaced with another lenses having different eyesight.

At this time, in the event that the rim 20 is formed of a material having flexibility more than a predetermined level, simply removing or unfastening the one screw 28 allows only one of the left-eye lens 21 and right-eye lens 22 to be detached selectively (independently), thereby improving convenience.

Furthermore, an image capturing unit 30 serving as a camera doubling as image capturing means for capturing subject images and as distance measurement means is fixed to a joint 29 on the left-eye side of the frame portion 13 (i.e., the right side in FIGS. 2 and 3) via a seat 33 so as to adjust the photographing direction.

This seat 33 is configured so as to be attached to the joint 29 with screws 34 and 35, and so as to attach the image capturing unit 30 thereon via screws 36 and 37. As described later, the optical axis and visual axis of a photographing optical system 31 (see FIG. 10 and so forth too) included in the image capturing unit 30 can be adjusted by adjusting the relative angle thereof as to the front portion 11 of the image capturing unit 30 via the seat 33.

A cable 38 extends from the back side of the image capturing unit 30 once, and passes through the under side of the left-eye side temple portion 12, and then is connected to the frame portion 13. Thus, the electrical circuits within the frame portion 13 and the electrical circuits within the image capturing unit 30 are connected to each other.

The temple portion 12 is connected to the front portion 11 with hinges 78 and 79, and thus, is capable of folding as to the front portion 11. More specifically, the temple portion 12 can be folded toward the center portion of the front portion 11, and kept the folded position along the front portion 11, thereby reducing the head mounted unit 2 in size, and allowing the head mounted unit 2 to be stored and carried conveniently. Tip cells 26 for hanging onto the ears are provided on the tips of the left and right temples 12 respectively.

A storing unit 27 for storing a part of various types of electronic circuits according to the head mounted unit 2 such as later-described angular velocity sensors and the like, and a detachable battery serving as a component of a power source circuit for supplying power source to each circuit within the head mounted unit 2, is provided on the right-eye side temple portion 12. A switch 39 for turning on/off display by the head mounted unit 2 is provided on the top of this storing unit 27. A cable 27a is extended from the storing unit 27, connected to each circuit within the frame portion 13, and further connected to the circuit of the image recording/editing device 4 via a circuit within the image capturing unit 30.

Figure 5:
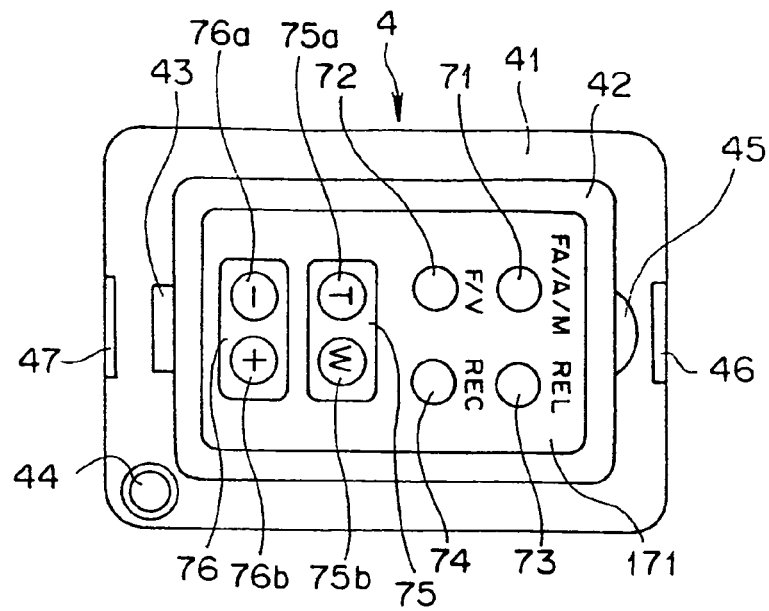
FIG. 5 is a top view illustrating an image recording/editing device of which an operating panel is closed according to the first embodiment.
Figure 6:
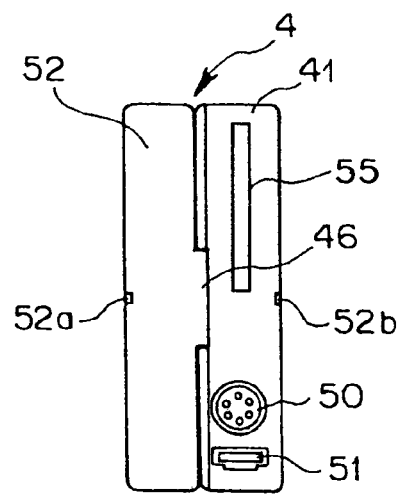
FIG. 6 is a right-side view illustrating the image recording/editing device of which the operating panel is closed according to the first embodiment.
Figure 7:
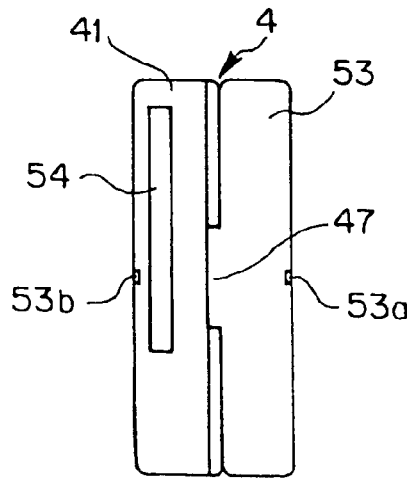
FIG. 7 is a left-side view illustrating the image recording/editing device of which the operating panel is closed according to the first embodiment.
Figure 8:
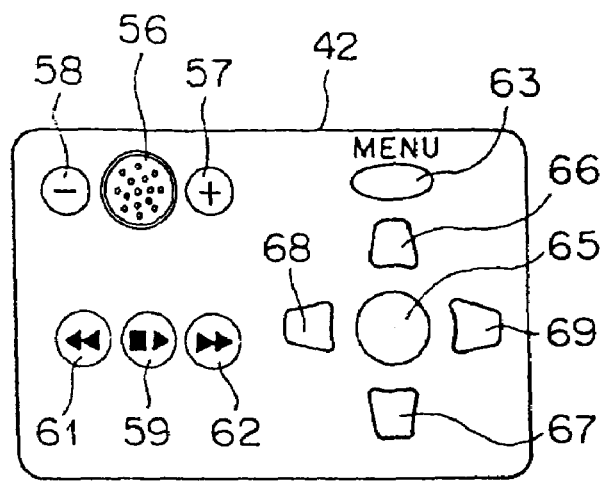
FIG. 8 is a top view illustrating operating switches and so forth disposed on the operating panel according to the first embodiment.
Figure 9:
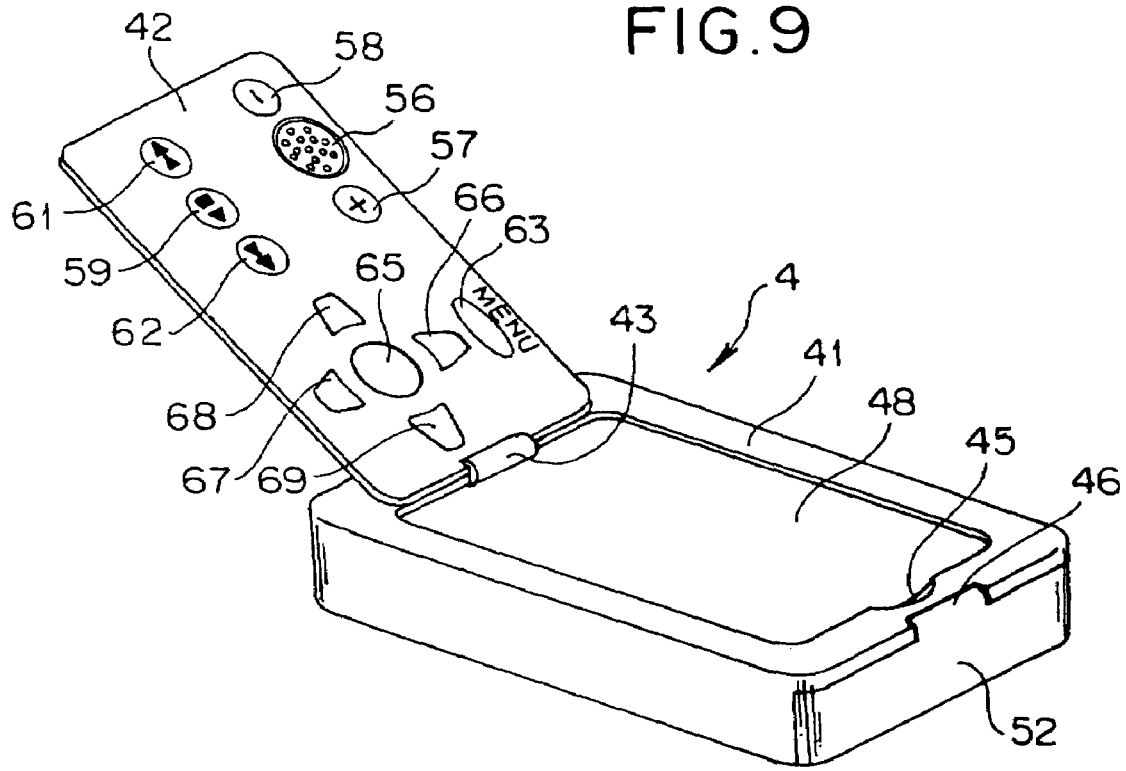
FIG. 9 is a perspective view illustrating the image recording/editing device of which the operating panel is opened according to the first embodiment.

Next, description will be made regarding the external view and general description of the image recording/editing device 4 with reference to FIGS. 5 through 9. FIG. 5 is a top view illustrating the image recording/editing device 4 of which an operating panel is closed, FIG. 6 is a right-side view illustrating the image recording/editing device 4 of which the operating panel is closed, FIG. 7 is a left-side view illustrating the image recording/editing device 4 of which the operating panel is closed, FIG. 8 is a top view illustrating operating switches and so forth disposed on the operating panel, and FIG. 9 is a perspective view illustrating the image recording/editing device 4 of which the operating panel is opened.

This image recording/editing device 4 comprises a main body unit 41, and an operating panel 42 provided on this main body unit 41 via a hinge 43 so as to be opened and closed.

The main body unit 41 includes later-described respective circuits, and also an LCD display element (hereinafter, referred to as LCD) 48 serving as display means configured as a liquid crystal monitor is disposed in the position observable when opening the operating panel 42. This LCD 48 is used for displaying images when playback, and also for displaying the menu screen for setting various types of mode, and the like.

As illustrated in FIG. 5, on the top side of the main body unit 41, a power switch 44 is disposed on the peripheral corner so as to be operable even in the closed state of the operating panel 42, and further, a concave portion 45 is formed so as to facilitate the finger or the like to be hooked at the time of opening/closing the operating panel 42.

As illustrated in FIG. 6, a cover 52 is disposed on the right-side face of the main body unit 41 so as to open/close as to the main body unit 41 by a hinge 46, and the closed state can be kept by latching a latching portion 52a of the cover 52 with a latched portion 52b of the main body unit 41 side. Upon this cover 52 being opened, as illustrated in FIG. 6, a battery insertion entrance 55 for detachably inserting a battery for supplying power source, an AV/S connection terminal 50 serving as a terminal for connecting to a television, and a PC connection terminal 51 serving as a terminal for connecting to a personal computer (PC) are exposed. As described above, codes are configured so as to be connected in bulk on the right-side face of the main body unit 41, and also there is no code extending from other faces, thereby reducing burden when code wiring.

On the other hand, as illustrated in FIG. 7, a cover 53 is disposed on the left-side face of the main body unit 41 so as to open/close as to the main body unit 41 by a hinge 47, and the closed state can be kept by latching a latching portion 53a of the cover 53 with a latched portion 53b of the main body unit 41 side. Upon this cover 53 being opened, as illustrated in FIG. 7, a disk insertion entrance 54 for inserting a disk 249 (see FIG. 11) serving as a detachable recording medium is exposed.

With the operating panel 42, relatively frequently operated switches are disposed on the outer face side exposed so as to be operable even in the closed state as illustrated in FIG. 5, and relatively less frequently operated switches are disposed on the inner face side exposed so as to be operable only in the opened state as illustrated in FIG. 8.

More specifically, the second operating switches 171 are disposed on the outer face side of the operating panel 42. As illustrated in FIG. 5, the second operating switches 171 comprise an FA/A/M switch 71, a F/V switch 72, a release switch (REL) 73, a recording switch (REC) 74, zoom switches 75, and exposure correction switches 76. These switches are switches for setting relatively frequently changed information at the time of photographing operation, as described above.

The FA/A/M switch 71 is switching means for switching whether see-through display behavior for enlarging and displaying a photographed image corresponding to a photographing image frame indicating a photographing range when telescopic photographing more than a certain focal distance as an electronic view is performed in a full auto mode (FA), auto mode (A), or manual mode (M). The full auto mode is a mode for recording angular velocity data and line-of-sight direction data serving as biological information as well as video data, and the data recorded in the full auto mode is to be a target of later-described image editing.

The F/V switch 72 is switching means for switching whether see-through display in the transparent optical member 15 is a photographing image frame (F) indicating a photographing range, or a photographed image (V) (electronic view) from the image capturing unit 30.

The release switch (REL) 73 is a switch for starting photographing of a still image having higher precision than a moving image.

The recording switch (REC) 74 is a switch for switching start of recording and stop of recording each time this switch is pressed.

The zoom switches 75 are photographing image frame setting means, and comprise a telescopic switch 75a for performing zoom (optical zoom and/or electronic zoom) of the image capturing unit 30 including the photographing optical system 31 on the telescopic (T) side, and a wide switch 75b for performing zoom on the wide (W) side.

The exposure correction switches 76 comprise a minus exposure correction switch 76a for performing exposure correction of an image to be photographed at the minus side, and a plus exposure correction switch 76b for performing the exposure correction at the plus side.

Note that the zoom operation of the photographing optical system 31 is configured so as to synchronized with change of the optic angle of an photographing image frame to be observed from the photographer also serving as an observer, so in other words, the zoom switches 75 comprise the telescopic switch 75a for reducing the optic angle of an photographing image frame to be observed from the photographer, and the wide switch 75b for enlarging the optic angle.

Also, the term "photographing image frame" means an index representing the range of a subject to be photographed by the image capturing unit 30.

On the other hand, on the inner face side of the operating panel 42, a speaker 56 for playing back audio, a switch 57 for increasing the volume of the audio generated by the speaker 56, a switch 58 for decreasing the volume, a playback/stop switch 59 for playing back or temporally stopping image information recorded in the disk 249 serving as a recording medium, a switch 61 for fast-forwarding images in the reverse direction for searching, a switch 62 for fast-forwarding images in the forward direction for searching, a menu button 63 for setting various types of function according to the image system 1 and date, and displaying the menu screen for setting various types of operating information for image editing on the LCD 48, menu selection switches 66, 67, 68, and 69 for moving an item of interest of items displayed on the menu screen in the upper/lower/left/right direction, or scrolling display information, and a determinant switch 65 for determining a displayed item of interest or the like, are disposed. These switches are switches for setting relatively less frequently changed information at the time of photographing operation, as described above.

Figure 10:
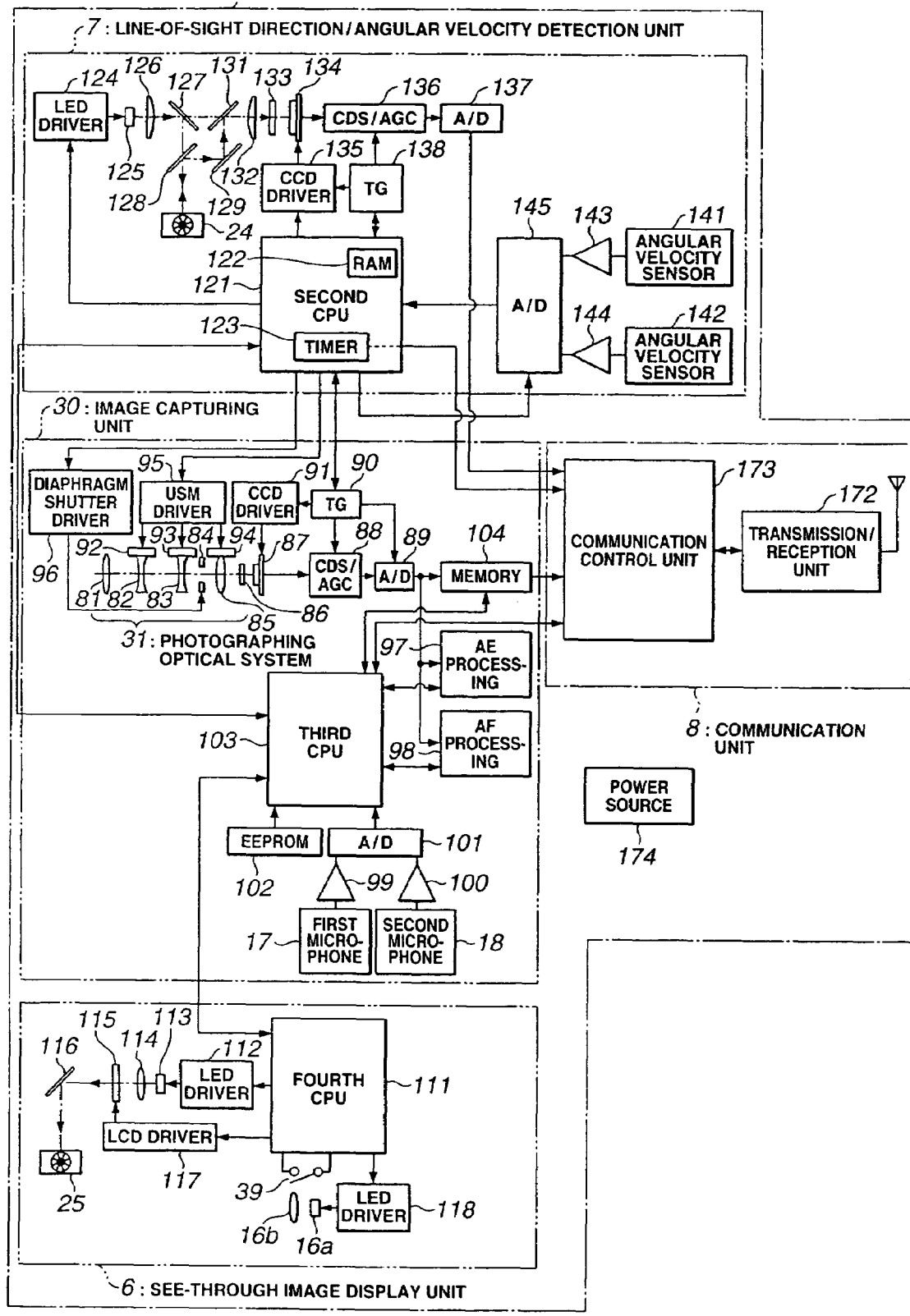
FIG. 10 is a block diagram primarily illustrating the configuration of electronic circuits of the head mounted unit according to the first embodiment.

FIG. 10 is a block diagram primarily illustrating the configuration of electronic circuits of the head mounted unit 2.

The configuration of this image system 1 is classified broadly into the head mounted unit 2 having an image capturing function, and the image recording/editing device 4 (FIG. 11) having an editing function for performing control by receiving various types of operating input according to the head mounted unit 2 and the image recording/editing device 4 itself, and also recording and editing an image photographed by the head mounted unit 2. Of these, the head mounted unit 2 is further classified into the image capturing unit 30, a see-through image display unit 6 serving as display means for primarily performing see-through display, a line-of-sight direction/angular velocity detection unit 7 for detecting the line-of-sight direction of the photographer and detecting the angular velocity accompanied with movement of the photographer's head, a communication unit 8 serving as reception means and transmission means for transmitting/receiving a signal with the image recording/editing device 4 by wireless communication, and a power source circuit 174 for supplying power source to each circuit within the head mounted unit 2. Any of these image capturing unit 30, see-through image display unit 6, and line-of-sight direction/angular velocity detection unit 7 communicates with the image recording/editing device 4 via the communication unit 8. Also, the power source circuit 174 comprises a battery, which is detachably attached to the storing unit 27 (see FIG. 2), as described above.

The see-through image display unit 6 comprises an LED driver 112, an LED 113, a condenser lens 114, an LCD 115, an LCD driver 117, a HOE 116, the HOE 25, a projecting-light LED 16a, an LED driver 118, a condenser lens 16b, the switch 39, and a fourth CPU 111. With the present embodiment, this see-through image display unit 6 is disposed only one eye (here, the right eye, for a specific example) side of the observer. Accordingly, the observer observes a see-through image with one eye side only.

The LED driver 112 emits the LED 113 under control of the fourth CPU 111.

The LED 113 is an emitting source, makes up projection means, and is driven to emit light by the LED driver 112. This LED 113 comprises diodes capable of emitting 3-color light of R (red), G (green), and B (blue), for example.

The condenser lens 114 makes up the projection means, and condenses light emitted by the LED 113.

The LCD 115, which makes up the projection means, for displaying the photographing image frame and photographed images, and the like, and serves as transparent-type liquid crystal display means which are irradiated from the back side by light of the LED 113 via the condenser lens 114.

The LCD driver 117 drives the LCD 115 to display the photographing image frame or the like under control of the fourth CPU 111, and also serves as correction means for correcting parallax as described later.

The HOE 116 is a catoptric member which reflects the light radiated via the LCD 115 vertically downwards (see FIGS. 13 and 14) while correcting aberration as described later.

The HOE 25 serves as a reflection-type combiner, and is configured so as to project the photographing image frame or the like displayed on the LCD 115 in a observable manner by reflecting and diffracting the light from the HOE 116 toward the photographer's eye, and also so as to transmit external light toward the photographer's eye. Note that the HOE 25 according to the first embodiment is configured so as to become the smallest size as with the transparent optical member 15 configured to become the smallest size.

The projecting-light LED 16a is included in the projecting-light emitting unit 16 for measuring a distance, and is an emitting source for emitting distance-measuring light.

The condenser lens 16b is for projecting the distance-measuring light emitted by the projecting-light LED 16a toward a subject.

The LED driver 118 is for driving the projecting-light LED 16a under control of the fourth CPU 111.

The fourth CPU 111 is connected to the switch 39, and when the fourth CPU 111 detects that the switch 39 is closed, the fourth CPU 111 prohibits display of the see-through image display unit 6. The image system 1 is configured so as to perform photographing while performing usual behavior without considering photographing operation, so is apt to be used even during walking or driving a car for example. However, in the event that see-through display is displayed when the photographer is in such a state, the photographer may be distracted by the display. Accordingly, the present embodiment provides the switch 39 to prevent this, thereby prohibiting see-through display. Note that at this time display is prohibited, but photographing itself can be continued.

The fourth CPU 111 is control means for controlling each circuit within the see-through image display unit 6, and is bi-directionally connected with a later-described third CPU 103 of the image capturing unit 30, and performs control operation in collaboration with a later-described third CPU 103.

Next, description will be made regarding actions of the see-through image display unit 6 thus configured.

The fourth CPU 111 emits the LED 113 via the LED driver 112.

The light emitted from the LED 113 is condensed by the condenser lens 114, and illuminates the LCD 115 from the back.

In the event of displaying the photographing image frame, of the diodes emitting 3-color light of R (red), G (green), and B (blue), the LED 113 emits the green diode alone for example.

When the fourth CPU 111 generates a signal corresponding to the photographing image frame indicating a photographing range to transfer this to the LCD driver 117, and also transfers a control signal for emitting light to the LED driver 112, the LCD driver 117 drives the LCD 115 to display the photographing image frame on the display surface based on the signal, and also the LED 113 emits light and illuminates the LCD 115 from the back side.

The image of the photographing image frame projected from the LCD 115 thus illuminated is reflected vertically downwards by the HOE 116 while aberration is being corrected, and projected on the HOE 25.

The HOE 25 reflects the light from the HOE 116 toward the photographer's eye. Thus, the photographer can observe the photographing image frame indicating a photographing range as a virtual image.

On the other hand, in the event of measuring a distance, the fourth CPU 111 transfers a control signal for emitting distance-measuring light to the LED driver 118.

When the LED driver 118 receives the control signal, the LED driver 118 emits the projecting-light LED 16a. The distance-measuring light emitted from the projecting-light LED 16a is converted into parallel light by the condenser lens 16b, and the parallel light is projected toward the subject.

The illumination light thus projected is reflected by the subject, the reflected light is received by the image capturing unit 30, and then distance measurement computation as described later is performed.

Next, the line-of-sight direction/angular velocity detection unit 7 is disposed on the one eye opposite to the one eye where the see-through image display unit 6 is disposed (here, the left eye, for a specific example). This line-of-sight direction/angular velocity detection unit 7 is classified broadly into a line-of-sight-direction detection unit serving as a line-of-sight-direction detection device, and an angular velocity detection unit serving as an angular velocity detection device.

The line-of-sight-direction detection unit comprises an LED driver 124, an LED 125, a condenser lens 126, a reflection mirror 127, a half mirror 128, the HOE 24, the HOE 129, a reflection mirror 131, an image formation lens 132, a bandpass filter 133, a CCD 134, a CCD driver 135, a CDS/AGC circuit 136, an A/D converter 137, and a TG 138. Of these, the LED driver 124, LED 125, condenser lens 126, reflection mirror 127, and HOE 24 make up a light projecting system serving as infrared light projection means for projecting infrared parallel light flux toward the observer's eye. Also, of those aforementioned, the HOE 24, half mirror 128, HOE 129, reflection mirror 131, image formation lens 132, bandpass filter 133, and CCD 134 make up a light receiving system for receiving light flux reflected from the observer's eye.

Also, the angular velocity detection unit comprises angular velocity sensors 141 and 142, amplifiers 143 and 144, and an A/D converter 145.

A second CPU 121 is provided for controlling the entire line-of-sight direction/angular velocity detection unit 7 including the line-of-sight-direction detection unit and the angular velocity detection unit.

The LED driver 124 is for driving the LED 125 under control of the second CPU 121.

The LED 125 is an infrared emitting diode, which is driven by the LED driver 124, for emitting infrared light for detecting a line-of-sight direction.

The condenser lens 126 converts the infrared light emitted by the LED 125 into parallel light flux.

Figure 20:
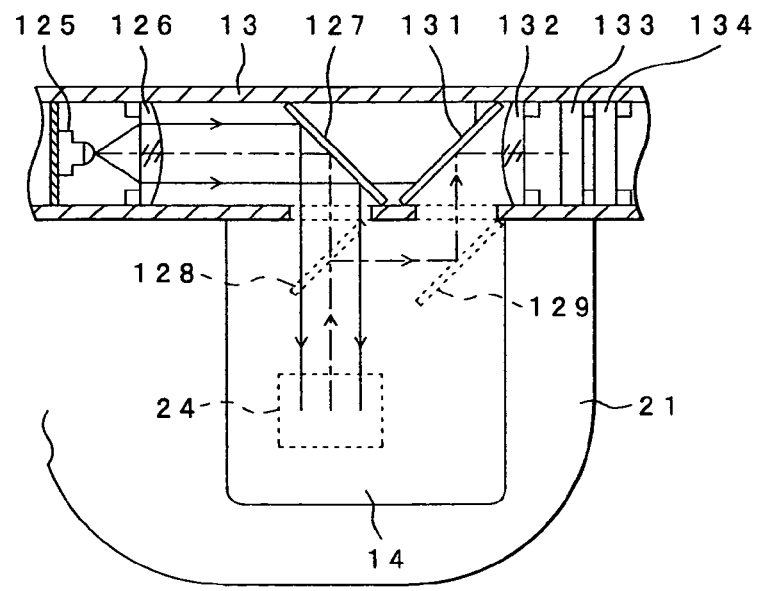
FIG. 20 is a front view including a partial cross-section illustrating a configuration example of the optical system of a line-of-sight-direction detection unit according to the first embodiment.
Figure 21:
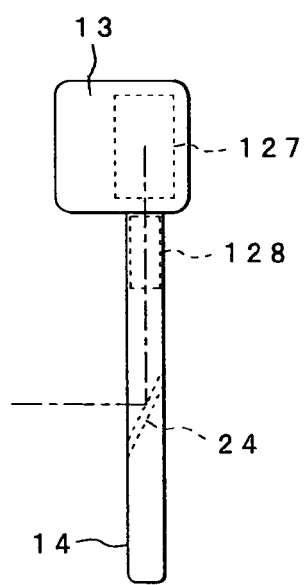
FIG. 21 is a left-side view illustrating a configuration example of the optical system of the line-of-sight-direction detection unit according to the first embodiment.

The reflection mirror 127 is a reflection optical member for reflecting the infrared light converted into parallel light flux by the condenser lens 126 vertically downwards (see FIGS. 20 and 21).

The half mirror 128 is for transmitting the infrared light from the reflection mirror 127 to the HOE 24 side, and also reflecting the light from the HOE 24 in the horizontal direction.

The HOE 24 is for reflecting the infrared light transmitting the half mirror 128 toward the observer's eye, and also reflecting the light from the observer's eye toward the half mirror 128. The HOE 24 according to the first embodiment is configured so as to become the smallest size as with the transparent optical member 14 configured to become the smallest size. The HOE 24 has wavelength selectivity regarding a certain narrow band in the infrared band, exhibits high reflection properties regarding the infrared light in the selected band alone, and on the other hand, exhibits high transparency regarding the light rays having a wavelength other than the selected band. Thus, the HOE 24 has a wavelength selection function of a band completely different from that in the HOE 25 of the see-through image display unit 6, but is generally the same as the HOE 25 regarding the entire visual transparency (or average visual transparency). Thus, disposing an optical element having average similar visual transparency as to both left and right eyes allows the photographer to release from uncomfortable feeling and to reduce tiredness of the eyes even for long-term use.

The HOE 129 is for reflecting the light flux from the eye of the observer guided by the HOE 24 and the half mirror 128 vertically downwards. This HOE 129 has the same wavelength selectivity as the HOE 24. Accordingly, of the light flux incident from the observer's eye side, the light rays having a different wavelength from that of the infrared light included in a certain band can be cut (i.e., not reflect but transmit) by passing through this HOE 129. Thus, a Purkinje's image as described later may be detected with high precision while reducing influence of noise due to light rays having the other wavelength band. Note that employing the HOE 129 as an optical element provides an advantage that disposing the HOE 129 is indistinctive even within the transparent optical member 14 as well as an advantage of improving wavelength selectivity since the HOE 129 has transparency as to light other than infrared light.

The reflection mirror 131 is for reflecting the light flux from the HOE 129 in the horizontal direction.

The image formation lens 132 is for forming an image from the light flux reflected by the reflection mirror 131 on the image capturing surface of the CCD 134.

The bandpass filter 133 is for transmitting only the infrared light in the predetermined band, of light flux to be image-formed by the image formation lens 132. As described above, a band restriction has been already performed by the HOE 129, but in the event of disposing the HOE 129 within the transparent optical member 14, there is the possibility that other visual light and the like is further mixed in, so this bandpass filter 133 restricts the band again. Thus, providing the bandpass filter 133 in front of the CCD 134 enables influence due to external light noise to be further reduced.

The CCD 134 is two-dimensional photoelectric conversion means, which are configured as an image capturing element of which the image capturing surface is two-dimensionally formed, for converting the image of the observer's eye thus image-formed into an electrical signal with photoelectric conversion, and outputting this signal. The position of a Purkinje's image and the position of the pupillary center are obtained based on the output of the CCD 134 as described later, and then a line-of-sight direction is calculated based on the relative positional relation of these.

The CCD driver 135 is for driving the CCD 134 under control of the second CPU 121.

The CDS/AGC circuit 136 is for subjecting an image signal output from the CCD 134 to noise removal and amplifying processing.

The TG 138 is for supplying a timing signal for controlling operation in collaboration to the CCD driver 135 and the CDS/AGC circuit 136 under control of the second CPU 121 respectively.

The A/D converter 137 is for converting an analog image signal output from the CDS/AGC circuit 136 into a digital image signal. The digital image signal converted by the A/D converter 137 is output to a later-described communication control unit 173 of the image capturing unit 30.

The angular velocity sensors 141 and 142, which are stored in the storing unit 27 as described above, are for detecting the angular velocities of mutually independent directions (yaw direction and pitch direction, for example).

The amplifiers 143 and 144 are for amplifying the output of the angular velocity sensors 141 and 142 respectively.

The A/D converter 145 is for converting the analog signals, which are amplified by the amplifiers 143 and 144 respectively, from the angular velocity sensors 141 and 142 into digital data respectively. The digital data converted by the A/D converter 145 is output to the second CPU 121.

The second CPU 121 is control means for controlling each circuit within the line-of-sight direction/angular velocity detection unit 7, and is bi-directionally connected to a later-described third CPU 103 of the image capturing unit 30, and performs control operation while collaborating with a later-described third CPU 103. This second CPU 121 comprises RAM 122 serving as memory, and a timer 123 for measuring time.

Description will be made later regarding the operational principle and actions of the line-of-sight direction/angular velocity detection unit 7 thus configured with reference to the other drawings.

The image capturing unit 30 comprises a photographing optical system 31, a lowpass filter 86, a CCD 87, a CDS/AGC circuit 88, an A/D converter 89, a TG (timing generator) 90, a CCD driver 91, a USM driver 95, a diaphragm shutter driver 96, an AE processing circuit 97, an AF processing circuit 98, the first microphone 17, the second microphone 18, an amplifier circuit 99, an amplifier circuit 100, an A/D converter 101, an EEPROM 102, memory 104, and a third CPU 103.

The photographing optical system 31 is for image-forming an optical subject image, and is configured as a focal-distance-variable zoom optical system.

The lowpass filter 86 is for removing unnecessary high-frequency components from the light flux passing through this photographing optical system 31.

The CCD 87 is an image capturing element for converting an optical subject image image-formed by the photographing optical system 31 via this lowpass filter 86 into an electrical signal and outputting this signal.

The CDS/AGC circuit 88 is signal processing means for subjecting the signal output from this CCD 87 to noise removal and amplifying processing as described later.

The A/D converter 89 is signal processing means for converting the analog image signal output from this CDS/AGC circuit 88 into a digital image signal.

The memory 104 is for temporarily storing the digital image signal to be output from this A/D converter 89.

The CCD driver 91 is for controlling the CCD 87 to be driven.

The TG (timing generator) 90 supplies a signal for controlling timing to the CDS/AGC circuit 88, A/D converter 89, and CCD driver 91 respectively. This TG 90 is bi-directionally connected to the second CPU 121 of the line-of-sight direction/angular velocity detection unit 7, and controlled.

The USM driver 95 is a driving circuit for selectively driving later-described USMs (Ultrasonic Motor) 92, 93, and 94 included in the photographing optical system 31. This USM driver 95 is also controlled by the second CPU 121 of the line-of-sight direction/angular velocity detection unit 7.

The diaphragm shutter driver 96 is a driver circuit for controlling a later-described diaphragm shutter 84 included in the photographing optical system 31 to be driven. This diaphragm shutter driver 96 is controlled by the second CPU 121 of the line-of-sight direction/angular velocity detection unit 7.

The AE processing circuit 97 is an auto-exposure processing circuit for performing exposure-control calculation based on the output of the A/D converter 89, and outputs the calculation results to the third CPU 103.

The AF processing circuit 98 is an auto-focus processing circuit for performing auto-focus (AF) control calculation based on the output of the A/D converter 89, and outputs the calculation results to the third CPU 103.

The first microphone 17 and second microphone 18 are for recording audio from the subject side in a stereo manner, as described above.

The amplifier circuit 99 and amplifier circuit 100 are for amplifying audio signals input from the first microphone 17 and second microphone 18.

The A/D converter 101 is for converting the analog audio signals amplified by the amplifier 99 and amplifier 100 respectively into digital audio signals, and outputting these to the third CPU 103.

The data stored in the EEPROM 102 is various types of correction data for exposure control, auto-focus processing, and the like stored when the image system is manufactured, and is read out by the third CPU 103.

The third CPU 103 is control means for controlling each circuit within the image capturing unit 30, and performs control operation while collaborating with the fourth CPU 111 of the see-through image display unit 6 and the second CPU 121 of the line-of-sight direction/angular velocity detection unit 7. A later-described first CPU 161 of the image recording/editing device 4 further controls this third CPU 103 through bi-directional communication.

More particularly, the photographing optical system 31 comprises a front lens 81, variator lens 82, compensator lens 83, diaphragm shutter 84, focus lens 85, and USMs 92, 93, and 94.

Of multiple lenses included in the photographing optical system 31, the front lens 81 is positioned closest to the subject side.

The variator lens 82 is for changing the focal distance of the photographing optical system 31.

The compensator lens 83 is for correcting offset of a focus position accompanied with the variator lens 82 changing the focal distance of the photographing optical system 31.

The diaphragm shutter 84 provides both a diaphragm function for stipulating the passing range of light flux passing through the photographing optical system 31 and a shutter function for stipulating the passing time of the light flux.

The focus lens 85 is for adjusting the focus of the photographing optical system 31, and upon focus being adjusted, the subject image is formed on the CCD 87 in focus.

The SUMs 92, 93, and 94 are driving sources for driving the variator lens 82, compensator lens 83, and focus lens 85 respectively.

The communication unit 8 comprises a communication control unit 173, and a transmission/reception unit 172.

The communication control unit 173 is for performing frame synchronization (synchronization in increments of frame using time division multiplex) and data format processing of slots (this slot is made up of a pair of an attribute and an attribute value) serving as a frame component.

The transmission/reception unit 172 comprises a wireless transmission/reception antenna, and a modem for converting a transmission digital signal into an antenna-transmission analog signal, and converting a signal received via the antenna into a digital signal.

Now, description will be made regarding operation of the communication unit 8 thus configured at the time of transmission/reception.

The reception side of the communication control unit 173 extracts one slot data from reception data supplied from the modem of the transmission/reception unit 172 at certain timing. Next, the reception side of the communication control unit 173 extracts a synchronous signal from this data, generates a frame synchronous signal, and unlocks scrambling or the like. Subsequently, the reception side of the communication control unit 173 transmits various types of an operating signal transmitted from the image recording/editing device 4, or image data stored in the disk 249 (see FIG. 11) to the third CPU 103.

On the other hand, the transmission side of the communication control unit 173 multiplexes an image signal output from the A/D converter 89 via the memory 104, an image signal according to the photographer's eye output from the A/D converter 137 of the line-of-sight direction/angular velocity detection unit 7 (one of biological information), angular velocity information according to the photographer's head output from the second CPU 121 of the line-of-sight direction/angular velocity detection unit 7 (one of biological information), and audio data output via the third CPU 103 based on the timer information output from second CPU 121 so that an image signal and biological information generated at the same time can have mutual relevance. Next, the transmission side of the communication control unit 173 creates one slot transmission data by adding a synchronous signal following adding scrambling and so forth. Subsequently, the transmission side of the communication control unit 173 inserts the created transmission data in a certain slot within a frame at certain timing, and transmits this to the modem of the transmission/reception unit 172. Thus, data is wireless-transmitted from the transmission/reception unit 172.

Figure 11:
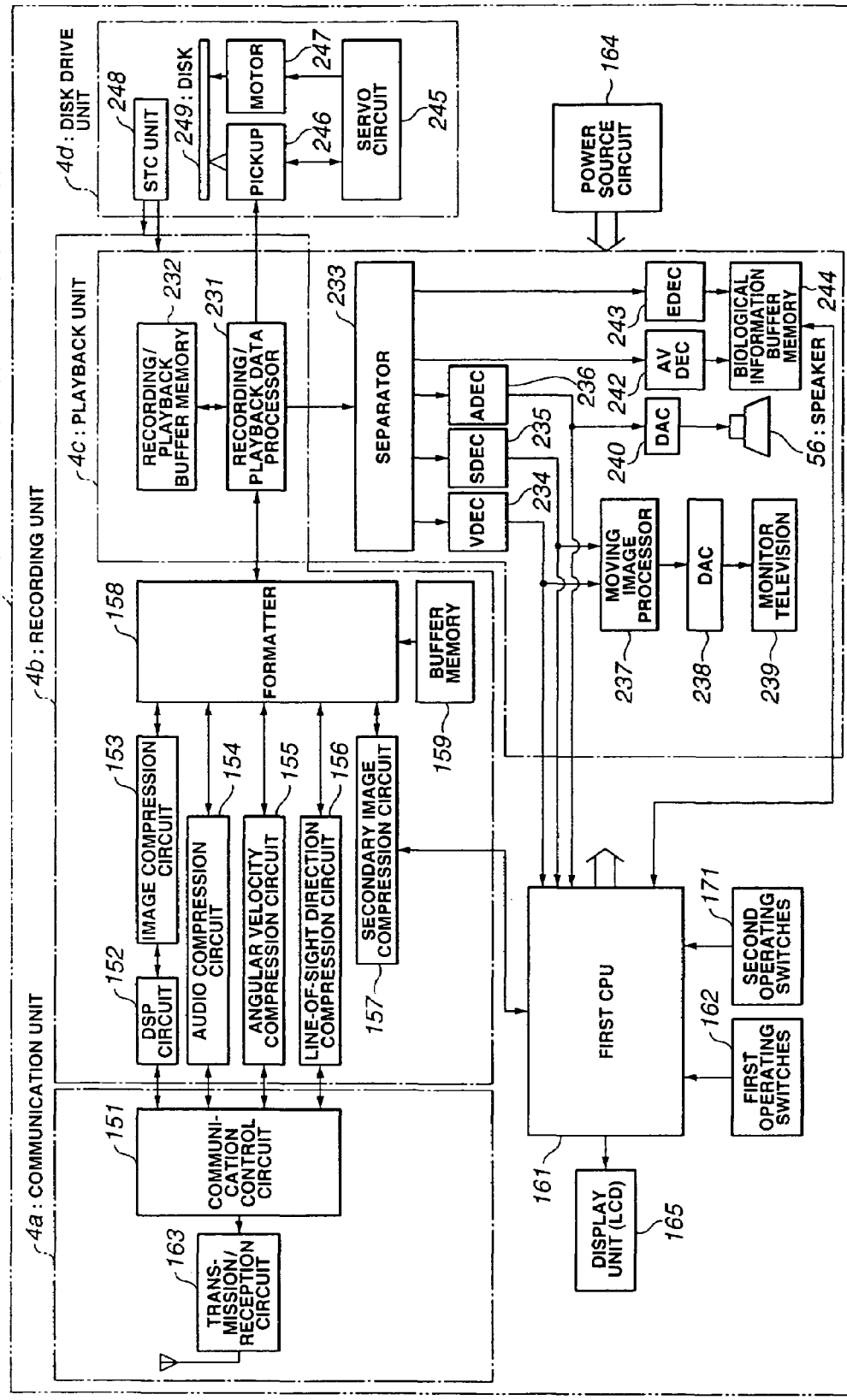
FIG. 11 is a block diagram primarily illustrating the configuration of electronic circuits of the image recording/editing device according to the first embodiment.

FIG. 11 is a block diagram illustrating the configuration of the image recording/editing device 4.

As illustrated in FIG. 11, this image recording/editing device 4 comprises a communication unit 4a, recording unit 4b, playback unit 4c, and disk driving unit 4d as principal components, and also comprises a first operating switch 162, second operating switch 171, first CPU 161, display unit 165, and power source circuit 164.

The communication unit 4a is for receiving moving image data, audio data, line-of-sight direction data and angular velocity data serving as biological information transmitted from the head mounted unit 2, and also transmitting various types of operating signals for photographing, moving image data and audio data reproduced by the image recording/editing device 4 to the head mounted unit 2.

The recording unit 4b is moving image data recording means and also biological information recording means for recording the data received by the communication unit 4a in the disk 249 serving as a recording medium.

The disk drive unit 4d rotates and drives the disk 249 serving as a recording medium, executes reading and writing of information as to the disk 249, so serves as moving image data read-out means, biological information read-out means, moving image data recording means, and biological information recording means.

The playback unit 4c is moving image data read-out means and also biological information read-out means for playing back the various types of data recorded in the disk 249 by the recording unit 4b.

The first operating switch 162 is operating means for inputting various types of operating instructions according to photographing of the head mounted unit 2. This first operating switch 162 is connected to the first CPU 161.

The second operating switch 171 is operating means for inputting various types of operating instructions according to the image recording/editing device 4. This second operating switch 171 is connected to the first CPU 161.

The display unit 165 is display means for displaying various types of operating information by the first and second operating switches 162 and 171, moving images reproduced by the playback unit 4c, and the like, and is configured of the LCD 48 such as shown in FIG. 9. This display unit 165 is connected to the first CPU 161 so as to be controlled.

The power source circuit 164 is for supplying power source to each circuit within the image recording/editing device 4, and comprises a detachable-type battery or the like, for example.

The first CPU 161 is control means for controlling operation of the entire image system 1 in an integrated manner by not only controlling the image recording/editing device 4 but also communicating with the third CPU 103 of the head mounted unit 2. This first CPU 161 also serves as editing processing means for editing the image data reproduced by the playback unit 4c based on the biological information reproduced by the playback unit 4c.

Now, description will be made in further detail regarding the communication unit 4a, recording unit 4b, playback unit 4c, and disk drive unit 4d.

The communication unit 4a comprises a transmission/reception circuit 163, and communication control circuit 151.

The recording unit 4b comprises a DSP circuit 152, image compression circuit 153, audio compression circuit 154, angular velocity compression circuit 155, line-of-sight direction compression circuit 156, secondary image compression circuit 157, formatter 158, buffer memory 159, recording/playback data processor 231, and recording/playback buffer memory 232.

The playback unit 4c comprises the recording/playback data processor 231, recording/playback buffer memory 232, a separator 233, moving image decoder (VDEC) 234, secondary image decoder (SDEC) 235, audio decoder (ADEC) 236, angular velocity decoder (AVDEC) 242, line-of-sight direction decoder (EDEC) 243, biological information buffer memory 244, D/A converter (DAC) 240, the speaker 56, a moving image processor 237, D/A converter (DAC) 238, and monitor television 239.

That is to say, the recording/playback data processor 231 and recording/playback buffer memory 232 are circuits included in both recording unit 4b and playback unit 4c.

The disk drive unit 4d is for recording images in the disk 249, or playing back images recorded in the disk 249, and comprises a servo circuit 245, motor 247, pickup unit 246, and system time clock (STC) unit 248.

Description will be made regarding functions and actions of the aforementioned components along actions of the image system 1.

The light flux passing through the photographing optical system 31 is image-formed on the image capturing surface of the CCD 87 via the lowpass filter 86.

When the photographer performs a moving image recording operation using the first operating switch 162 of the image recording/editing device 4, or when the photographer performs a still image photographing operation using the release switch 73 of the image recording/editing device 4, a subject image is subjected to photoelectric conversion by the CCD 87, and an analog image signal is output.

This image signal from the CCD 87 is input to the CDS/AGC circuit 88, subjected to known correlation double sampling or the like by the CDS circuit portion within the CDS/AGC circuit 88 so as to remove reset noise, also subjected to amplifying to a certain signal level by the AGC circuit portion within the CDS/AGC circuit 88, and output.

The analog image signal from this CDS/AGC circuit 88 is converted into a digital image signal (image data) by the subsequent A/D converter 89, and then temporarily stored in the memory 104. With the present embodiment, this output signal of the A/D converter 89 is referred to as RAW image data. That is to say, the RAW image data according to the present embodiment is defined as digital data immediately after the analog output signal from the CCD 87 is analog-to-digital converted first, i.e., data prior to subjecting to other digital signal processing or the like.

A timing control signal generated by the TG 90 is input to the CDS/AGC circuit 88 and A/D converter 89, and the timing control signal from the TG 90 is also input to the CCD driver 91.

On the other hand, the output signals from the first microphone 17 and second microphone 18 are amplified by the amplifiers 99 and 100, following which are converted into digital data in a time-sharing manner with a certain sampling cycle by the A/D converter 101, and transferred to the third CPU 103. The third CPU 103 transfers the audio data converted into digital data to the communication control unit 173 at certain timing.

The communication control unit 173 multiplexes image data serving as an output signal from the A/D converter 89, audio data from the first microphone 17 and second microphone 18, line-of-sight direction data (line-of-sight direction information) and angular velocity data of the photographer's head from the line-of-sight direction/angular velocity detection unit 7, and timer information counted by the timer 123 of the second CPU 121.

As illustrated in FIG. 47, the signal multiplexed by this communication control unit 173 is a signal in which the detection start time of the aforementioned respective data is recorded at the head, following which various types of data such as the aforementioned image data, audio data, and the like are alternately output with a certain interval. This FIG. 47 is a diagram illustrating the configuration in time series of the signal output from the communication control unit 173. For example, let us say that each capturing cycle of image data, audio data, and angular velocity data is one thirtieth second, the capturing cycle of line-of-sight direction data is 1 second, and also one unit is made up of 1-second data. In this case as illustrated in FIG. 47, this single unit is recorded with start time data in the head thereof, 30 data sets each of which is made up of image data, audio data, and angular velocity data, and line-of-sight direction data in the tail thereof. Note that the data sequence shown in FIG. 47 is simply an example, so line-of-sight direction data may be recorded immediately after time data, for example.

A plurality of data in increments of unit including such digitized data is output to the image recording/editing device 4 via the transmission/reception unit 172.

Thus, the image capturing unit 30 performs analog signal processing of the image signal generated by the CCD 87, converts the image data into a digital signal, and then outputs this, and accordingly, the analog signal is never output to the outside of the image capturing unit 30. Accordingly, the image capturing unit 30 is configured so as to be free from external noise liable to suffer at the time of transmitting the image signal via the transmission/reception unit 172.

Also, the image capturing unit 30 outputs the RAW image data, so needs no signal processing circuit for color separation, white balance adjustment, and the like, and accordingly, downsizing and weight saving of the head mounted unit 2 including the image capturing unit 30 may be realized.

The signal transmitted to the image recording/editing device 4 from the transmission/reception unit 172 is separated into image data and data other than the image data by the communication unit 4a within the image recording/editing device 4.

The moving image data received by the transmission/reception circuit 163 and separated by the communication control circuit 151 is separated into an illumination component Y, color-difference component Cr (or Y-R), and color-difference component Cb (or Y-B) by the DSP circuit 152. These signals are subjected to compression processing in conformity with MPEG-2 by the image compression circuit 153.

The audio data, and the angular velocity data and line-of-sight direction data serving as biological information, which are separated by the communication control circuit 151, are subjected to certain compression processing by the audio compression circuit 154, angular velocity compression circuit 155, and line-of-sight direction compression circuit 156 respectively.

The secondary image data such as a moving image title or the like input via the first operating switch 162 is subjected to certain compression processing by the secondary image compression circuit 157.

The moving-image data, audio data, angular velocity data, line-of-sight direction data, and secondary image data, which are subjected to compression processing as described above are input to the formatter 158.

The formatter 158 performs the corresponding signal processing as to the input moving image data, audio data, line-of-sight direction data, angular velocity data, and secondary image data using the buffer memory 159 for formatting as a work area, and outputs the recording data in accord with a later-described format (file configuration) to a recording/playback data processor 231.

At this time, this formatter 158 sets a cell serving as a data minimal unit, and creates cell reproduction information (C_PBI).

Next, the formatter 158 sets a cell configuration making up a program chain, the attributes of a moving image, secondary image, and audio, and the like, and creates video title set management information VTSI including various types of information.

Encoded (compressed) video data (here, the term "video data" is a generic term of moving image data, audio data, and secondary image data, as described later) and encoded (compressed) biological information (angular velocity data and line-of-sight direction data) are segmentized into certain-sized (2048-byte) packs. These packs include descriptions of time stamps in conformity with MPEG such as PTS (Presentation Time Stamp), DTS (Decoding Time Stamp) and the like. Note that the term "time stamp" is a time system represented with 32 bits to be counted using a 9000-Hz reference clock, and is distinguished from a time code representing hour, minute, second, and frame with BCD (Binary Coded Decimal) in increments of frame, as described later.

In increments of VOBU (Video Object Unit), a navigation pack NV is disposed in the head thereof so as reproduce each data in the sequence of time codes, and subsequently, each data cell is disposed, thereby configuring a VOB (Video Object) made up of multiple cells. A VOBS (Video Object Set) made up of one or more VOBs is formatted in the configuration of the video title set VTS like those shown in FIGS. 54A through 54E.

Note that description will be made later regarding the recording format thereof in detail.

The recording/playback buffer memory 232 is utilized for buffering a certain amount of data written in the disk 249 via the recording/playback data processor 231, or buffering a certain amount of data reproduced from the disk 249 via the disk drive unit 4d. This recording/playback buffer memory 232 is also used as work memory for storing moving image data to be edited at the time of editing the moving image data recorded in the disk 249 based on the biological information.

The recording/playback data processor 231 supplies the recording data from the formatter 158 to the disk drive unit 4d, extracts a reproduced signal reproduced from the disk 249 from the disk drive unit 4d, and replaces the management information recorded in the disk 249, under control of the first CPU 161.

The first CPU 161 includes RAM, and ROM storing a control program therewithin, and operates in accordance with this control program. That is to say, the first CPU 161 employs the internal RAM as a work area, performs recording amount (the number of recording packs) detection, remaining amount detection, warning, recording mode change instructions, control of the entire image recording/editing device 4, and other processing.

In addition, the first CPU 161 performs certain editing based on the line-of-sight direction data and angular velocity information serving as the biological information reproduced from the disk 249, processing in increments of cell such as zooming, smoothing, removal range instructions, dividing of a cell, and the like.

The separator 233 separates and extracts each pack from the reproduced data in a pack configuration.

The moving image decoder (VDEC) 234 decodes a video pack separated by the separator 233.

The secondary image decoder (SDEC) 235 decodes the content of the secondary image pack separated by the separator 233.

The audio decoder (ADEC) 236 decodes the content of the audio pack separated by the separator 233.

The moving image processor 237 synthesizes the secondary image data from the secondary image decoder (SDEC) 235 with the moving image data from the moving image decoder (VDEC) 234 as necessary, superimposes a secondary image such as a menu, highlight button, subtitles, or the like on an moving image, and outputs this.

The output of this moving image processor 237 is converted into an analog signal via the D/A converter (DAC) 238, and then is supplied to the monitor television 239. Note that this monitor television 239 may be a monitor using the LCD 48 like that shown in FIG. 9, or an external monitor to be connected via the AV/S connection terminal 50 like that shown in FIG. 6.

The output from the audio decoder (ADEC) 236 is converted into an analog signal via the D/A converter (DAC) 240, and then is supplied to the speaker 56. This speaker 56 illustrated in FIGS. 8 and 9 is employed here, an external speaker may be employed in the same way in the case of employing an external monitor.

In the event that the photographer selects a recorded image by operating the menu button 63, menu selection switches 66, 67, 68, and 69, determinant switch 65, or the like of the first operating switches 162, and performs playback instructions by operating the playback/stop switch 59, the compressed data stored in the disk 249 is reproduced and displayed on the LCD 48.

On the other hand, the digital image data from the A/D converter 89 is input to the AE processing circuit 97 and AF processing circuit 98 within the image capturing unit 30 respectively.

The AE processing circuit 97 calculates an AE evaluation value corresponding to the brightness of a subject by calculating the luminance values of one frame (one screen) image data, and performing processing such as weighing and adding, or the like, and outputs the calculation results to the second CPU 121 via the third CPU 103. The second CPU 121 performs control of the exposure time of the CCD 87, and control of the diaphragm shutter 84 based on the obtained AE evaluation value.

On the other hand, the AF processing circuit 98 extracts high-frequency components from the luminance components of one frame (one screen) image data using a highpass filter, or the like under control of the second CPU 121 via the third CPU 103, calculates an AF evaluation value corresponding to the outline components and the like on the high-frequency band side by calculating the cumulative additional values of the extracted high-frequency components, or the like, and outputs the calculation results to the second CPU 121 via the third CPU 103. The second CPU 121 drives the focus lens 85 via the USM driver 95 based on the AF evaluation value calculated by the AF processing circuit 98, and performs focus detection so as to obtain a focus state.

The data stored in the EEPROM 102 is various types of correction data for exposure control, auto-focus processing, and the like stored when the image system is manufactured, and the second CPU 121 reads out the correction data from this EEPROM 102 via the third CPU 103, and performs various types of calculations as necessary.

Figure 12:
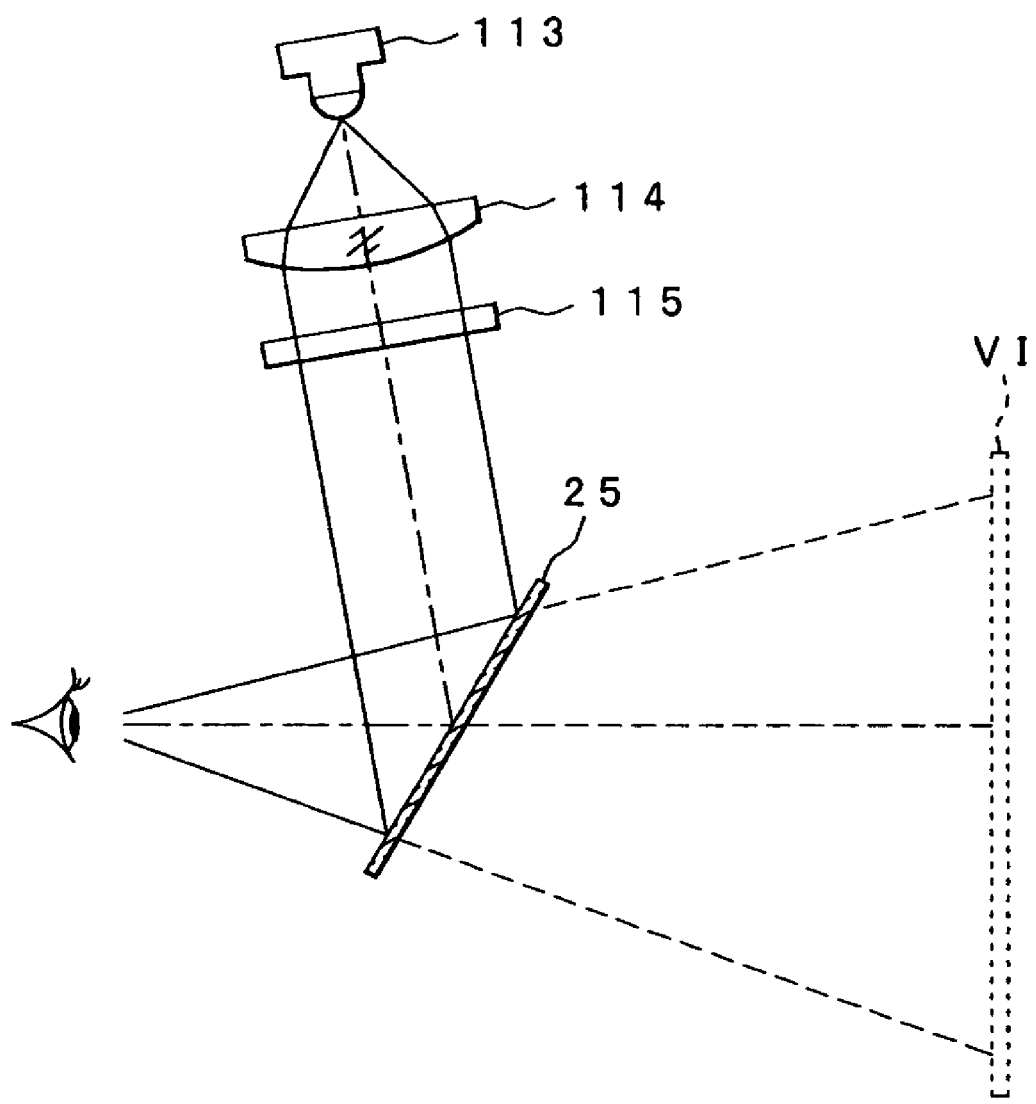
FIG. 12 is an explanatory diagram for describing the optical system principle of a see-through image display unit according to the first embodiment.
Figure 13:
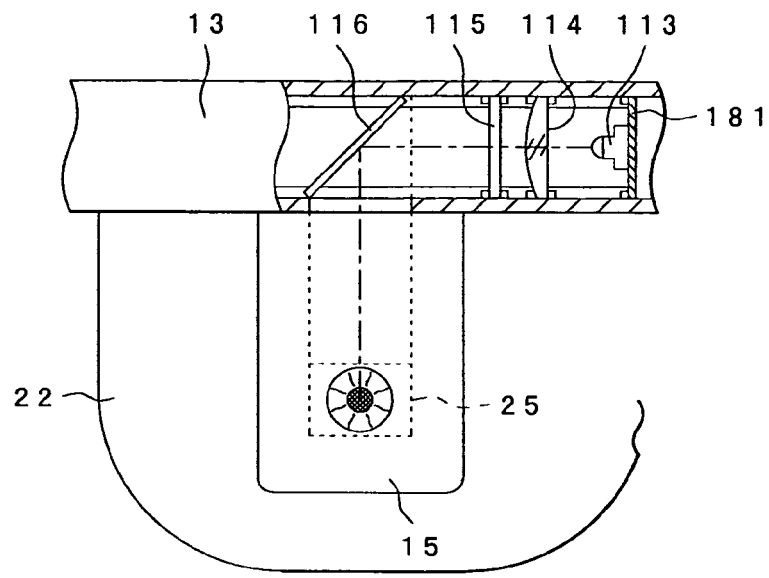
FIG. 13 is a front view including a partial cross-section illustrating the optical system configuration of the see-through image display unit according to the first embodiment.
Figure 14:
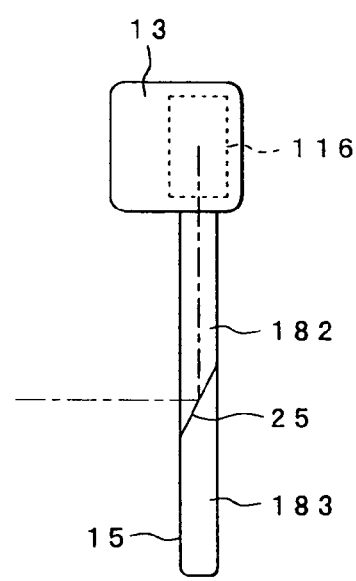
FIG. 14 is a left-side view illustrating the optical system configuration of the see-through image display unit according to the first embodiment.

Next, description will be made principally regarding the optical configuration of the see-through image display unit 6 with reference to FIGS. 12 through 14. FIG. 12 is an explanatory diagram for describing the optical system principle of the see-through image display unit 6, FIG. 13 is a front view including a partial cross-section illustrating the optical system configuration of the see-through image display unit 6, and FIG. 14 is a left-side view illustrating the optical system configuration of the see-through image display unit 6.

This see-through image display unit 6 can performs superimpose display of a photographing image frame indicating a photographing range over a subject essentially directly observed by the photographer as a virtual image, and hereinafter, such display is referred to as see-through display with the present embodiment. Note the term "essentially directly observed" includes the case of observing via a general flat-plate transparent member made up of glass, plastic, or the like, the case of observing via an eyesight adjusting lens, or the like as well as the case of observing with the naked eye also.

First, description will be made regarding the principle to display a see-through image using the optical system of the see-through image display unit 6 (hereinafter, referred to as "see-through image display optical system") according to the present embodiment with reference to FIG. 12.

The light emitted by the LED 113 is condensed by the condenser lens 114, and illuminates the LCD 115 from the back. The LED 113 emits the G (green) diode alone for example in the case of displaying the photographing image frame as described above.

The fourth CPU 111 generates a signal corresponding to the photographing image frame indicating a photographing range, and outputs this signal to the LCD driver 117. The LCD driver 117 displays the photographing image frame on the LCD 115 by driving the LCD 115 based on this signal.

The image of the photographing image frame, which receives the light of the LED 113, and is radiated from the LCD 115, is reflected by the HOE 25, and then guided to the photographer's eye. Thus, the photographer can observe the photographing image frame indicating a photographing range as a virtual image VI. Note that this FIG. 12 describes the principle, so drawing of the HOE 116 is omitted.

The HOE 25 is a volume-phase-type holography optical element using photographic sensitive material such as photopolymer, gelatin bichromate, or the like, and is designed so as to exhibit properties for reflecting the light with the maximum reflectance in each wavelength of R, G, and B emitted by the LED 113. Accordingly, in the event of emitting the light of G when displaying the photographing image frame, the green photographing image frame is clearly displayed as a virtual image. The HOE 25 includes excellent wavelength selectivity, exhibits high reflectivity in an extremely narrow wavelength width as to the light rays having the wavelength of R, G, or B, and on the other hand, exhibits high transparency as to the light rays having a wavelength other than R, G, and B. Accordingly, the external light in the same wavelength band as the display light is diffracted and reflected, so cannot reach the photographer's pupil, but the external light having a wavelength band other than that band can reach the photographer's pupil. In general, the visual light has a wide wavelength band width, so the photographer can observe an external image without any obstacle even in the event that the light having an extremely narrow wavelength width including each wavelength of R, G, and B cannot reach the photographer's pupil.

Also, this see-through image display unit 6 is capable of see-through display of the image captured by the image capturing unit 30 as a color image, in this case, it is preferable to display the image captured on the LCD 115, and also emit 3-color light of R, G, and B using the LED 113. Thus, the image captured reaches the photographer's pupil from the HOE 25 as a virtual image.

The HOE 116 has a function for correcting distortion of an image surface as well as a function for reflecting the light from the LCD 115 so as to guide to the HOE 25. Note that the HOE 116 is employed here, but a free-curved surface optical element may be employed instead of the HOE 116. The free-curved surface optical element is small and lightweight, but can correct complex aberration, so a clear image having reduced aberration may be displayed without increasing weight thereof.

Next, description will be made regarding a specific arrangement example of the see-through image display optical system with reference to FIGS. 13 and 14.

As illustrated in FIG. 13, the LED 113, condenser lens 114, LCD 115, and HOE 116 are disposed in this order within the frame portion 13 on the upper position of the transparent optical member 15. These respective members are fixed so as to be sandwiched by a holding frame provided within the frame portion 13. At this time, the LED 113 is fixed by the holding frame in a state of being mounted on an electric circuit board 181. Of these, the HOE 116 is disposed in an inclined manner so as to reflect the light from the LED 113 vertically downwards, as described above.

As illustrated in FIG. 14, the transparent optical member 15 comprises light guide members 182 and 183 formed so as to have certain thickness using transparent glass, plastic, or the like, and the HOE 25 disposed in an inclined manner so as to reflect the light backwards while being sandwiched between these light guide members 182 and 183. With such a configuration, the light reflected from the HOE 116 passes through the inside of the light guide member 182 disposed above the HOE 25, and reaches the HOE 25. Note that propagation of the light within the light guide member 182 may be transparency alone like that shown in FIG. 14, but a combination of transparency and total reflection within the light guide member 182 may be employed. In the event of performing an optical design so as to combine transparency with total reflection, the transparent optical member 15 may be reduced in thickness, thereby further promoting weight saving of the head mounted unit 2.

Note that of the aforementioned respective members, the see-through image display optical system includes the LED 113, condenser lens 114, LCD 115, HOE 116, HOE 25, and light guide members 182 and 183.

Next, description will be made regarding a configuration wherein the photographer can observe a subject and a virtual image at the same time by focusing the photographer's eye with reference to FIGS. 15 through 19B.

In the event that the difference between the distance from the photographer's eye to the virtual image of the photographing image frame and the distance from the photographer's eye to the subject is great, the photographer's eye cannot be focused on both at the same time, so the photographer cannot clearly observe the photographing image frame and the subject at the same time.

Accordingly, description will be made here regarding a configuration wherein the photographer can clearly observe the photographing image frame and the subject at the same time by setting the distance from the photographer's eye to the virtual image of the photographing image frame so as to be identical with the distance from the photographer's eye to the subject.

Figure 15:
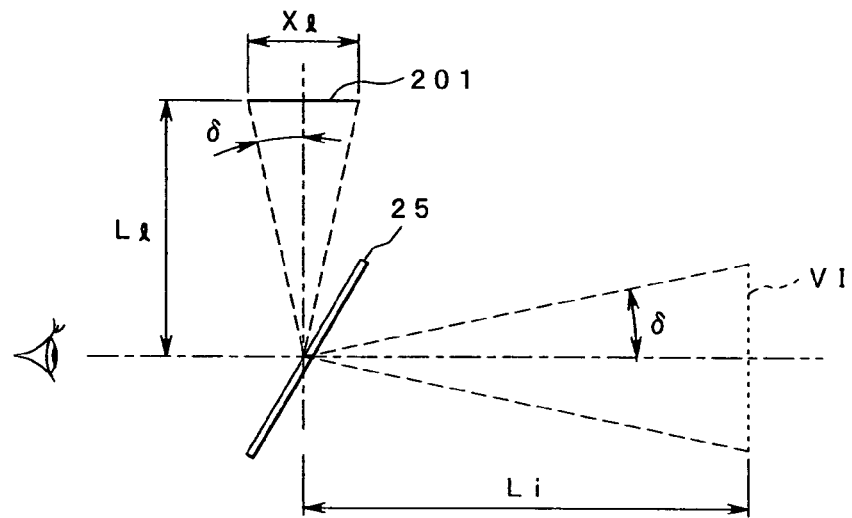
FIG. 15 is an explanatory diagram for describing the principle of changing the position from the eye to a virtual image with the first embodiment.

FIG. 15 is an explanatory diagram for describing the principle for modifying the position from the photographer's eye to the virtual image. In FIG. 15, the drawing of the HOE 116 or the like and description according to the HOE 116 or the like are omitted for the sake of briefly describing the principle alone without bothering with other members.

Let us say that the focal distance of the HOE 25 is f, the distance from the position of a photographing image frame 201 displayed on the LCD 115 to the HOE 25 is Ll, the distance from the HOE 25 to the virtual image VI is Li, the angle (visual angle) wherein the photographer views the virtual image on the diagonal line of the photographing image frame 201 is 2δ, and the length of the diagonal line of the photographing image frame to be displayed on the LCD 115 is Xl. In this case, the relations like those shown in the following Expression 1 and Expression 2 are satisfied.

$$Ll = \frac{1}{\frac{1}{f} - \frac{1}{Li}}$$ [Expression 1]

$$Xl = 2 \cdot Ll \cdot \tan\delta = \frac{2 \cdot \tan\delta}{\frac{1}{f} - \frac{1}{Li}}$$ [Expression 2]

Of the respective variables and constants represented in these expressions, the f is determined at the time of designing the HOE 25, but the δ is determined by the photographer, and the distance Li to the virtual image needs to be identical with the distance to the subject (i.e., subject distance to be obtained by measuring a distance, for example). Accordingly, the display position Ll of the LCD 115 for displaying the virtual image on the same distanced position as the subject distance is obtained by substituting these values for Expression 1, and the size Xl of the photographing image frame to be displayed on the LCD 115 for matching the viewing angle of the photographing image frame with the photographing field angle is obtained by substituting the aforementioned respective values for Expression 2.

Figure 16:
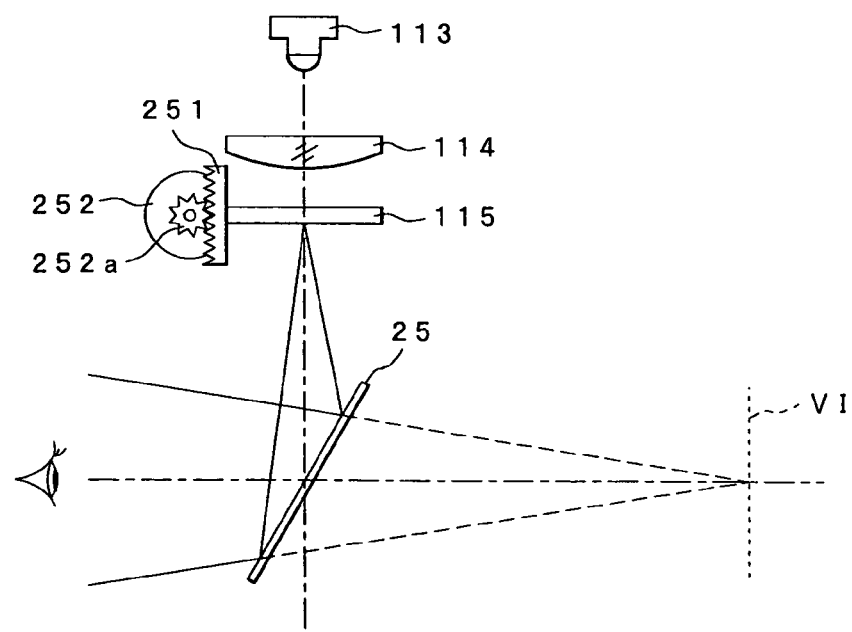
FIG. 16 is a diagram illustrating a configuration example wherein an LCD is driven in the optical axial direction by an actuator with the first embodiment.

FIG. 16 is a diagram illustrating a configuration example wherein the LCD 115 is driven in the optical axial direction by an actuator 252 serving as virtual image distance adjusting means. With this example, the Ll is modified by employing a known actuator such as electromagnetic motor, ultrasonic motor (USM), electrostatic actuator, or the like as the actuator 252. That is to say, the LCD 115 is disposed so as to move in the optical axial direction of the condenser lens 114, and a rack 251, for example, serving as virtual image distance adjusting means for moving the LCD 115 in the optical axial direction is disposed on a frame member supporting the LCD 115, or the like. Driving force is propagated to this rack 251 by gearing a pinion gear 252a fixed to the rotational axis of the actuator 252. Thus, rotating the actuator 252 by desired amount can move the LCD 115 in the optical axial direction by a certain amount. With such a configuration, the Ll is modified so that the distance Li to the virtual image VI can be identical with the distance to the subject. Also, in the event that the Ll is modified using this configuration, it is needless to say that the size of the photographing image frame to be displayed on the LCD 115 needs to be modified using the LCD driver 117 serving as viewing angle adjusting means so as to become the Xl like that shown in Expression 2.

Note that with the example shown in FIG. 16 or an example shown in FIG. 17 described next, when the virtual image position is modified, magnification (the angle 2δ for viewing the subject) is also modified, so correction is performed by correcting the size of an image to be displayed on the LCD 115 using the LCD driver 117 serving as viewing angle adjusting means so that the magnification becomes constant. More specifically, the size of an image to be displayed on the LCD 115 is corrected so that the proportion between the distance Ll from the position of the photographing image frame 201 displayed on the LCD 115 to the HOE 25 and the length Xl of the diagonal line of the photographing image frame 201 to be displayed on the LCD 115 becomes constant.

Figure 17:
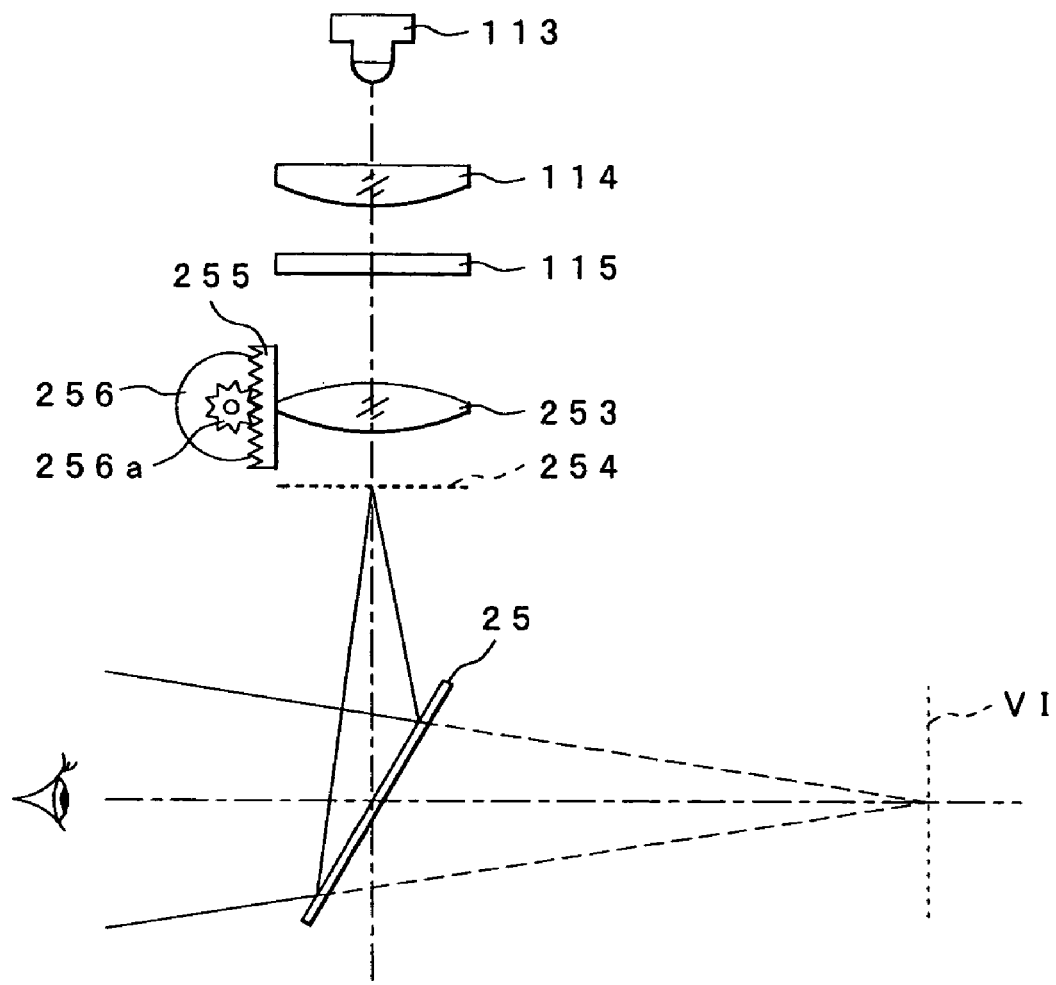
FIG. 17 is a diagram illustrating a configuration example wherein an LCD image is subjected to a primary image formation, and the position of this primary image formation is changed in the optical axial direction with the first embodiment.

FIG. 17 is a diagram illustrating a configuration example wherein the image of the LCD 115 is subjected to primary image formation, and the position of this primary image formation is modified in the optical axial direction. In this example, the image formation lens 253 serving as an image formation optical system is disposed on optical path of the light flux passing through the LCD 115, and the image of the LCD 115 is subjected to the primary image formation at a position 254 on the optical path between the image formation lens 253 and the HOE 25 by the image formation lens 253. The image formation lens 253 is disposed so as to move in the optical axial direction, and a rack 255, for example, serving as virtual image distance adjusting means for moving the image formation lens 253 in the optical axial direction is disposed on the member such as a mirror frame supporting the image formation lens 253. In the same way, driving force is propagated to this rack 255 serving as virtual image distance adjusting means by gearing a pinion gear 256a fixed to the rotational axis of the actuator 256. Thus, rotating the actuator 256 by desired amount can move the position 254 of the primary image formation in the optical axial direction by a certain amount. With such a configuration, the Ll is modified so that the distance Li to the virtual image VI can be identical with the distance to the subject. With the example shown in FIG. 17, the Ll in the principle described in FIG. 15 denotes the distance from the position 254 of the primary image formation to the HOE 25. Also at this time, it is needless to say that the size of the photographing image frame to be displayed on the LCD 115 needs to be modified.

Note that the distance to the virtual image VI of the photographing image frame from the photographer's eye is adjusted while following the subject distance here, but in this case, the subject distance changes each time the photographer's line-of-sight changes, and the position of the photographing image frame changes every moment, so unless the photographing image frame is continuously adjusted with high precision, visual uncomfortable feeling may occur. On the other hand, adjusting the position of the photographing image frame every moment increases power consumption. Accordingly, an arrangement may be made wherein the position of the photographing image frame is divided into multiple steps (three steps, for example) from the closest distance to the infinite distance.

The configuration examples like those shown in FIGS. 16 and 17 mechanically move the LCD 115 and the image formation lens 253 using the actuator 252 and the actuator 256 respectively, so the configurations are somewhat complex, and also room for disposing the actuators and the like is necessary, and weight increases. Furthermore, a little noise may occur at the time of driving since the actuator is employed, so the noise occurring at this time may give the photographer an uncomfortable feeling. With a camera to be mounted on the head, such a problem is preferably solved as much as possible. A configuration example to be described with reference to FIG. 18 next has been devised in light of such a problem.

Figure 18:
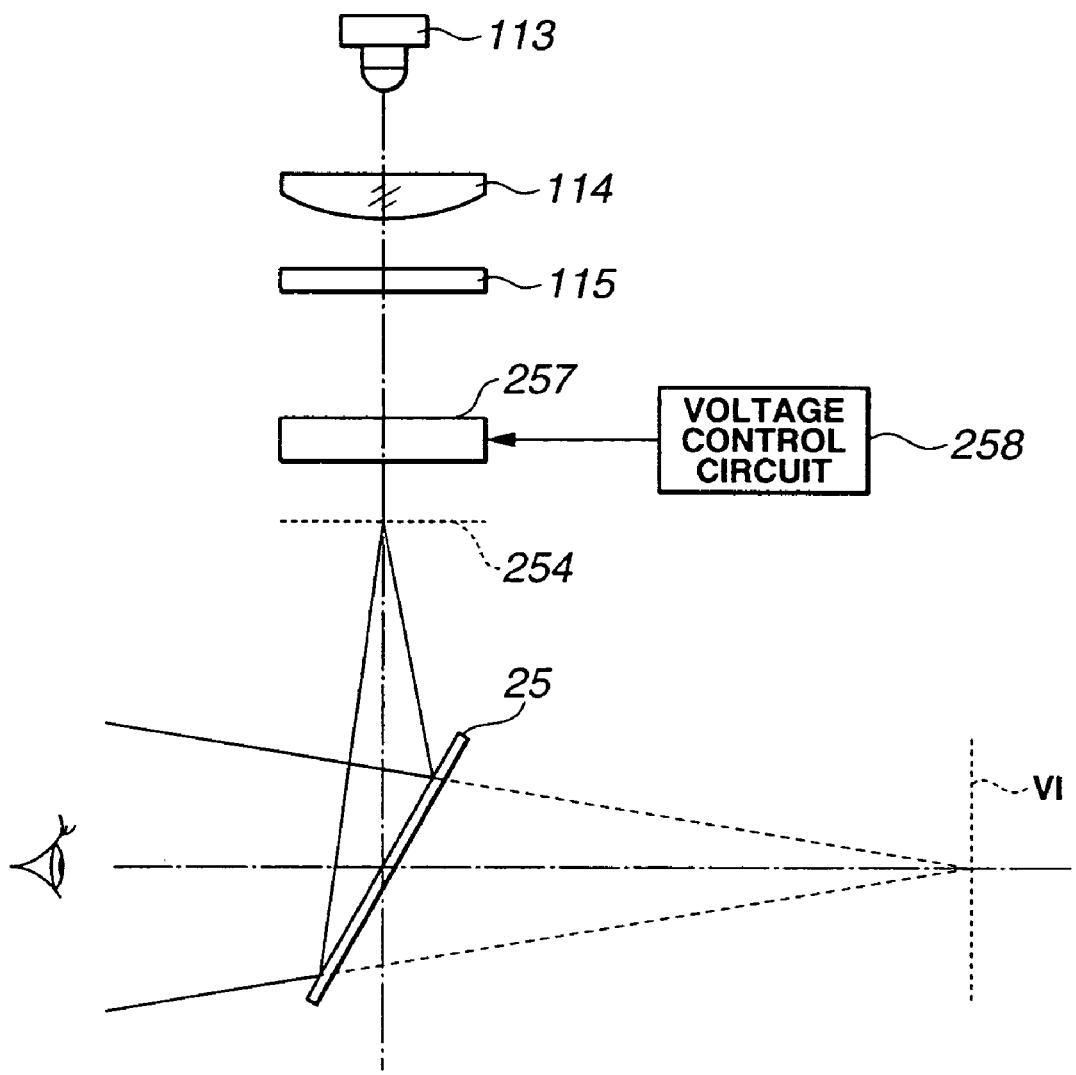
FIG. 18 is a diagram illustrating another configuration example wherein an LCD image is subjected to a primary image formation, and the position of this primary image formation is changed in the optical axial direction with the first embodiment.
Figure 19:
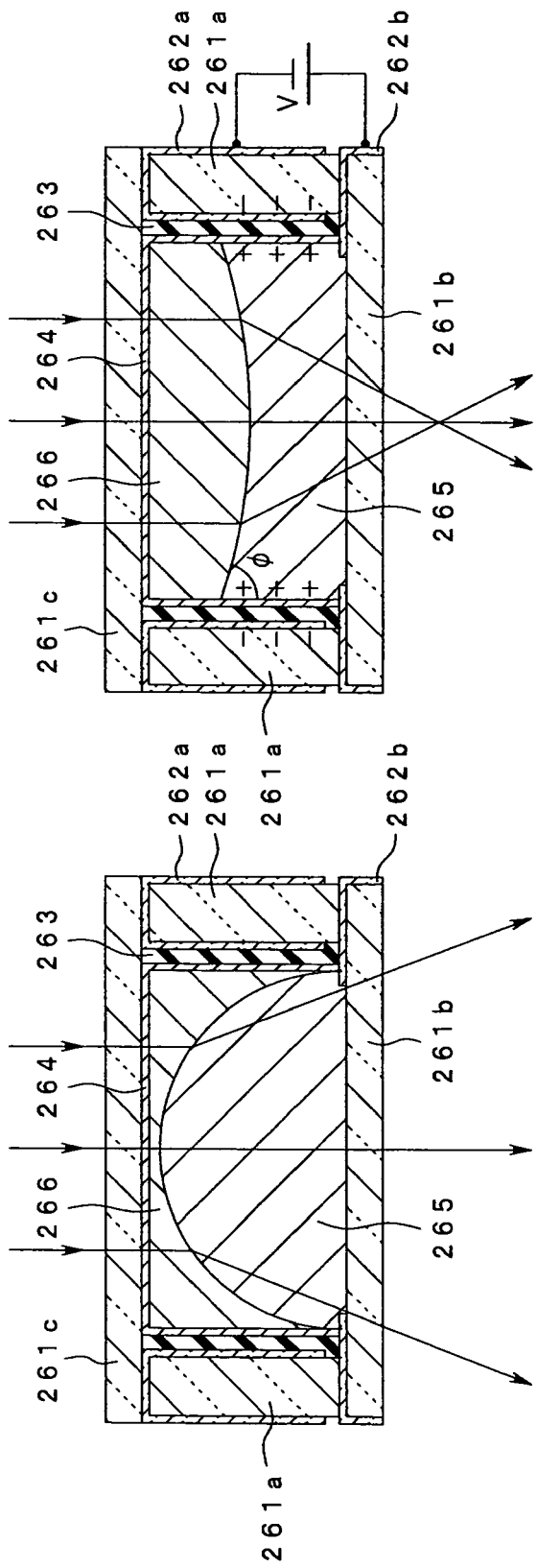
FIGS. 19A and 19B are diagrams illustrating the detailed configuration of a fluid focus lens in FIG. 18.

FIG. 18 is a diagram illustrating another configuration example wherein the image of the LCD is subjected to primary image formation, and the position of this primary image formation is moved in the optical axial direction, and FIGS. 19A and 19B are diagrams illustrating the detailed configuration of the fluid focus lens in FIG. 18.

The configuration example illustrated in FIGS. 18, 19A, and FIG. 19B employs a fluid focus lens 257 instead of the image formation lens 253 illustrated in FIG. 17. The fluid focus lens made public by Royal Phillips Electronics on Mar. 3, 2004, is employed as the fluid focus lens 257 described below, for example.

First, description will be made regarding the configuration of the fluid focus lens 257 with reference to FIGS. 19A and 19B.

As illustrated in FIGS. 19A and 19B, the fluid focus lens 257 is configured wherein transparent conducting fluid 265, and insulating fluid 266 having a refractive index (optical properties) different from this conducting fluid 265 without blending in with the conducting fluid 265 are sealed in a transparent short cylindrical member. An example of the conducting fluid 265 is aqueous fluid, and an example of the insulating fluid 266 is oil-based fluid. The interface between the conducting fluid 265 and the insulating fluid 266 makes up a lens surface.

The cylindrical member comprises a cylinder 261a made up of glass or the like, a circular plate 261b made up of glass or the like for sealing the bottom side of this cylinder 261a, and a circular plate 261c made up of glass or the like for sealing the top side of the cylinder 261a.

An electrode 262b having a cross-sectional general L-shape is provided from the periphery portion on the top side of the circular plate 261b to the circumferential surface, and also an electrode 262a having a cross-sectional general square shape with one end open is provided from the inner circumferential surface, outer circumferential surface, and top surface of the cylinder 261a, and these are disposed so as to be non-contact with each other.

A cylindrical insulating member 263 is disposed on the inner circumferential side of the cylinder 261a and the electrode 262a, the bottom side of this insulating member 263 is in contact with the electrode 262b, thereby insulating between the electrode 262a and the electrode 262b.

A hydrophobic coating 264 is provided from the inner circumferential side of the insulating member 263 to the bottom side of the circular plate 261c.

The conducting fluid 265 and the insulating fluid 266 are sealed within this hydrophobic coating 264. Note that the electrode 262b extends to the inner circumferential side more than the hydrophobic coating 264 so as to be electrically connected to the conducting fluid 265.

With such a configuration, when no voltage is applied to the electrodes 262a and 262b, the conducting fluid 265 is kept away by the hydrophobic coating 264, becomes a general hemispheric shape gathering to the bottom side, and the insulating fluid 266 is distributed to the portion contacting the hydrophobic coating 264 other than the general hemispheric shape as illustrated in FIG. 19A.

On the other hand, when a voltage V is applied to the electrode 262a and the electrode 262b so that the minus thereof is for the electrode 262a, and the plus thereof is for the electrode 262b, plus electric charges are propagated from the electrode 262b to the conducting fluid 265, as illustrated in FIG. 19B. Subsequently, minus electric charges are distributed on the surface of the electrode 262a, and also plus electric charges are distributed on the surface of the conducting fluid 265 facing the electrode 262a via the insulating member 263 and the hydrophobic coating 264. According to such electrical derivation, the surface tension of the conducting fluid 265 (more precisely, interface tension where the conducting fluid 265 comes into contact with the hydrophobic coating 264) changes. When surface tension changes, the conducting fluid 265 starts wetting the inner circumferential face of the hydrophobic coating 264. Such a process in which the hydrophobic property of the hydrophobic coating 264 is weakened by electric field is referred to as "electrowetting".

Thus, the curvature radius of the lens surface between the conducting fluid 265 and the insulating fluid 266 is changed by applying the voltage V, resulting in change of the focal distance of the lens.

Such change of the focal distance can be controlled by adjusting the voltage to be applied to between the electrode 262a and the electrode 262b. For example, the amount of electric charges to be distributed increases by increasing the voltage V to be applied, and the surface of the conducting fluid 265 forming a convex shape (generally hemispheric shape) as illustrated in FIG. 19A becomes completely flat (completely loses lens effects), or becomes a concave shape as illustrated in FIG. 19B. With the example illustrated in FIG. 19B, a contact angle φ is smaller than 90°. Thus, such a lens as a convergent lens is smoothly changed to a divergent lens, or smoothly returned to the original lens again can be realized.

FIG. 18 illustrates a configuration example wherein the fluid focus lens like those shown in FIGS. 19A and 19B is employed, and the position of the primary image formation of the image of the LCD 115 is moved.

More specifically, the fluid focus lens 257 serving as an image formation optical system and virtual image distance adjusting means is disposed on the optical path between the LCD 115 and the HOE 25, and the position 254 of the primary image formation surface of the image of the LCD 115 due to this fluid focus lens 257 can be modified by changing the voltage V to be applied to the fluid focus lens 257.

In other words, the voltage V to be applied to the fluid focus lens 257 is configured so as to be controlled by a voltage control circuit 258 serving as virtual image distance adjusting means.

This voltage control circuit 258 is connected to the fourth CPU 111 for example, and is controlled so that the distance Li to the virtual image VI of the photographing image frame is identical with the distance to the subject.

Note that at this time, upon the focal distance of the fluid focus lens 257 being changed, the magnification of the virtual image VI is also changed, so it is needless to say that the size of the photographing image frame to be displayed on the LCD 115 needs to be modified according to the focal distance of the fluid focus lens 257.

Employing such a configuration wherein the distance Li to the virtual image VI is identical with the distance to the subject by changing the focal distance of the fluid focus lens 257 simplifies the configuration of the device, thereby further promoting downsizing and weight saving. Furthermore, employing no actuator prevents noise from occurring, thereby preventing the photographer from having an uncomfortable feeling. Accordingly, such a configuration is particularly effective for an image system such as a head mounted-type camera, head mounted-type display device, and the like.

Note that FIG. 18 illustrates the example wherein the position of the virtual image VI is adjusted when the photographing image frame is displayed as the virtual image VI, but the present invention is not restricted to this example, it is needless to say that the present invention can be applied to the case of displaying an image or characters or the like as a virtual image (i.e., even in a display device for displaying an image or characters as a virtual image) as well.

Next, description will be made regarding a configuration example of the optical system of the line-of-sight-direction detection unit of the line-of-sight direction/angular velocity detection unit 7 with reference to FIGS. 20 and 21. FIG. 20 is a front view including a partial cross-section illustrating a configuration example of the optical system of the line-of-sight-direction detection unit, and FIG. 21 is a left-side view illustrating a configuration example of the optical system of the line-of-sight direction unit.

As illustrated in FIG. 20, the LED 125, condenser lens 126, reflection mirror 127, reflection mirror 131, image formation lens 132, bandpass filter 133, and CCD 134 are disposed in this order within the frame portion 13 on the upper position of the transparent optical member 14.

The half mirror 128 and the HOE 24 are disposed within the transparent optical member 14 on the lower position of the reflection mirror 127. The HOE 129 is further disposed within the transparent optical member 14 on the lateral position of the half mirror 128.

With such a configuration, when the LED 125 emits infrared light, this light is converted into parallel light flux by the condenser lens 126, and then is reflected vertically downwards by the reflection mirror 127.

The infrared light reflected by the reflection mirror 127 enters within the transparent optical member 14, passes through the half mirror 128 disposed within the transparent optical member 14, and is reflected toward the observer's eye by the HOE 24.

On the other hand, the infrared light reflected by the observer's eye is reflected upwards by the HOE 24, and further reflected sideward by the half mirror 128. This reflected light is further reflected upwards by the HOE 129, and reaches the reflection mirror 131 disposed within the frame portion 13.

The light reflected sideward by the reflection mirror 131 is subjected to image formation on the CCD 134 via the image formation lens 132 and the bandpass filter 133 as the image of the observer's eye according to the wavelength band of the infrared light reflected by the HOE 24.

The image signal converted by the CCD 134 is transferred to the image recording/editing device 4 via the CDS/AGC circuit 136, A/D converter 137, communication control unit 173, transmission/reception unit 172, and the like, the position of a Purkinje's image and the center position of the pupil are obtained at the first CPU 161 within the image recording/editing device 4 as described later, and further the line-of-sight direction is obtained from these relative relations.

Note that the half mirror 128 and the HOE 129 are disposed within the transparent optical member 14 for example, but the upper portion where the observer who mounts this head mounted unit 2 on the head and observes the subject cannot easily view is preferable as the position at this time.

With the configuration like that shown in FIGS. 20 and 21, the HOE 24 having high wavelength selectivity, and high reflectance as to the light of the selected wavelength band is employed, and also the bandpass filter 133 having the same wavelength selectivity is disposed in front of the CCD 134, thereby yielding a signal with a high S/N ratio.

According to such a configuration, the line-of-sight direction of the observer who is observing the subject can be obtained precisely.

Figure 22:
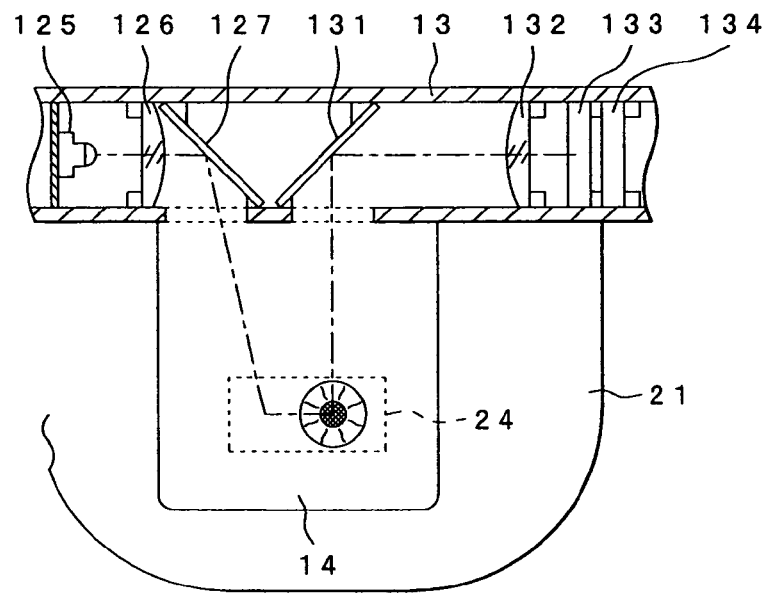
FIG. 22 is a front view including a partial cross-section illustrating another configuration example of the optical system of the line-of-sight-direction detection unit according to the first embodiment.
Figure 23:
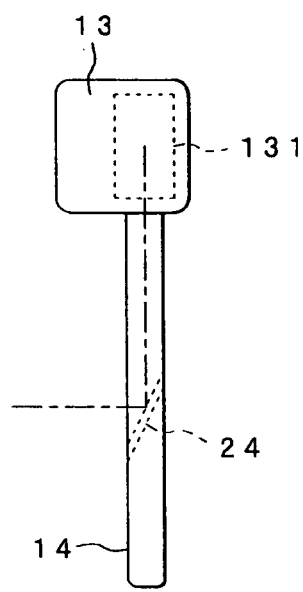
FIG. 23 is a left-side view illustrating another configuration example of the optical system of the line-of-sight-direction detection unit according to the first embodiment.

Next, description will be made regarding another configuration example of the optical system of the line-of-sight-direction detection unit of the line-of-sight direction/angular velocity detection unit 7 with reference to FIGS. 22 and 23. FIG. 22 is a front view including a partial cross-section illustrating another configuration example of the optical system of the line-of-sight-direction detection unit, and FIG. 23 is a left-side view illustrating another configuration example of the optical system of the line-of-sight-direction detection unit.

With the configuration like that shown in FIGS. 20 and 21, the half mirror 128 and the HOE 129 are directly exposed to the external light, so completely shielding the CCD 134 from the external light noise is difficult. On the other hand, with the configuration like that shown in FIGS. 22 and 23, the light path where the infrared light is projected to the observer's eye and the light path where the infrared light reflected by the observer's eye is received in the CCD 134 are completely separated.

In other words, with the optical system of this line-of-sight-direction detection unit, the half mirror 128 and the HOE 129 are omitted, and also the HOE 24 is configured so as to be longer in the horizontal direction than that shown in FIG. 20.

Subsequently, the infrared light reflected by the reflection mirror 127 obliquely enters the left side portion of this HOE 24, for example. The HOE 24 projects the infrared light from this reflection mirror 127 toward the observer's eye so as to be slightly inclined in the horizontal direction.

On the other hand, the reflected light from the observer's eye is received by the right side portion of the HOE 24 for example, and is reflected vertically straightly above toward the reflection mirror 131. The subsequent configuration and the like following this reflection mirror 131 is the same as those shown in FIGS. 20 and 21.

According to the configuration like that shown in FIGS. 22 and 23, the HOE 24 having high wavelength selectivity, and high reflectance as to the light of the selected wavelength band is employed, and also the bandpass filter 133 having the same wavelength selectivity is disposed in front of the CCD 134, thereby yielding a signal with a high S/N ratio. Only the HOE 24 is disposed in the transparent optical member 14 to which the external light is radiated, thereby reducing influence of the external light noise as compared with the configuration shown in FIGS. 20 and 21 wherein the half mirror 128 and the HOE 129 are disposed in the transparent optical member 14.

Note that propagation of the light within the transparent optical member 15 may be transparency alone like that shown in FIGS. 21 and 23, but a combination of transparency and total reflection within the transparent optical member 14 may be employed. In the event of performing an optical design so as to combine transparency with total reflection, the transparent optical member 14 may be reduced in thickness, thereby further promoting weight saving of the head mounted unit 2.

Figures 24A, 24B:
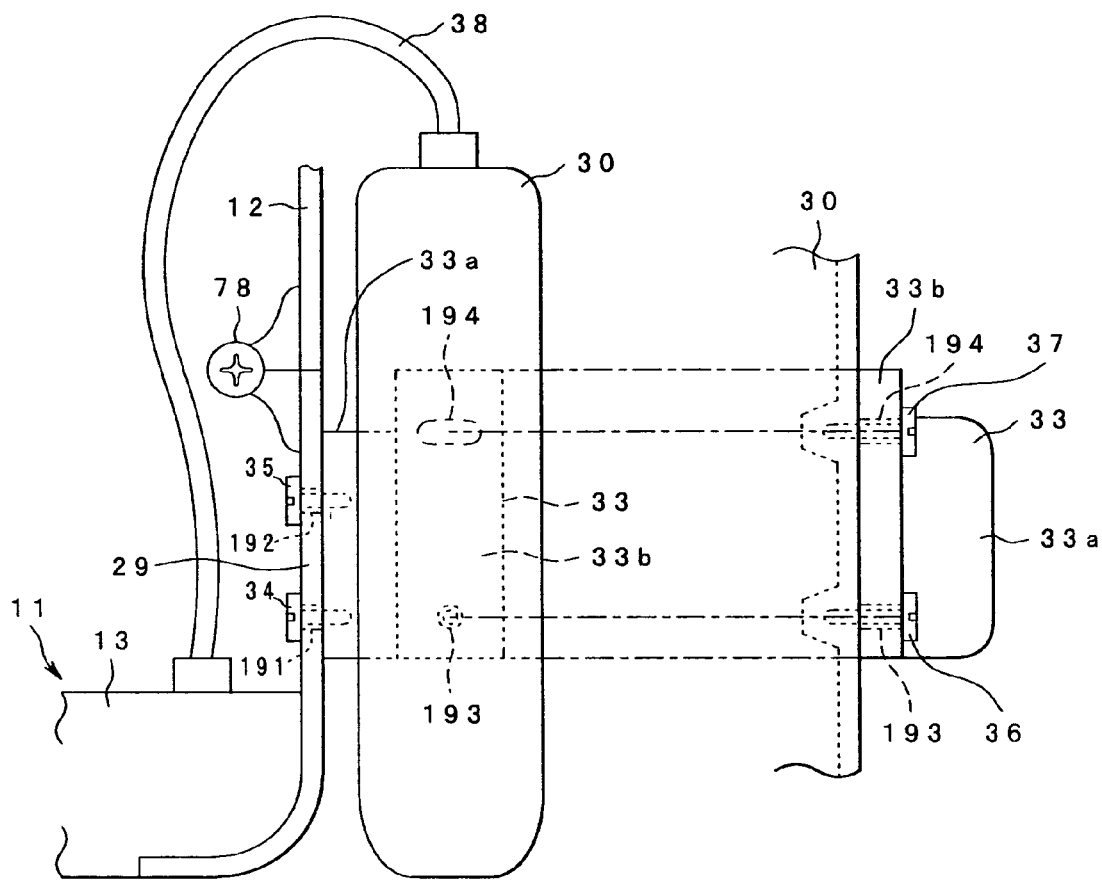
FIGS. 24A and 24B are a top view and a right-side view illustrating the configuration wherein an image capturing unit is attached to a frame portion with the first embodiment.
Figure 25:
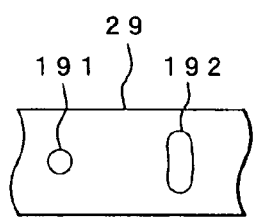
FIG. 25 is a right-side view illustrating the configuration of holes provided in the frame portion for attaching the image capturing unit with the first embodiment.

Next, description will be made regarding a configuration wherein the image capturing unit 30 is attached to the side face of the frame portion 13 so as to be relatively adjustable in the pitch direction and in the yew direction with reference to FIGS. 24A through 25. FIGS. 24A and 24B are a top view and a right-side view illustrating the configuration wherein the image capturing unit 30 is attached to the frame portion 13, and FIG. 25 is a right-side view illustrating the configuration of holes provided in the frame portion 13 for attaching the image capturing unit 30.

With the image system 1 according to the present embodiment, the photographer specifies a photographing image frame indicating a photographing range, and performs photographing with a field angle corresponding to the viewing angle of the specified photographing image frame, and accordingly, the image system 1 needs to correct parallax. Factors for causing this parallax include the positional offset between the photographer's visual axis and the photographing optical axis in the horizontal direction, and the angular offset between the visual axis and the photographing optical axis, but the latter angular offset gives great influence, so an adjusting mechanism (adjusting means) capable of correcting this angular offset precisely is provided.

As illustrated in FIG. 24A, the frame portion 13 and the temple portion 12 are connected in a collapsible manner via the hinge 78. This hinge 78 is disposed apart from the front portion 11 side than the hinge 79 on the right-eye side via the longish joint 29 extended from the frame portion 13.

The seat 33 serving as an adjusting mechanism (adjusting means) in a generally L-shape as viewed from the front face, which includes a shaped portion 33a along the side face of the joint 29 and a shaped portion 33b generally vertically erected from the side face, is connected to the side face of the joint 29. This adjusting mechanism is a mechanism for adjusting the relative angle between the front portion 11 and the image capturing unit 30 in the head-mounted-type camera adjusting device to which the adjusting method of the head-mounted-type camera is applied, and the optical axis of the photographing optical system 31 included in the image capturing unit 30 and the photographer's viewing axis can be adjusted by using this adjusting mechanism.

More specifically, as illustrated in FIG. 25, a hole 191 serving as pitch direction adjusting means is opened on the front side of the joint 29, and a slot 192 serving as pitch direction adjusting means in a circular arc shape centered on the hole 191 is opened on the rear side of the joint 29 respectively. The seat 33 is attached to the joint 29 by screwing the shaped portion 33a of the seat 33 with the screws 34 and 35 serving as pitch direction adjusting means via these holes 191 and 192 respectively.

Similarly, as illustrated in FIG. 24A, a hole 193 serving as yew direction adjusting means is opened on the front side of the shaped portion 33b of the seat 33, and a slot 194 serving as yew direction adjusting means in a circular arc shape centered on the hole 193 is opened on the rear side of the shaped portion 33b of the seat 33 respectively. As illustrated in FIG. 24B, the image capturing unit 30 is attached to the seat 33 by screwing the bottom side of the image capturing unit 30 with the screws 36 and 37 serving as yew direction adjusting means via these holes 193 and 194 respectively. Note that the cable 38 is extended from the back side of the image capturing unit 30, and is curved on the subject side, following which is connected to electric circuits and the like within the frame portion 13.

With such a configuration, the seat 33 turns centered on the screw 34 by changing the position within the slot 192 through which the screw 35 passes in a state wherein the screw 34 and screw 35 are somewhat loosened, thereby performing angular adjustment in the pitch direction of the seat 33, i.e., of the image capturing unit 30 attached to the seat 33. Thus, following the angular adjustment for the desired position, the screw 34 and the screw 35 should be fastened.

Similarly, the image capturing unit 30 turns centered on the screw 36 as to the seat 33 by changing the position within the slot 194 through which the screw 37 passes in a state wherein the screw 36 and screw 37 are somewhat unfastened, thereby performing angular adjustment in the yew direction of the of the image capturing unit 30. Thus, following the angular adjustment for the desired position, the screw 36 and the screw 37 should be fastened.

According to such a configuration, the angular adjustment of the relative pitch direction and relative yew direction between the see-through image display unit 6 and the image capturing unit 30 may be performed. Furthermore, the image capturing unit 30 is fixed to the front portion 11 via the seat, so the image capturing unit 30 is never folded back even when the temple portion 12 is folded back, thereby reducing the possibility of causing the relative offset between the image capturing unit 30 and the see-through image display unit 6. Also, the adjusting mechanism is simple, so an inexpensive configuration may be made.

Note that the aforementioned description has been made wherein the angle in the relative yew direction between the image capturing unit 30 and the seat 33 is adjusted by changing the position within the slot 194 through which the screw 37 passes, and the angle in the relative pitch direction between the joint 29 of the side face of the frame portion 13 and the seat 33 is adjusted by changing the position within the slot 192 through which the screw 35 passes, but an arrangement may be made wherein the angle in the relative pitch direction between the image capturing unit 30 and the seat 33 is adjusted by changing the attachment position of the image capturing unit 30 as to the seat 33, the angle in the relative yew direction between the joint 29 on the side face of the frame portion 13 and the seat 33 is adjusted by changing the attachment position of the frame portion 13 as to the seat 33.

Next, description will be made regarding an image display example using the see-through image display unit 6 with reference to FIGS. 26 through 36.

Figure 26:
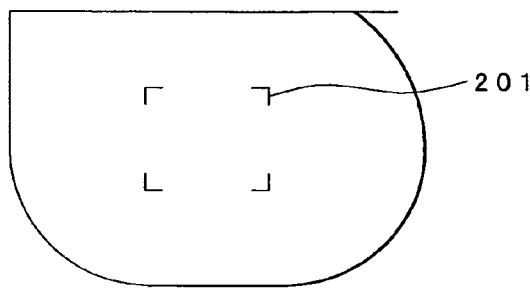
FIG. 26 is a diagram illustrating a display example of the initial state in see-through display according to the first embodiment.

FIG. 26 is a diagram illustrating a display example in an initial state at the time of see-through display. Display as illustrated in FIG. 26 is performed when the camera 1 is turned on, or when the system is reset. At this time, as illustrated in the drawing, the photographing image frame 201 indicating a photographing range equivalent to the standard lens (field angle is assumed to be 50°, for example) is see-through displayed (i.e., the photographing image frame 201 is see-through displayed such that the viewing angle as viewed from the photographer becomes 50°).

Figure 27:
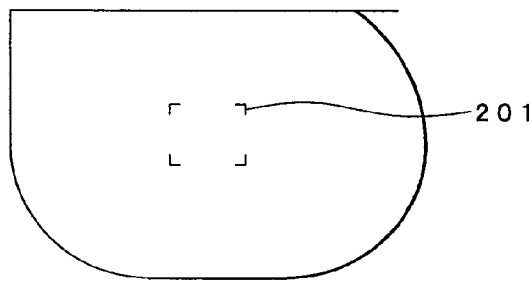
FIG. 27 is a diagram illustrating a display example when zooming to the telescopic side is performed with the first embodiment.

FIG. 27 is a diagram illustrating a display example when zooming to the telescopic side is performed. The photographing image frame 201 to be displayed indicates not that shown in FIG. 26 but a photographing range corresponding to telescopic photographing. Modification of this photographing image frame 201 is performed by operating the zoom switches 75 for example, as described above, at this time, the focal distance of the photographing optical system 31 is modified so that the photographing field angle of the image capturing unit 30 is identical to the viewing angle of the photographing image frame 201. More specifically, modification to the telescopic side as illustrated in FIG. 27 is performed by operating the telescopic switch 75a of the zoom switches 75 with a photographing range corresponding to the focal distance of the standard lens like that illustrated in FIG. 26.

Figure 28:
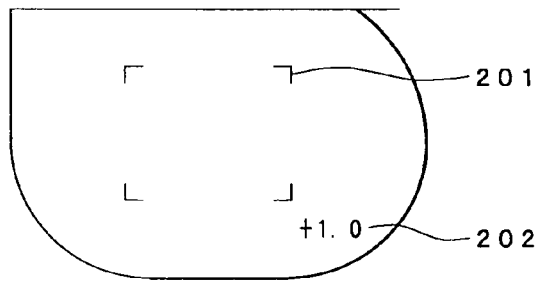
FIG. 28 is a diagram illustrating a display example when zooming to the wide side and exposure correction are performed with the first embodiment.

FIG. 28 is a diagram illustrating a display example when zoom to wide and exposure correction are performed. The photographing image frame 201 to be displayed indicates not shown in FIG. 26 but a photographing range corresponding to wide photographing, and also the amount of exposure correction is displayed, for example, on the lower right of the photographing image frame 201 as information display 202. With the example shown in this drawing, exposure correction of +1.0 is performed by operating the exposure correction switches 76, for example. Note that it is needless to say that exposure correction is not restricted to numeric display, various type of display such as a bar graph, a guide post, or the like may be employed. Also, the photographing image frame 201 as shown in FIG. 28 is set by operating the wide switch 75b of the zoom switches 75 with a photographing range corresponding to the focal distance of the standard lens like that shown in FIG. 26, for example.

Figure 29:
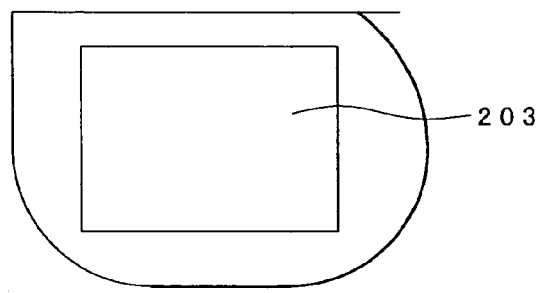
FIG. 29 is a diagram illustrating a display example when performing electronic view display with the first embodiment.

FIG. 29 is a diagram illustrating a display example upon performing electronic view display. For example, when the photographer selects the view mode (V) using the F/V switch 72 for example, an electronic image 203 captured by the image capturing unit 30 is projected on the photographer's eye as a virtual image. Note that the size of an image to be displayed as this electronic view can be set by specifying resolution of the image. For example, in the case of a low resolution image, the image should be displayed in a small size.

Figure 30:
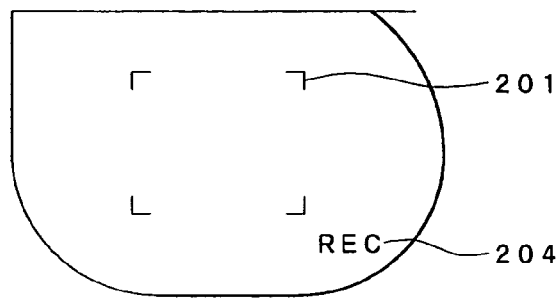
FIG. 30 is a diagram illustrating a display example while recording moving images with the first embodiment.

FIG. 30 is a diagram illustrating a display example while recording moving images. For example, when the photographer changes the current state to a recording state by operating the recording switch 74, the photographing image frame 201 indicating a photographing range is displayed as illustrated in FIG. 30, and also information display 204 indicating a recording state is displayed, for example, on the lower right of the photographing image frame 201 as characters "REC". Display indicating a recording state is also not restricted to characters as with the aforementioned description.

Figure 31:
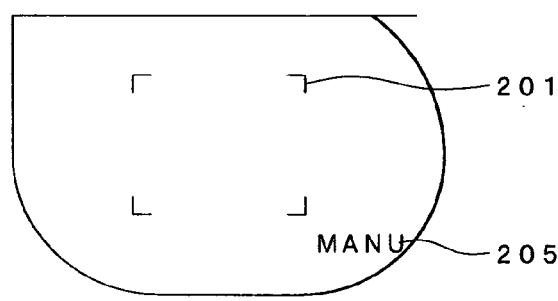
FIG. 31 is a diagram illustrating a display example at the time of the manual mode with the first embodiment.

FIG. 31 is a diagram illustrating a display example in the manual mode. For example, when the photographer sets the manual mode (M) using the FA/A/M switch 71, information display 205 indicating the manual mode (M) is displayed, for example, on the lower right of the photographing image frame 201 as characters "MANU". On the other hand, when the information display 205 is not displayed, this means that the current mode is the auto mode (A).

Figure 32:
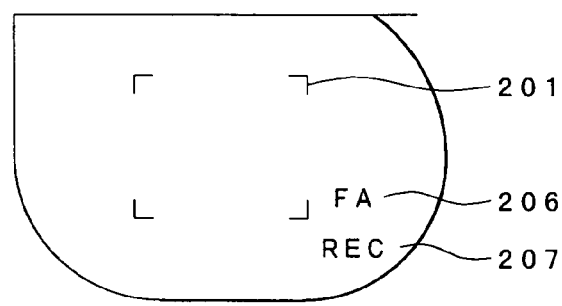
FIG. 32 is a diagram illustrating a display example while recording moving images in the full-auto mode with the first embodiment.

FIG. 32 is a diagram illustrating a display example while recording moving images in the full-auto mode. For example, when the photographer sets the full-auto mode by operating the FA/A/M switch 71, and also changes the current state to a recording state using the recording switch 74, the photographing image frame 201 indicating a photographing range is displayed as illustrate in FIG. 32, and also information display 206 indicating that the current mode is the full-auto mode as characters "FA" and information display 207 indicating that the current state is a recording state as characters "REC" are displayed, for example, on the lower right of the photographing image frame 201. These display indicating the full-auto mode and a recording state are not restricted to characters as with the aforementioned description.

Figure 33:
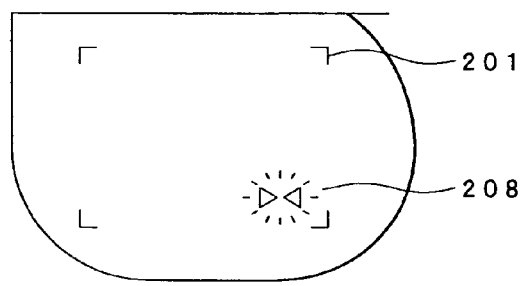
FIG. 33 is a diagram illustrating warning display to be see-through displayed in the event of attempting to exceed the lower limit regardless of the focal distance of the photographing optical system reaching the focal-adjustable lower limit with the first embodiment.

FIG. 33 is a diagram illustrating a display example of warning display 208 to be see-through displayed in the event of attempting to exceed the lower limit regardless of the focal distance f of the photographing optical system 31 reaching a focal-adjustable lower limit k1. More specifically, when the photographer performs a zoom operation to the wide side, and reaches the wide margin of zoom, but still continues the zoom operation to the wide side, this warning display 208 is displayed as well as the photographing image frame 201 indicating a photographing range.

Figure 34:
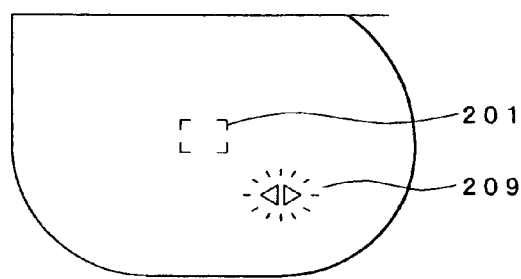
FIG. 34 is a diagram illustrating warning display to be see-through displayed in the event of attempting to exceed the upper limit regardless of the focal distance of the photographing optical system reaching the focal-adjustable upper limit with the first embodiment.

FIG. 34 is a diagram illustrating a display example of warning display 209 to be see-through displayed in the event of attempting to exceed the upper limit regardless of the focal distance f of the photographing optical system 31 reaching a focal-adjustable upper limit k2. More specifically, when the photographer performs a zoom operation to the telescopic side, and reaches the telescopic margin of zoom, but still continues the zoom operation to the telescopic side, this warning display 209 is displayed as well as the photographing image frame 201 indicating a photographing range.

Figure 35:
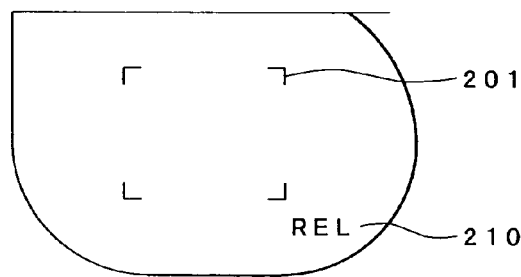
FIG. 35 is a diagram illustrating a display example when performing an operation for photographing a still image with the first embodiment.

FIG. 35 is a diagram illustrating a display example when the photographer performs a still image photographing operation. At this time, the photographing image frame 201 indicating a photographing range is displayed, and also information display 210 indicating that a still image is recorded is displayed, for example, on the lower right of the photographing image frame 201 as characters "REL". This display indicating that a still image is recorded is not restricted to characters as with the aforementioned description.

Figure 36:
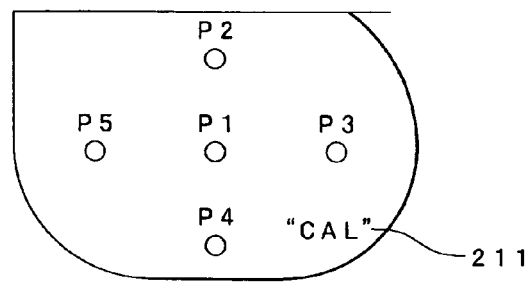
FIG. 36 is a diagram illustrating a display example in the calibration mode according to the first embodiment.

FIG. 36 is a diagram illustrating a display example in the calibration mode. For example, when the photographer selects the calibration mode by operating the menu button 63, menu selection switches 66, 67, 68, and 69, determinant switch 65, or the like of the first operating switches 162, display as illustrated in FIG. 36 is displayed. More specifically, information display 211 indicating that the current mode is the calibration mode is displayed, for example, on the lower right of the field of view as characters "CAL", and also calibration guide posts P1 through P5 are further sequentially displayed with blinking as described later. Of these guide posts, the guide post P1 is displayed on the center portion of the field of view, P2 on the upper portion of the field of view, P3 on the right-side portion, P4 on the lower portion, and P5 on the left-side portion respectively.

Note that with the aforementioned respective information display, ordinary information display is preferably performed by emitting, for example, the green diode of the LED 113, and the warning display is preferably performed by emitting, for example, the red diode of the LED 113.

Figure 37:
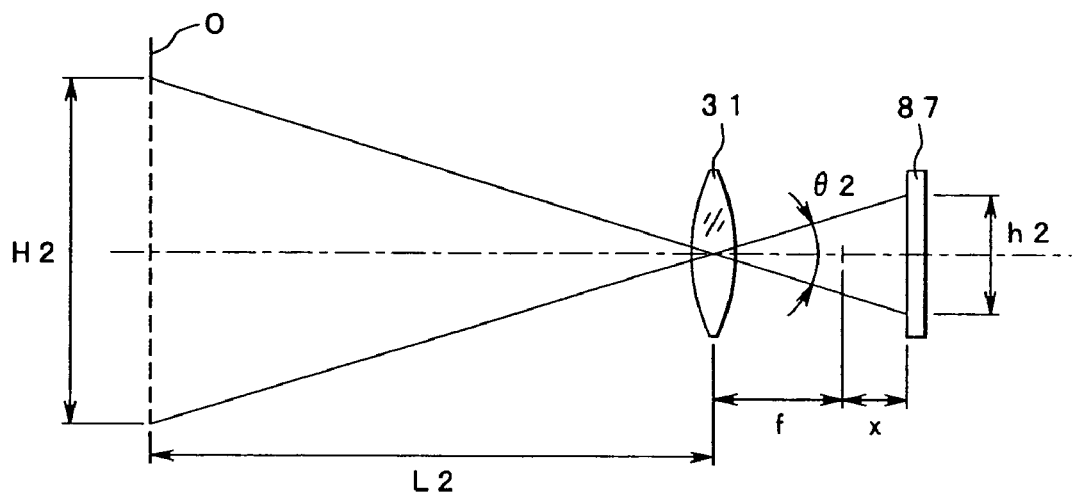
FIG. 37 is an explanatory diagram for describing optical relations between a subject, the photographing optical system, and a CCD with the first embodiment.

Next, description will be made regarding the principle of parallax correction based on a distance to a subject as described above with reference to FIGS. 37 through 39. FIG. 37 is an explanatory diagram for describing optical relations between the subject, the photographing optical system 31, and the CCD 87, FIG. 38 is an explanatory diagram for describing optical relations between a HOE, a virtual image formed on this HOE, and the eye, and FIG. 39 is an explanatory diagram for describing the amount-of-shift necessary for correcting parallax.

As illustrated in FIG. 37, let us say that the size in the horizontal direction of the image capturing region of the CCD 87 is h2, the focal distance of the photographing optical system 31 is f, the distance from the principal point of the photographing optical system 31 to the CCD 87 is f+x, the distance from the principal point of the photographing optical system 31 to a subject O is L2, the length in the horizontal direction of the subject O to be photographed by the CCD 87 is H2, and the photographing field angle in the horizontal direction is θ2. In this case, a relational expression like that shown in Expression 3 is satisfied.

$$\tan\left(\frac{\theta 2}{2}\right) = \frac{\frac{h2}{2}}{(f+x)} \quad \text{[Expression 3]}$$

Figure 38:
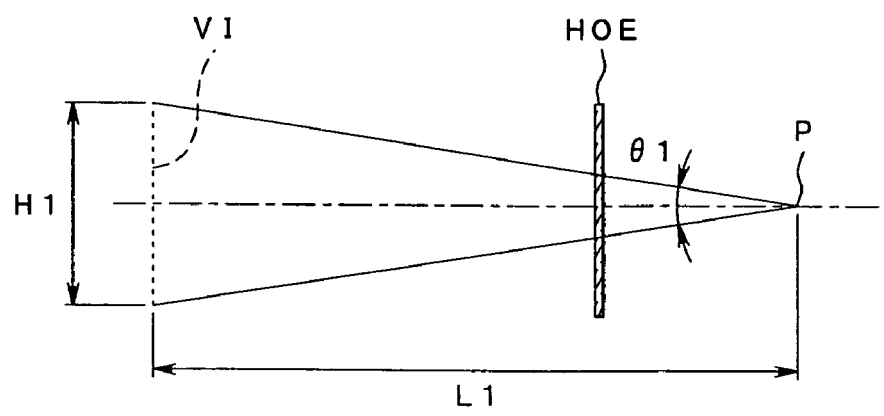
FIG. 38 is an explanatory diagram for describing optical relations between an HOE, a virtual image formed on this HOE, and the eye with the first embodiment.
Figure 39:
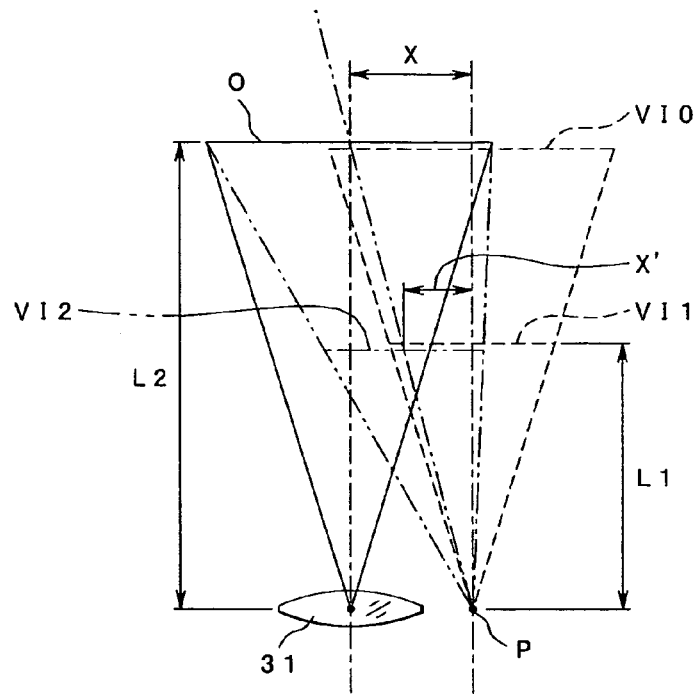
FIG. 39 is an explanatory diagram for describing the amount-of-shift of a virtual image necessary for correcting parallax with the first embodiment.

As illustrated in FIG. 38, let us say that the distance from the position of the photographer's pupil P to the position of the photographing image frame in the horizontal direction indicating a photographing range (virtual image VI) is L1, the length in the horizontal direction of the photographing image frame is H1, and the photographer's viewing angle of the photographing image frame between the position of the pupil P and the length H1 in the horizontal direction is θ1. In this case, a relational expression like that shown in Expression 4 is satisfied.

$$\tan\left(\frac{\theta 1}{2}\right) = \frac{\frac{H1}{2}}{L1} \quad \text{[Expression 4]}$$

In order to perform photographing within a photographing range set by the photographer, the photographing field angle needs to be equal to the photographer's viewing angle, i.e., the relation θ2=θ1 needs to be held. Under conditions satisfying this θ2=θ1, the focal distance f of the photographing optical system 31 is obtained as shown in the following Expression 5 so that the right side of Expression 3 is identical with the right side of Expression 4.

$$f = \frac{L1}{H1} \cdot h2 - x \quad \text{[Expression 5]}$$

On the other hand, the following Expression 6 holds according to the image formation principle of lenses.

$$\frac{1}{L2} + \frac{1}{f+x} = \frac{1}{f} \quad \text{[Expression 6]}$$

The following Expression 7 is derived by eliminating x from both Expression 5 and Expression 6.

$$f = \frac{h2}{\frac{h2}{L2} + \frac{H1}{L1}} \quad \text{[Expression 7]}$$

If a subject distance L2 can be obtained from this Expression 7, it is understandable that the focal distance f can be obtained.

Here, with an ordinary subject, the relation of h2/L2<<H1/L1 holds, so when simplifying computation, or when there is no means for obtaining the subject distance, an approximate value can be obtained using the following Expression 8.

$$f \cong \frac{L1}{H1} \cdot h2 \quad \text{[Expression 8]}$$

Next, description will be made regarding the parallax correction principle with reference to FIG. 39.

First, the preconditions at the time of describing the parallax correction principle are that the optical axial direction of the photographing optical system 31 and the direction of the photographer's viewing axis are both orthogonal as to the photographer's face, and these optical axis and viewing axis are disposed with an interval X. Parallax is caused by the interval X between the optical axis and viewing axis. Note that in the event that the optical axis and viewing axis are relatively inclined, this may become a factor for causing great parallax, so adjustment is necessary for parallelizing these axes. Consequently, adjustment between the optical axis and viewing axis is performed using an adjusting mechanism like that shown in FIGS. 24A through 25.

As illustrated with a solid line and a dashed line in FIG. 39, if the distance to the virtual image VI0 of the photographing image frame indicating a photographing range and the distance to the subject O are identical, the amount of offset (parallax) between the range where the photographer is observing and the range where the image capturing unit 30 is capturing an image becomes X, and remains unchanged. However, in reality, the distance L1 from the photographer's pupil P to the virtual image VI1 is different from the distance L2 from the principal point of the photographing optical system to the subject O, so a parallax correction amount X' for matching the range indicated by the photographing image frame as a virtual image with the real image capturing range is represented by the following Expression 9.

$$X' = \frac{L1}{L2} \cdot X \quad \text{[Expression 9]}$$

Let us say that the reciprocal number of the magnification of the virtual image VI1 of the photographing image frame (i.e., the ratio of the virtual image as to the image to be displayed on the LCD 115) is β. In this case, a shift amount SP of the image to be displayed on the LCD 115 for correcting parallax is represented by the following Expression 10.

$$SP = \beta \cdot X' = \frac{L1}{L2} \cdot \beta \cdot X \quad \text{[Expression 10]}$$

Accordingly, the fourth CPU 111 controls the LCD driver 117 so that the position of the image to be displayed on the LCD 115 is shifted by the amount SP represented by Expression 10. Thus, the position of the virtual image VI1 is shifted by a distance X' to become a virtual image VI2, as illustrated with a chain line in FIG. 39, the range indicated by the photographing image frame of the virtual image agrees with the real image capturing range.

As described above, the shift amount SP for performing parallax correction depends on the subject distance L2, so fundamentally, parallax correction should be performed each time the subject distance changes.

However, upon taking the case of β=1/100, L1=2 m, L2=2 m, X=4 cm for instance, the shift amount SP becomes 0.4 mm, but if this parallax correction amount is converted into a visual angle Sθ using the following Expression 11, the angle becomes around 1°, and accordingly, not so great parallax occurs.

$$S\theta = \tan^{-1}\left(\frac{X}{L2}\right) \quad \text{[Expression 11]}$$

Thus, in the case of performing ordinary photographing, we can determine that there is almost no need to perform parallax correction. On the other hand, we can find that the case in which the viewing angle Sθ becomes greater since the expression within parentheses of the right side of Expression 11 is proportional to the reciprocal number of the subject distance L2, and consequently, parallax correction using Expression 10 is necessary is when the L2 is small, i.e., when performing close-up photographing.

Note that with the aforementioned description, the subject distance L2 is obtained based on the principle of triangular distance measurement. More specifically, the light of the projecting-light LED 16a is projected on the subject, the light reflected from the subject is subjected to image capturing at the CCD 87, and the subject distance L2 is obtained from the position of the image on the CCD 87 based on the principle of triangular distance measurement.

The L2 is the subject distance in the line-of-sight direction, so the projecting-light LED 16a should be disposed as closer to the eye to be subjected to line-of-sight detection as possible so as to perform projection of light in the line-of-sight direction (θ) using means for controlling a known projecting light direction.

Further, an arrangement may be made wherein the subject distance L2 is obtained from the position of the focus lens 85 when performing auto-focus instead of obtaining the subject distance based on the aforementioned principle of triangular distance measurement. More specifically, let us assume that the position of the subject is infinite, the focus lens 85 is moved to the position where the high-frequency components of the image signal of the subject within a certain range of the same field angle as the line-of-sight direction (θ) become maximal, by the AF processing circuit 98 like that shown in FIG. 11 (focus detection is performed using a so-called contrast method), and the subject distance L2 is obtained inversely from the position of this focus lens 85. In this case, strictly speaking, the subject in the line-of-sight direction (θ) is not identical with the subject of the same field angle as the line-of-sight direction (θ), which is subjected to the AF processing, but the subject has a certain size, thereby causing no practical problem.

Figure 40:
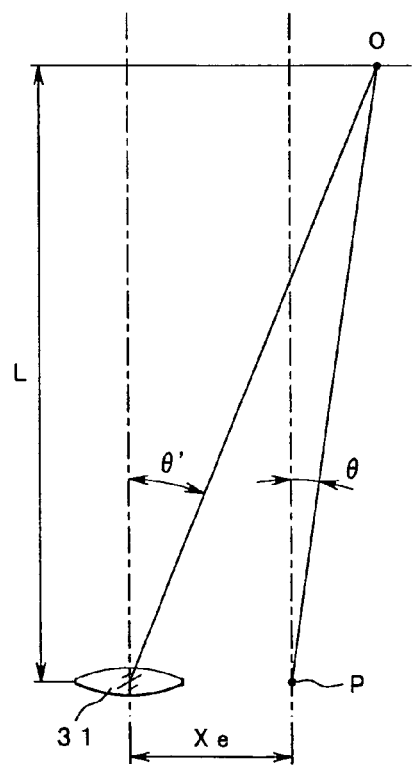
FIG. 40 is a diagram illustrating the angular relation when viewing a subject in the line-of-sight direction from the image capturing unit with the first embodiment.

Next, description will be made regarding a technique for considering parallax caused by the arrangement wherein the image capturing unit 30 and the line-of-sight-direction detection unit of the line-of-sight direction/angular velocity detection unit 7 are disposed with a certain distance with reference to FIG. 40. FIG. 40 is a diagram illustrating the angular relation when viewing a subject in the line-of-sight direction from the image capturing unit.

For example, let us consider the case in which the photographing optical system 31 of the image capturing unit 30 is focused on the subject in the line-of-sight direction detected by the line-of-sight direction/angular velocity detection unit 7. When the photographer is far from the subject, the subject in the line-of-sight direction of the photographer as viewed from the image capturing unit 30 is generally identical to the subject at which the photographer is gazing, but as the photographer approaches the subject, offset occurs between both. Accordingly, even in the event of focusing on the subject in a mismatched position, the photographer cannot always focus on the subject at which the photographer is gazing. FIG. 40 illustrates an example of the positional relation when such parallax occurs.

Now, let us say that the photographer is gazing at the subject O at the distance L in the direction making up angle θ as to the viewing axis in parallel with the optical axis of the photographing optical system 31, at this time, the distance between the optical axis of the photographing optical system 31 and the photographer's pupil is Xe, and also the angle between the optical axis of the photographing optical system 31 and the line connecting the principal point H of the photographing optical system 31 with the subject O is θ'. In this case, the following Expression 12 holds.

$$\tan\theta' = \tan\theta + \frac{X_e}{L} \quad \text{[Expression 12]}$$

Accordingly, in this case, the angle θ' is obtained by substituting in this Expression 12, the line-of-sight direction θ detected by the line-of-sight direction/angular velocity detection unit 7, the subject distance L detected by the AF processing circuit 98 or the like, and the Xe determined in design, and then the focus of the photographing optical system 31 should be adjusted to the subject corresponding to the direction of this obtained angle θ'. Note that in the event that the subject distance L is great, the second item of the right side of Expression 12 can be ignored, so the angle θ' and angle θ is similar, i.e., we can find that influence of parallax need not be considered basically.

Note that the subject distance L may be obtained based on the principle of triangular distance measurement as described above, or may be obtained based on the results of focal detection using the contrast method.

Figure 48:
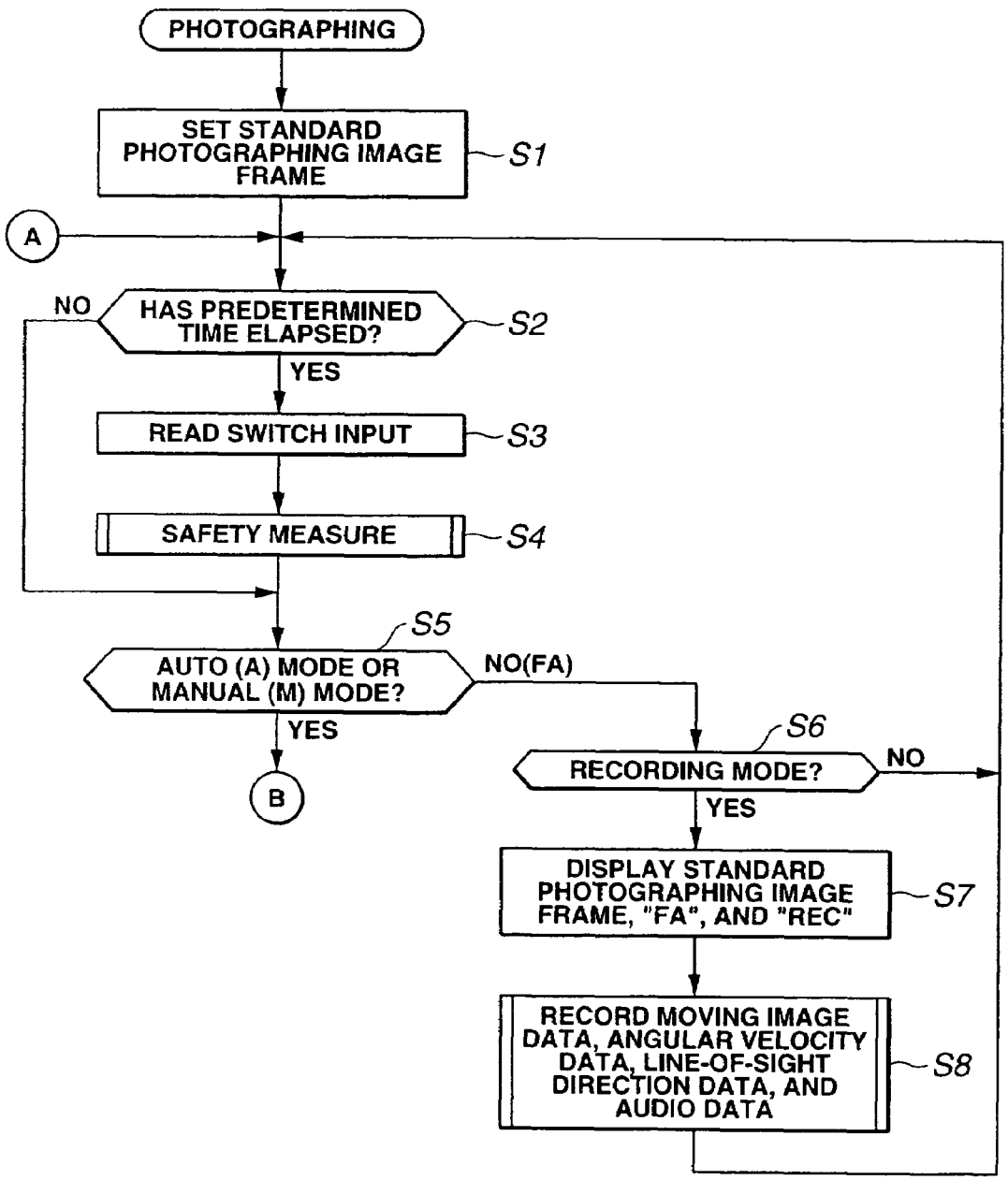
FIG. 48 is a flowchart illustrating part of operation of the image system according to the first embodiment.
Figure 49:
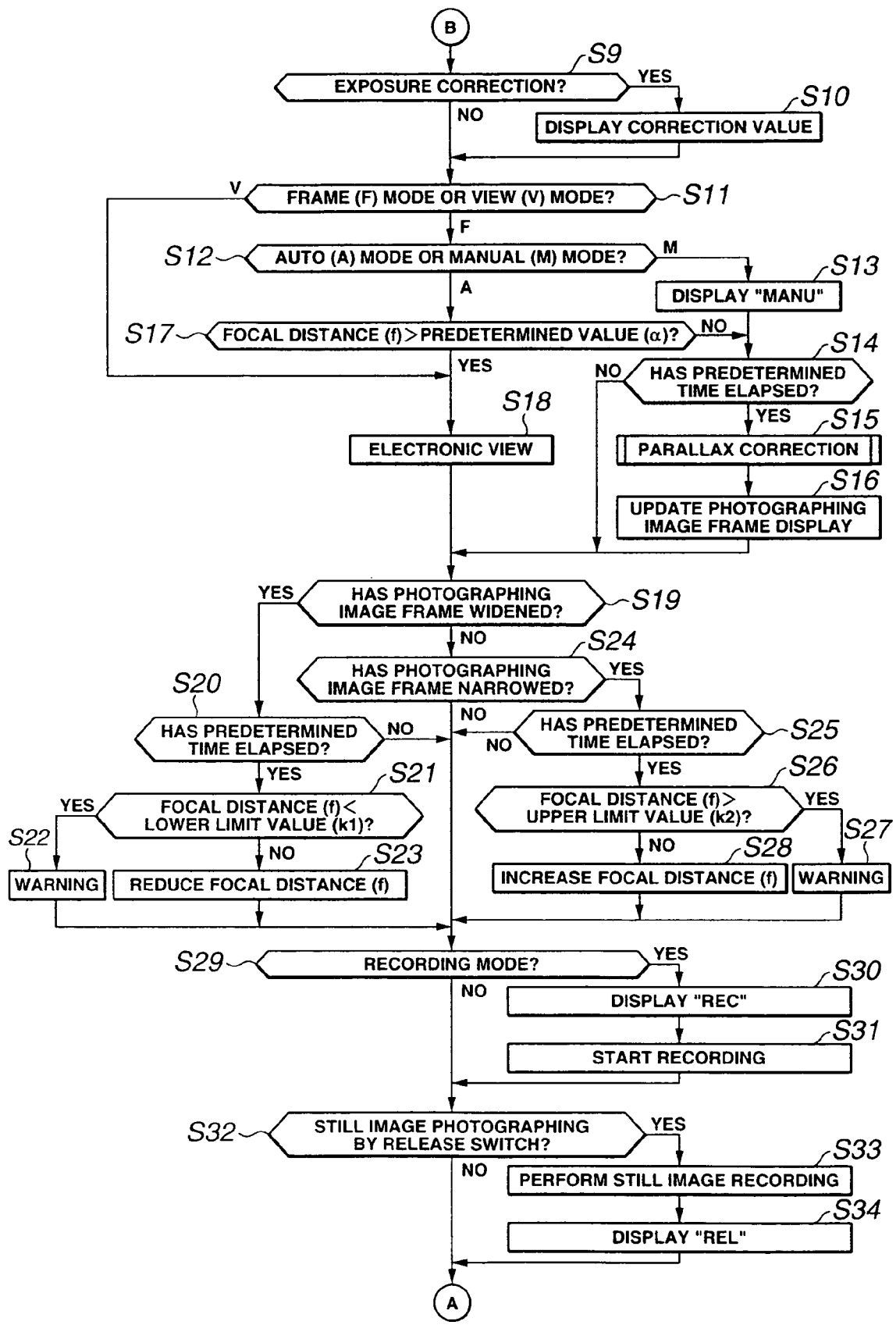
FIG. 49 is a flowchart illustrating another part of operation of the image system according to the first embodiment.

Next, description will be made regarding operation of the aforementioned image system with reference to FIGS. 48 and 49. FIG. 48 is a flowchart illustrating part of operation of the image system, and FIG. 49 is a flowchart illustrating another part of operation of the image system. That is to say, these FIGS. 48 and 49 illustrate the operation flow of the image system in a divided manner for the sake of drawing space.

When the image system 1 is turned on, or when the system is reset, the photographing image frame indicating a photographing range equivalent to the standard lens (for example, field angle becomes 50°, as described above) is see-through displayed like that shown in FIG. 26 by the see-through image display unit 6 (Step S1).

Next, determination is made whether or not a predetermined period has elapsed by checking the timer 123 included in the second CPU 121 (Step S2).

Here, in the event that determination is made that a predetermined period has elapsed, the input status of various types of switches such as the first operating switches 162 like that shown in FIG. 8, the second operating switches 171 like that shown in FIG. 10, and the like is monitored (Step S3).

Note that the timer in Step S2 starts timekeeping again when the flow proceeds to Step S3 following a predetermined period elapsing. When a predetermined period has not elapsed yet, monitoring of the switches in Step S3 is not performed. Thus, the load for each CPU can be reduced by confirming input status of the switches at a certain interval while checking the timer, and also malfunction due to chattering of the switches can be prevented. The timers in later-described Steps S14, S20, and S25 serve the same function as the timer in Step S2.

When the processing in Step S3 is complete, a later-described danger prevention subroutine is executed (Step S4).

When the processing in Step S4 is complete, or when determination is made that a predetermined period has not elapsed yet in Step S2, determination is made whether the image system 1 is set in either the auto mode (A) or the manual mode (M), or whether the image system 1 is set in the mode other than these (i.e., full-auto mode (FA)) (Step S5). This mode setting is performed by operating the FA/A/M switch 71, as described above.

Here, when determination is made that the image system 1 is set in the full-auto mode (FA), determination is made whether or not the recording mode due to the recording switch 74 is set (Step S6).

Here, when the recording mode is not set, the flow returns to Step S2, and the aforementioned processing is repeatedly performed.

Also, when determination is made that the recording mode is set in Step S6, the standard photographing image frame is set, and also information display 206 (characters "FA") indicating that the current mode is the full-auto mode, and information display 207 (characters "REC") indicating a recording state are see-through displayed, as illustrated in FIG. 32 (Step S7).

Subsequently, moving image data, angular velocity data, line-of-sight direction data, and audio data are recorded in the disk 249 (Step S8), and then the flow returns to Step S2, and the aforementioned processing is repeatedly performed.

On the other hand, in Step S5, when determination is made that either the auto mode (A) or the manual mode (M) is set, determination is made whether or not exposure correction is set (Step S9).

Now, when determination is made that exposure correction is set, as illustrated in FIG. 28 for example, exposure correction amount (correction value) set is see-through displayed as the information display 202 (Step S10).

When the processing in Step S10 is complete, or when determination is made that exposure correction is not set in Step S9, the image system 1 determines whether the view mode (V) for see-through displaying the image captured by the image capturing unit 30 is set, or whether the frame mode (F) for displaying only the photographing image frame indicating a photographing range is set (Step S11). This mode setting is performed by operating the F/V switch 72, as described above.

Here, when determination is made that the frame mode (F) is set, subsequently, determination is made whether the image system 1 is set in the auto mode (A) or the manual mode (M) (Step S12). This mode setting is performed by operating the FA/A/M switch 71, as described above.

Now, the auto mode (A), when the focal distance of the photographing optical system 31 is a predetermined value or more, even if the frame mode (F) is set, is a mode for automatically enlarging and see-through displaying the image captured by the image capturing unit 30. The detail of the subject can be readily confirmed without performing troublesome operations even in telescopic photographing by performing such display, and also only the photographing image frame indicating a photographing rage is displayed in an ordinary focal distance (focal distance below the aforementioned predetermined value), thereby allowing the photographer to perform photographing without receiving uncomfortable feeling even in lengthy photographing.

On the other hand, the manual mode (M) is, as described above, for manually setting whether or not the see-through display is performed, and is usually a mode for displaying the photographing image frame alone.

In Step S12, when determination is made that the manual mode (M) is set, the information display 205 of "MANU" is performed, as illustrated in FIG. 31 (Step S13).

Subsequently, determination is made whether or not a predetermined period has elapsed by checking the timer (Step S14).

Figure 50:
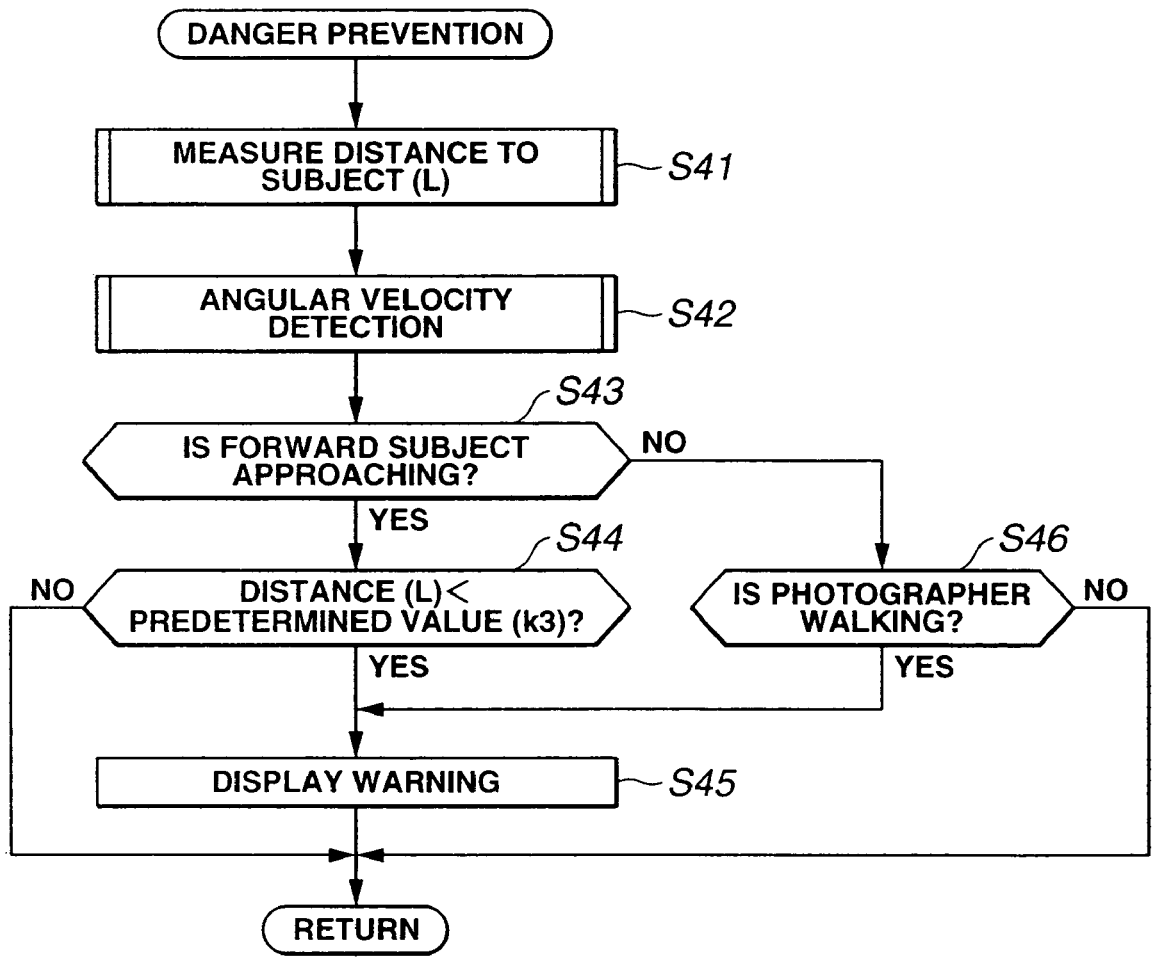
FIG. 50 is a flowchart illustrating the detail of the danger prevention sub routine shown in Step S4 in FIG. 48.

Here, when determination is made that a predetermined period has elapsed, in the danger prevention processing in Step S4, a correction value necessary for correcting parallax which is offset between a range where the photographer is observing and a photographing range due to the image capturing unit 30 based on the distance to the subject obtained in Step S41 described later in FIG. 50, is calculated based on the aforementioned principle (Step S15).

Subsequently, display of the photographing image frame is updated so as to display the photographing image frame at a correct position based on the correction value calculated in Step S15 (Step S16). A photographing range can be correctly displayed even in the case of the subject distance changing by performing such processing. Note that in Step S16, the distance from the HOE 25 to the virtual image of the photographing image frame indicating the photographing range is also adjusted by any of means like those shown in FIGS. 15 through 18.

On the other hand, when the image system 1 is set in the auto mode (A) in Step S12, determination is made next whether or not the focal distance of the photographing optical system 31 is set on the telescopic side greater than a predetermined value α (Step S17).

Here, when determination is made that the focal distance of the photographing optical system 31 is below the predetermined value α, the flow proceeds to the processing in Step S14. On the other hand, when determination is made that the focal distance of the photographing optical system 31 is greater than the predetermined value α, or when determination is made that the view mode (V) is set in Step S11, the electronic image captured by the image capturing unit 30 is see-through displayed by superimposing the image over the subject by the see-through image display unit 6 (Step S18).

When the processing in Step S18 is complete, when the processing in Step S16 is complete, or when determination is made that a predetermined period has not elapsed yet in Step S14, determination is made whether or not the photographer has widened the size of the photographing image frame by operating the wide switch 75b of the image recording/editing device 4 (Step S19).

Here, when determination is made that the photographer has performed an operation for widening the size of the photographing image frame, determination is made whether or not a predetermined period has elapsed by checking the timer (Step S20).

Subsequently, when determination is made that a predetermined period has elapsed, determination is further made whether or not, regardless of the focal distance f of the photographing optical system 31 reaching a focus-adjustable lower limit value k1, the photographer has attempted to operate the focal distance lower than the lower limit value k1 (Step S21).

Here, when determination is made that the photographer has attempted to operate the focal distance lower than the focus-adjustable lower limit value k1, the warning display 208 is performed with see-through display illustrated in FIG. 33 (Step S22). On the other hand, when determination is made that the focal distance f has not reached the focus-adjustable lower limit value k1 yet, the focal distance f is reduced by driving the variator lens 82 of the photographing optical system 31, and the focal distance of the photographing optical system 31 is set so as to be included in the photographing range set by the photographer (Step S23).

On the other hand, when determination is made that the photographer has not performed an operation for widening the size of the photographing image frame in Step S19, determination is further made whether or not the photographer has performed an operation for narrowing the size of the photographing image frame via the telescopic switch 75a of the image recording/editing device 4 (Step S24).

Here, when determination is made that the photographer has performed an operation for narrowing the size of the photographing image frame, determination is further made whether or not a predetermined period has elapsed by checking the timer (Step S25).

Subsequently, when determination is made that a predetermined period has elapsed, determination is further made whether or not, regardless of the focal distance f of the photographing optical system 31 reaching the focus-adjustable upper limit value k2, the photographer has attempted to operate the focal distance greater than the upper limit value k2 (Step S26).

Here, when determination is made that the photographer has attempted to operate the focal distance greater than the focus-adjustable upper limit value k2, the warning display 209 is performed with see-through display as illustrated in FIG. 34 (Step S27). On the other hand, determination is made that the focal distance f has not reached the focus-adjustable upper limit k2 yet, the focal distance f is increased by driving the variator lens 82 of the photographing optical system 31, and the focal distance of the photographing optical system 31 is set so as to be included in the photographing range set by the photographer (Step S28).

When determination is made that the photographer has not performed an operation for narrowing the size of the photographing image frame in Step S24, when determination is made that a predetermined period has not elapsed yet in Step S20 or Step S25, or when the processing in Step S22, S23, S27, or S28 is complete, determination is further made whether or not the photographer has set the recording mode by performing an operation for recording moving images using the recording switch 74 included in the second operating switches 171 of the image recording/editing device 4 (or an operation for recording moving image using the first operating switch 162) (Step S29).

Here, when determination is made that the recording mode is set, as illustrated in FIG. 30, the information display 204 with characters "REC" is performed using see-through display (Step S30), and then recording starts (Step S31).

When this processing in Step S31 is complete, or when determination is made that the recording mode has not set yet in Step S29, determination is further made whether or not the photographer has performed an operation for still image photographing using the release switch 73 included in the second operating switches 171 (or an operation for still image photographing using the first operating switches 162) of the image recording/editing device 4 (Step S32).

Here, when determination is made that the photographer has performed an operation for still image photographing, recording of a still image is performed first (Step S33), and the information display 210 with characters "REL" indicating that the photographer has performed recording of a still image is performed using see-through display as illustrated in FIG. 35 (Step S34).

When this processing in Step S34 is complete, or when determination is made that the photographer has not performed an operation for still image photographing using the release switch 73 in Step S32, the flow returns to Step S2, and the aforementioned operation is repeatedly performed.

FIG. 50 is a flowchart illustrating the detail of the danger prevention subroutine shown in Step S4 in FIG. 48.

As described above, display of a see-through image can be inhibited by operating the switch 39 as necessary, thereby securing the photographer, but instead of this, or in collaboration with this, this danger prevention subroutine is for detecting the photographer's state, and automatically inhibiting see-through display during photographing operation according to the detected state.

Upon this danger prevention processing starting, the distance to the subject is measured first (Step S41). The principle of distance measurement at this time is as follows.

The light flux emitted from the projecting-light LED 16a of the projecting-light emitting unit 16 disposed in the center portion of the frame portion 13 is converted into generally parallel light flux by the condenser lens 16b, and is irradiated onto the subject. This light is reflected by the subject, and enters the image capturing surface of the CCD 87 via the photographing optical system 31.

At this time, let us say that the distance between the condenser lens 16b and the photographing optical system 31 is L, the distance from the principal point of the photographing optical system 31 to the image capturing surface of the CCD 87 is f1, and the distance between the position of image formation of the reflected light from the subject on the image capturing surface of the CCD 87 and the position where the optical axis of the photographing optical system 31 intersects with the image capturing surface is ΔL. In this case, a distance R to the subject can be obtained using the following Expression 13 based on the principle of known triangular distance measurement.

$$R = \frac{L}{\Delta L} \cdot f1 \qquad \text{[Expression 13]}$$

The distance R thus obtained is temporarily stored in the RAM 122 provided within the second CPU 121.

Subsequently, angular velocity around independent two axes is detected by the angular velocity sensors 141 and 142, and is temporarily stored in the RAM 122 (Step S42).

Next, the result of the distance measurement obtained this time is compared with the result of the distance measurement obtained last time, and determination is made whether or not the object in front of the photographer relatively is approaching the photographer (Step S43).

Here, when determination is made that the object ahead is approaching the photographer, determination is further made whether or not the distance L obtained this time to the subject is closer to the photographer than a predetermined distance k3 (Step S44).

Here, when determination is made that the distance L is closer to the photographer than the predetermined distance k3, a predetermined warning mark is see-through displayed by the see-through image display unit 6 (Step S45). Note that here, only the distance to the object ahead is considered, but the movement speed of the object ahead is not considered, so an arrangement may be made wherein the distance to the object ahead is obtained, and further the movement speed (approaching speed) thereof is obtained, and consequently, the predetermined distance k3 is flexibly set according to the movement speed in Step S43. In this case, the faster the approaching speed of the object ahead, the greater the predetermined distance k3 is set. The movement speed of the object ahead can be measured by detecting the distance L at a predetermined interval.

On the other hand, when determination is made that the object ahead is not approaching the photographer, determination is further made whether or not the photographer is walking (or running) based on the angular velocity data (Step S46).

More specifically, feature patterns output from the angular velocity sensors 141 and 142 mounted on the head when a human is walking or running, are stored in the EEPROM 102 beforehand. Subsequently, when the output patterns from the angular velocity sensors 141 and 142 are identical with the feature patterns when the photographer is walking or running, determination is made that the photographer is walking (or running).

In Step S46, when determination is made that the photographer is walking (or running), the flow proceeds to Step S45, and warning display is performed as described above.

Also, when determination is made that the distance L to the object ahead is the predetermined distance k3 or longer in Step S44, or when determination is made that the photographer is not walking (or running) in Step S46, determination is made that there is no danger, so warning display in Step S45 is not performed in this case.

Thus, when the processing in Step S45 is complete, or when determination is made that there is no danger in Step S44 or Step S46, this danger prevention processing ends, and the flow returns to the processing shown in FIG. 48.

Note that with aforementioned description, the warning display has been performed, but instead of this warning display, see-through display by the see-through image display unit 6 may be turned off forcibly (automatically).

Also, with the aforementioned description, the photographer's state has been detected by comparing the patterns of the output values from the angular velocity sensors 141 and 142 with the predetermined feature patterns, but as for simple means, an arrangement may be made wherein when the output values of the angular velocity sensors 141 and 142 are continuously a predetermined value or more for a predetermined period, warning display is performed, or see-through display is inhibited.

Further, with the aforementioned description, as for the photographer's state, a state in which the photographer is walking or running has been taken as an example, but not restricted to this state, any state desirable for preventing the photographer from danger may be handled. For example, determination is made whether or not the photographer is driving an automobile or the like based on the relative speed as to the object ahead, when determination is made that the photographer is driving, predetermined warning or inhibition of see-through display may be performed as well. In this case, in order to determine more precisely whether to prevent the photographer driving from danger, or whether to warn the photographer riding on a train, bus, or the like, detection precision may be improved by using the output values of the angular velocity sensors 141 and 142, or providing other sensors, or the like.

The technique for preventing the danger such as a collision with the object ahead during shooting is not restricted to the image system configured as a head mounted-type camera, may be applied to an image system configured as a head mounted-type display device having a see-through display function, and further, may be applied widely to the other general cameras and display devices.

The image system 1 may be used safely by providing such a danger prevention function. Such a function is particularly effective for the image system 1 according to the present embodiment with which the photographer can easily perform photographing while behaving as usual.

Next, description will be made regarding the principle of line-of-sight-direction detection with reference to FIGS. 41 through 44.

Figure 41:
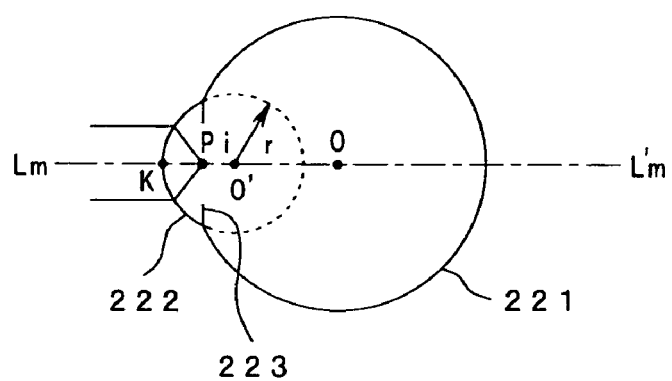
FIG. 41 is a cross-sectional view of the eye along the plane including an optical axis Lm of illumination light flux and a visual axis Lm' in the line-of-sight direction when the optical axis Lm is identical to the visual axis Lm' with the first embodiment.

FIG. 41 is a cross-sectional view of the eye according to the face including the light axis Lm of illumination light flux and the viewing axis Lm' in the line-of-sight direction when the light axis Lm is identical with the viewing axis Lm'. In FIG. 41, a large arc centered on a point O represents the eyeball 221, an arc centered on a point O' represents the cornea 222, and a line segment from an intersection where the arc representing the cornea 222 intersects with the arc representing the eyeball 221 is the iris 223.

Upon parallel light flux of which the optical axis is Lm radiating onto the aforementioned eye, a light spot Pi (hereinafter, referred to as "Purkinje's image") occurs at the position of a generally middle point between the center of curvature O' of the cornea 222 and the apex K of the cornea 222.

In the event that the optical axis Lm of light flux illuminating the cornea 222 is identical with the viewing axis Lm' indicating the line-of-sight direction of the eye, as illustrated in FIG. 41, the center of the pupil forming a circle hole within the iris 223, the Purkinje's image Pi, the center of curvature O' of the cornea 222, and the center of rotation of the eyeball 221 are all on the optical axis Lm. The Purkinje's image Pi occurs at the center position of the pupil. At this time, upon observing the eye from the front, the Purkinje's image Pi, which has a great reflectance, is observed as a bright light image, on the other hand, the pupil and the iris, which have an extremely small reflectance, are observed as dark light images.

Figure 42:
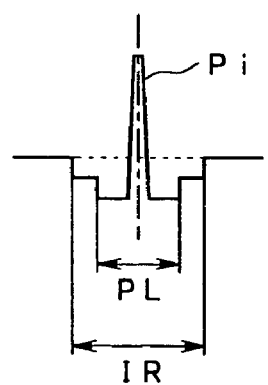
FIG. 42 is a diagram plotting the output signal of the CCD in the vertical axial direction when capturing an image of the eye using a line-of-sight direction/angular velocity detection unit while assuming that the line intersecting perpendicular to the optical axis Lm is the horizontal axis with the first embodiment.

FIG. 42 is a diagram plotting the output signal of the CCD 134 in the vertical axial direction when an image of the eye is captured by the line-of-sight direction/angular velocity detection unit 7, taking the line vertically intersecting with the optical axis Lm as a horizontal axis.

As illustrated in the drawing, an image IR of the iris 223 is darker than the image portion of the eyeball 221 of the perimeter thereof, and an image PL of the pupil is further darker than the image IR of the iris 223. On the other hand, the Purkinje's image Pi is enormously bright. Accordingly, the position of the Purkinje's image from the center of the iris (or pupil) may be obtained by detecting such a bright distribution.

Figure 43:
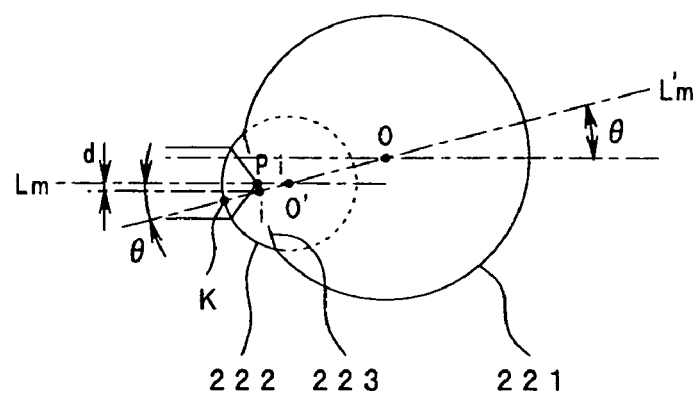
FIG. 43 is a cross-sectional view of the eye along the plane including the optical axis Lm of illumination light flux and the visual axis Lm' in the line-of-sight direction when the optical axis Lm intersects with the visual axis Lm' with the first embodiment.

On the other hand, FIG. 43 is a cross-sectional view of the eye according to the face including the light axis Lm of illumination light flux and the viewing axis Lm' in the line-of-sight direction when the optical axis Lm intersects with the viewing axis Lm'.

Upon the eyeball 221 rotating by an angle θ as to the light axis Lm around the center of rotation O, relative offset occurs between the center position of the pupil and the position of the Purkinje's image Pi. Now, let us say that the distance from the center of curvature O' of the cornea to the center i of the pupil is Lx. In this case, a distance d between the center i of the pupil and the Purkinje's image Pi on the image capturing surface of the CCD 134 as viewed from the direction of the light axis Lm (FIG. 43 is illustrated as if real distances were employed, but more precisely, the distance d is a distance on the image capturing surface) is represented with the following Expression 14.

$$d \simeq \beta_1 \cdot L_x \cdot \sin\theta \quad \text{[Expression 14]}$$

Here, $\beta_1$ represents image formation magnification of the image formation lens 132.

Figure 44:
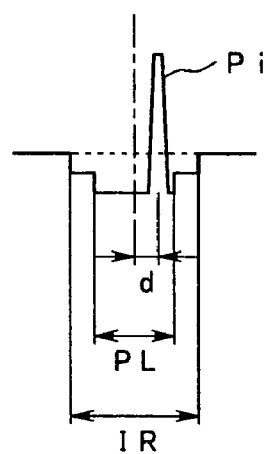
FIG. 44 is a diagram plotting the output signal of the CCD in the vertical axial direction when capturing an image of the eye using a line-of-sight direction/angular velocity detection unit while assuming that the line intersecting with the optical axis Lm and the visual axis Lm' and also perpendicular to the optical axis Lm is the horizontal axis with the first embodiment.

FIG. 44 is a diagram plotting the output signal of the CCD 134 in the vertical axial direction when an image of the eye is captured by the line-of-sight direction/angular velocity detection unit 7, taking the line intersecting with the light axis Lm and viewing axis Lm' and orthogonal to the light axis Lm as a horizontal axis.

As illustrated in the drawing, the Purkinje's image Pi is detected at a position offset by the distance d as to the center of the iris (or pupil).

Accordingly, the image of the eye is subjected to image formation by the receiving light system of the line-of-sight-direction detection unit, and captured, and then the captured image data is subjected to image processing so as to obtain the distance d between the position of the Purkinje's image Pi and the center position of the iris (or pupil), thereby enabling line-of-sight direction θ to be obtained. Note that the image subjected to image formation on the CCD 134 via the receiving light system as illustrated in FIG. 20 or FIG. 22 becomes a vertically horizontally unsymmetrical distorted image, but such geometrical property is stored in the EEPROM 102 or the like as correction information, the distortion is corrected based on this correction information, following which the angle θ representing the line-of-sight direction is calculated based on Expression 14.

Next, description will be made in detail regarding image processing for obtaining the distance d.

Figure 45:
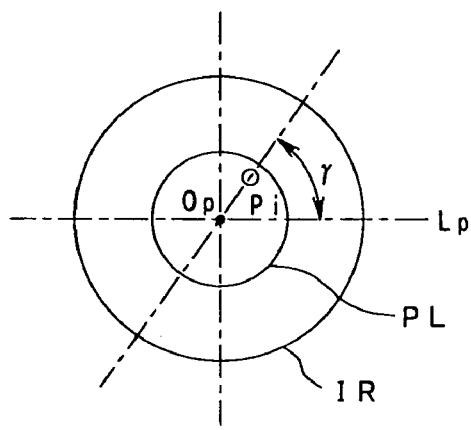
FIG. 45 is a diagram illustrating an image of the eye captured from a two-dimensional image capturing element with the first embodiment.

With the aforementioned principle, description has been made regarding one-dimensional line-of-sight-direction detection, but two-dimensional line-of-sight direction needs to be detected in reality. FIG. 45 is a diagram illustrating an image of the eye to be obtained from a two-dimensional image capturing element. As illustrated in FIG. 45, let us say that the center of the pupil is Op, the Purkinje's image is Pi, a predetermined center line passing through the center of the pupil Op is Lp, and an angle between the center line Lp and a line connecting the center of the pupil Op with the Purkinje's image Pi is γ. In this case, the distance between the center of the pupil Op and the Purkinje's image Pi corresponds to the distance d in Expression 14. Accordingly, the line-of-sight direction (inclined angle) θ of which the reference is the projecting direction (hereinafter, referred to as "reference viewing axis") of infrared light as to the observer's eye can be obtained based on this distance d. Also, the γ represents the rotational direction of the eyeball. Thus, if the position of the center of the pupil Op and the position of the Purkinje's image Pi in a two-dimensional image subjected to image formation on the CCD 134 can be detected, the two-dimensional line-of-sight direction represented with the θ and γ can be obtained as well.

Figure 51:
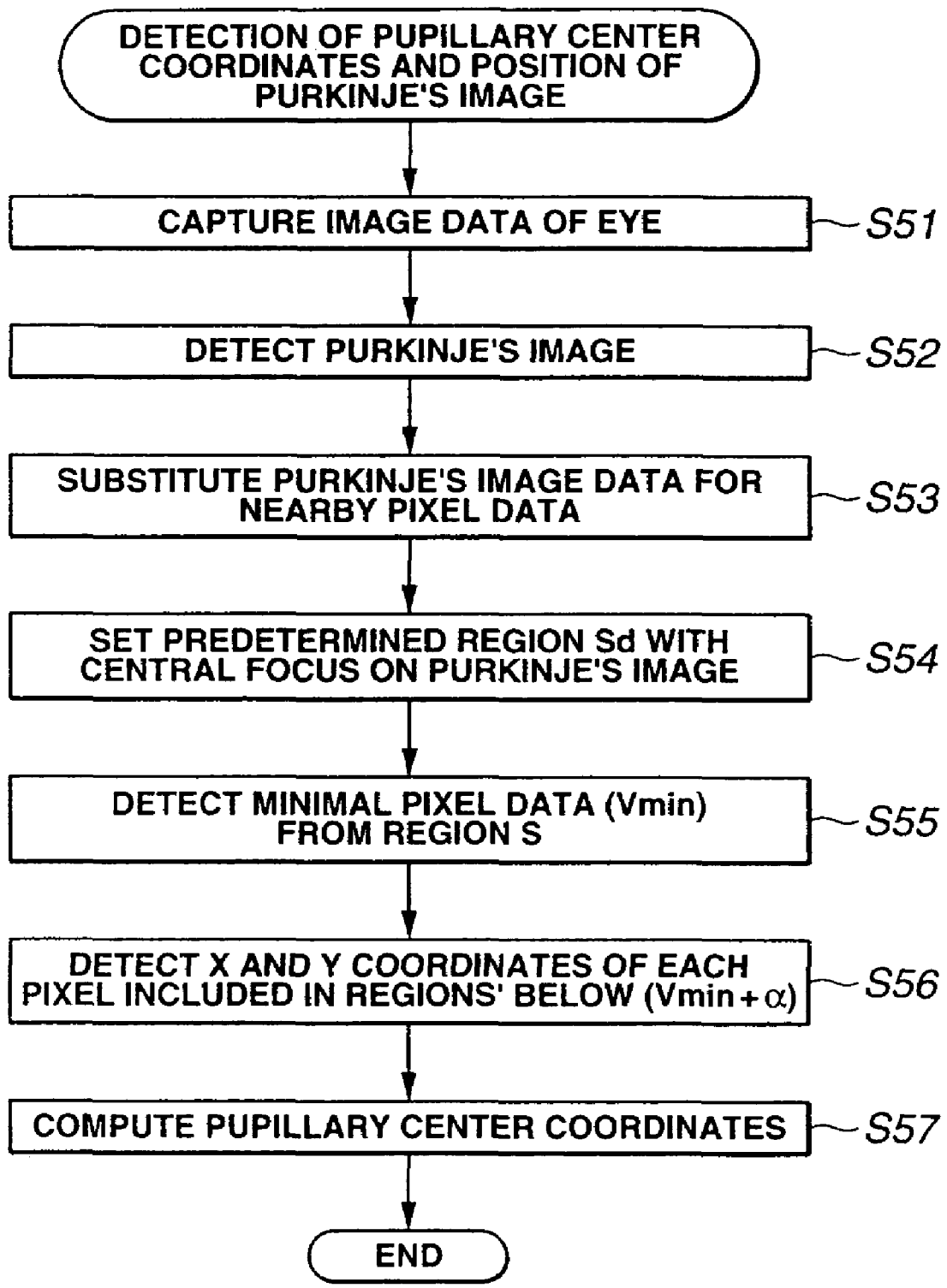
FIG. 51 is a flowchart illustrating processing for obtaining the position of the pupillary center and the position of a Purkinje's image with the first embodiment.

FIG. 51 is a flowchart illustrating processing for obtaining the position of the center of the pupil Op and the position of the Purkinje's image Pi.

Upon this processing starting, the image data of the observer's eye obtained through photoelectric conversion by the CCD 134 of the line-of-sight direction/angular velocity detection unit 7 is stored in the RAM or the like provided within the first CPU 161 of the image recording/editing device 4 (Step S51). Subsequently, the first CPU 161 performs the following processing based on this image data.

Note that an arrangement may be made wherein image data of the CCD 134 is captured prior to projecting infrared light to the observer's eye to remove noise components due to external light, following which the image data of the CCD 134 at the time of projecting infrared light to the observer's eye is captured, image data of which S/N ratio is improved is generated by subtracting the former image data from the latter image data, and then the following processing is performed based on this image data.

Also, with the aforementioned description, the image data obtained from the CCD 134 has been transferred to the first CPU 161 within the image recording/editing device 4, however for example, an arrangement may be made wherein buffer memory or the like is provided at the subsequent stage of the A/D converter 137 in the line-of-sight direction/angular velocity detection unit 7, the image data is stored in this buffer memory, and then, for example, the second CPU 121 performs the following processing. According to such an arrangement, the image data according to line-of-sight detection can be immediately processed without transferring the image data to the image recording/editing device 4, thereby detecting a line-of-sight direction in a short period, resulting in improving capability for following up change in the line-of-sight direction.

Figure 46:
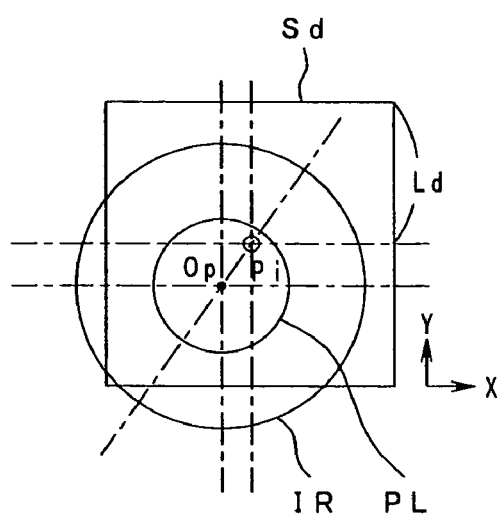
FIG. 46 is a diagram illustrating a certain region to be set on an image of the eye centered on a Purkinje's image with the first embodiment.

Next, a Purkinje's image is detected from the captured image data, and the position of the Purkinje's image (for example, the X coordinates and Y coordinates like those illustrated in FIG. 46. The example illustrated in FIG. 46 takes the direction of the center line Lp as the X axis, and the direction orthogonal to the center line Lp as the Y axis respectively) is obtained (Step S52). As described above, a Purkinje's image is extremely brighter than other image portions, so a predetermined threshold THPi is set for example, and processing for determining a brighter region than this threshold THPi as a Purkinje' image may be employed. It is needless to say that processing for determining a Purkinje's image is not restricted to this, so other image processings may be employed. Also, as for the position of a Purkinje's image, the center of gravity of a region brighter than the threshold THPi may be employed, or the peak position of output data may be employed.

Subsequently, the pixel data of the pixel determined as a Purkinje's image is substituted with the pixel data in the case in which the Purkinje's image does not occur based on the pixel data of a pixel near the Purkinje's image (Step S53). More specifically, the value of pixel data is tracked in the two-dimensional direction centered on the obtained position of the Purkinje's image to detect the inflection point of pixel data. Subsequently, an image within a closed borderline created by connecting the detected inflection points is taken as a Purkinje's image, and the value of the image data of this Purkinje's image is substituted with nearby image data outside of the borderline. At this time, in the event that there is level tilt between a plurality of adjacent pixel data according to the Purkinje's image, the image data to be substituted for the Purkinje's image should be connected to the nearby image data with smooth level change by correcting the level tilt through linear interpolation or the like.

Further, as illustrated in FIG. 46, a predetermined region Sd centered on the Purkinje's image Pi is set (Step S54). FIG. 46 is a diagram illustrating a predetermined region to be set in an image of the eye centered on the Purkinje's image. Note that with the example illustrated in FIG. 46, the predetermined region Sd is a square of which one side is in parallel with the X coordinates, and the other side is in parallel with the Y coordinates, but not restricted to this, a circular region may be employed for example. Note that the size of the predetermined region Sd is set so as to include the entire pupillary image even in the case in which the Purkinje's image Pi moves in the maximum from the pupillary center Op. When the region Sd is a square like that illustrated in FIG. 46 for example, this setting is performed by specifying the length Ld of a half of one side as illustrated in the drawing. Also, when the region Sd is a circle, the setting is performed by specifying the radius thereof.

Subsequently, the minimal value Vmin within pixel data included in the region Sd forming a square is detected (Step S55).

Next, a value Vmin+α obtained by adding a predetermined value α to the minimal value Vmin is set. However, this value Vmin+α is set within a range lower value than the level of pixel data of the iris region. Subsequently, the X coordinates and Y coordinates of pixels having pixel data lower than this value Vmin+α are detected (Step S56). Note that the region made of a group of the pixels thus detected is referred to as a region S1.

The position of a gravity point of the region S' obtained in Step S56 is obtained, and is taken as the position of the pupillary center (Step S57). More specifically, the average of the X coordinates and the average of the Y coordinates are obtained regarding all pixels included in the region S', and the obtained coordinates are taken as the position of the pupillary center.

Note that with the aforementioned description, the gravity point of the pixel corresponding to the pupil has been employed to obtain the position of the pupillary center, but not restricted to this, the middle point between the maximum position and the minimum position of the X coordinates and the middle point between the maximum position and the minimum position of the Y coordinates of the pixel region corresponding to the pupil may be obtained as the pupillary center. The pupil has a generally circular shape, so the image when the eyeball rotates becomes an elliptical shape. Accordingly, such processing can be performed.

The X coordinates and Y coordinates of the Purkinje's image, and the X coordinates and Y coordinates of the pupillary center can be obtained by performing the aforementioned processing.

Note that the pixels in the aforementioned processing description may be real pixels formed on the image capturing surface of the CCD 134, or may be a virtual pixel taking adjacent multiple pixels as one pixel set. For example, in the case of taking multiple pixels as one pixel set, reduction of processing time is an advantage thereof.

Now, we can say that the size of each organ within the eye differs depending on age, sex, or race, and further depending on an individual. Also, the relative positional relation between the line-of-sight-direction detection unit and the eye subtly changes depending on individual difference at the time of manufacturing the line-of-sight-direction detection unit (individual difference for every equipment), a method for mounting the head mounted unit 2, and the like. Accordingly, the line-of-sight direction obtained by uniform parameters based on Expression 14 cannot be applied to all the photographers accurately.

For that reason, with the image system 1 according to the present embodiment, calibration according to detection of the line-of-sight direction can be performed as necessary. Thus, optimization for every user can be performed.

Figure 52:
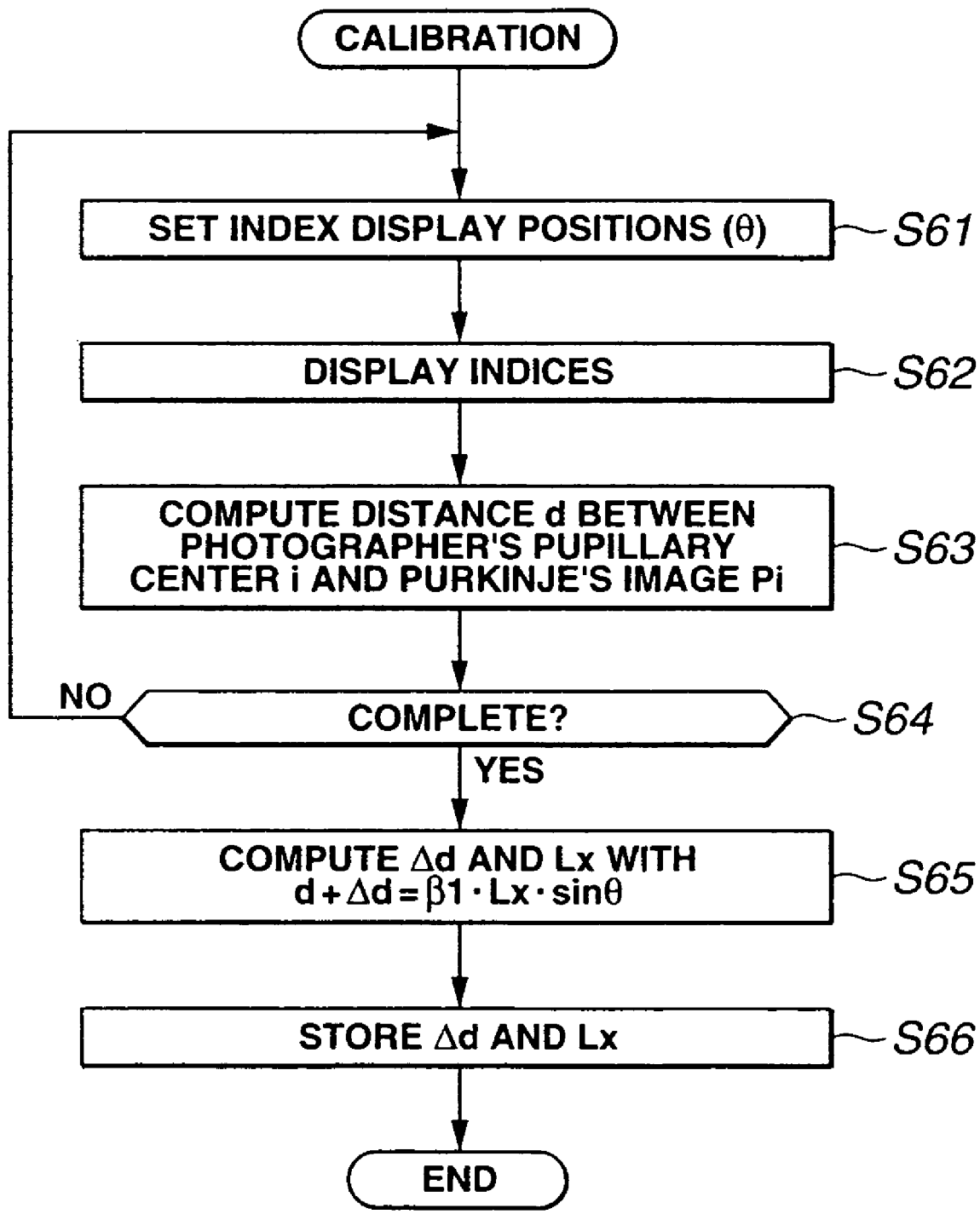
FIG. 52 is a flowchart illustrating calibration processing according to detection of line-of-sight direction with the first embodiment.

FIG. 52 is a flowchart illustrating calibration processing according to detection of the line-of-sight direction.

For example, upon the observer selecting the calibration mode by operating the menu button 63, menu selection switches 66, 67, 68, and 69, determinant switch 65, or the like of the first operating switches 162, this calibration processing starts.

Upon the processing starting, first, the observer sets any guide post to be displayed of the calibration guide posts P1 through P5 like those illustrated in FIG. 36 (Step S61).

Next, the guide post set in Step S61 is see-through displayed with blinking, for example (Step S62). This display can be observable by the eye on the side different from the eye on the side where the line-of-sight direction/angular velocity detection unit 7 including the line-of-sight-direction detection unit is disposed, as described above.

For example, the guide post P1 is blinked first, and the observer is prompted to gaze at this guide post P1. The observer gazes at the guide post P1, and then performs a predetermined key operation. When the system detects this key input operation, the system captures image data using the CCD 134, and calculates the distance d between the pupillary center i and the Purkinje's image Pi based on Expression 14 (Step S63). At this time, let us say that the value of the distance d obtained by the observer gazing at the guide post P1 is d1.

Subsequently, determination is made whether or not the processing in Step S61 through Step S63 is complete regarding all of the guide posts P1 through P5 (Step S64).

Here, when the processing regarding all of the guide posts P1 through P5 is not complete, the flow returns to Step S61, and the aforementioned processing is performed regarding the next guide post, and consequently, distances d1 through d5 corresponding to all of the guide posts P1 through P5 are calculated.

Here, Expression 14 is an expression to be held in an ideal case alone, so the aforementioned various types of a margin of error need to be considered in reality. Accordingly, Expression 14 is modified so as to include correction information Δd as Expression 15.

$$d + \Delta d \cong \beta_1 \cdot L_x \cdot \sin \theta \quad \text{[Expression 15]}$$

In Expression 15, an angle θ is a value to be set due to the display positions of the guide posts P1 through P5 (angles θ1 through θ5 correspond to the guide posts P1 through P5 respectively). Also, the distance d is a value to be detected by the line-of-sight-direction detection unit in reality (the aforementioned distances d1 through d5). Further, Lx is a value different for every individual.

Five expressions (linear expressions) including the Δd and Lx as an unknown quantity are obtained by substituting the known angles θ1 through θ5, the distances d1 through d5 obtained in Step S63, and the image formation magnification P1 of the image formation lens 132 as described above in this Expression 15. Two linear expressions including these unknown quantities should be enrolled into simultaneous equations to obtain the two unknown quantities Δd and Lx, and consequently, solutions of 5C2=10 (sets) are obtained as possible sets of solutions. The Δd and Lx, which are most reliable parameters as individual parameters, are obtained by subjecting these sets of solutions to a predetermined statistic computation (Step S65).

Subsequently, the Δd and Lx thus obtained are stored in the EEPROM 102 (Step S66), and this calibration processing ends.

Note that the line-of-sight direction θ is obtained by substituting the Δd and Lx obtained by the aforementioned calibration, and the distance d between the pupillary center i and the Purkinje's image Pi detected in reality for Expression 15 at the time of detecting the real line-of-sight direction.

The line-of-sight direction data thus obtained can be utilized in real time at the time of photographing, and also can be utilized at the time of later-described image editing following photographing. Accordingly, when recording moving image data, the obtained line-of-sight direction is recorded, correlated with the detected time information along with moving image data, as described later.

As for example wherein line-of-sight direction data is utilized in real time when photographing, automatically adjusting the focus of the photographing optical system 31 of the image capturing unit 30 over the subject in the line-of-sight direction can be given. In this case, focus detection should be performed regarding a predetermined range centered on a portion of the subject image to be subjected to image formation on the CCD 87 corresponding to the line-of-sight direction. At this time, parallax is preferably considered, as described with reference to FIG. 40.

Next, description will be made regarding the file configuration of the disk 249 serving as a recording medium.

FIGS. 53A through 53D are diagrams illustrating the logical configuration of the disk 249.

The physical sectors configured in the disk 249 are arrayed in ascending order by sector addresses, and can be classified broadly into a read-in region LI, a volume region VS next to this read-in region VI, and a read-out region LO next to this volume region VS based on identification information included in a sector address, as illustrated in FIG. 53A.

The read-in region LI is a region in which operation stability data or the like at the time of starting readout of a disk playback device is recorded.

On the other hand, the read-out region LO is a region used for notifying the playback device that the playback is completed, so meaningful data other than this is not recorded.

Also, the volume region VS is a region storing digital data making up an application, and a physical sector to which the volume region VS is belonged is managed as a logical sector. This logical sector is identified in increments of physical sector number by adding a serial number to the consecutive physical sectors with the physical sector of the head of the data recording region serving as a physical sector number 0. FIG. 53B illustrates a logical sector group (LS #0 through LS #n) made up of (n+1) sectors formed within the volume region VS.

The volume region VS is further divided into a volume management region VFS and a file region FDS, as illustrated in FIG. 53C.

The volume management region VFS is a region storing file system management information for managing multiple logical blocks as files. The file system management information means information clearly indicating a correlation between each file name of multiple files, and a logical block group address each file occupies. The disk playback device realizes disk access in increments of file by using this file system management information as a clue. More specifically, upon a file name being given, all of the logical block groups occupied by the file having the given file name are calculated with reference to all of the system management information, these logical block groups are accessed so as to read out the desired digital data (i.e., the digital data included in the file having the given file name) alone.

FIG. 53D illustrates the configuration of the file region FDS. As illustrated in FIG. 53D, the file region FDS is a region for storing video manager VMG, and multiple video title sets VTS (k video title sets VTS in the example in the drawing). This file region FDS comprises multiple consecutive files, and the recorded positions thereof are calculated based on the aforementioned file system management information.

The video title sets VTS store one or more applications called as titles by grouping them, thereby facilitating management of shared image data effectively.

The video manager VMG is a region for storing information regarding a menu for the user selecting a title from all of the titles stored in the multiple video title sets VTS.

FIGS. 54A through 54E are diagrams illustrating the file configuration of the video title sets VTS.

The video title set VTS illustrated in FIG. 54A, as illustrated in FIG. 54B in more detail, comprise video title set information VTSI, a video object set for VTS menu VTSM_VOBS serving as presentation data, and multiple video objects VOB (VOB #1 through VOB #m).

The video title set management information VTSI is recorded as navigation data for managing the reproduced sequence of the multiple video objects VOB.

The video object set for VTS menu VTSM_VOBS is recorded as presentation data of the menu corresponding to each title.

The multiple video objects VOB (VOB #1 through VOB #m) make up a video object set for VTS title VTSTT_VOBS. Each video object VOB (VOB #1 through VOB #m) is configured so as to include at least one moving image data, and further so as to include audio data, secondary image data, and angular velocity data (or information representing inclination of the head) and line-of-sight direction data of the head digitized as biological information as necessary. Note that a generic name representing moving image data, audio data, and secondary image data will be referred to as "video data", hereinafter.

The video objects VOB are multimedia data including the video data, biological information, and management information of these.

Each of the video objects VOB comprises one or more cells C #1 through C #q, as illustrated in FIG. 54C.

Each cell C making up the video object VOB, further as illustrated in FIG. 54D, comprises one or more video object units VOBU #1 through VOBU #r. This video object unit VOBU is playback data of 0.5 through 1.0 second or so.

Each video object unit VOBU comprises a plurality of group of picture (GOP) serving as the refresh cycle of video encodes, and audio and secondary images equivalent to the GOP.

More specifically, each video object unit VOBU, as illustrated in FIG. 54E, is configured of multiple types of pack data including a navigation pack NV on the head thereof, and further moving image packs V1 and V2, audio packs A1 and A2, and secondary image packs S1 and S2.

The aforementioned pack data is configured as a predetermined data size respectively, and digital data string making up moving image data, audio data, and secondary image data can be restored by collecting and integrating each type of pack data respectively again.

FIGS. 55A through 55E are diagrams illustrating the configuration of the video title set management information VTSI.

The video title set management information VTSI is recorded on the head of the video title VTS, as illustrated in FIG. 54B.

The video title set management information VTSI illustrated in FIG. 55A principally comprises a VTSI management table VTSI_MAT, VTS program chain VTSPGC, and information management table VTS_PGCIT, as illustrated in FIG. 55B.

Series of stream data such as "original video" serving as original image data prior to editing, "edited video data" serving as image data following editing, "angular velocity data" and "line-of-sight direction data" serving as biological information, which is data for editing, and the like is reproduced with reference to the video title set management information VTSI when playback.

The VTSI management table VTSI_MAT is a table in which the internal structure of the video title set VTS, the storage location of the video title set VTS, and the like are recorded.

The VTSPGC information management table VTS_PGCIT is a table in which k (k represents a natural number of 255 or less) sets of PGC information (VTS_PGCI #1 through VTS_PGCI #k) (moving image playback program chain information) representing a program chain (PGC) for controlling the playback sequence of moving image data is recorded, as illustrated in FIG. 55C.

Each entry of the program chain (PGC) information VTS_PGCI is information in which a plurality of cell playback information C_PBI (C_PBI #1 through #n) describing the playback sequence of each cell is recorded. For example, information for controlling the playback sequence of video data prior to editing can be recorded in the program chain VTS_PGCI #1, and information for controlling the playback sequence of the video data following editing can be recorded in the program chain VTS_PGCI #2.

That is to say, each of the PGC information (VTS_PGCI #1 through VTS_PGCI #k) includes program chain general information (PGC_GI) as illustrated in FIG. 55D, and further comprises a program chain command table (PGC_CMDT), program chain program map (PGC_PGMAP), cell playback information table (C_PBIT), and cell positional information table (C_POSIT).

The program chain general information PGC_GI records program chain content (PGC_CNT), program chain playback time (PGC_PB_TM), program chain navigation control information (PGC_NV_CTL), and the like in more detail.

Now, the program chain content PGC_CNT represents the number of programs and the number of cells (255 at the maximum) included in the program chain. For example, in the event of a program chain having no video object VOB, the number of programs is zero.

Also, the program chain playback time PGC_PB_TM represents the total playback time of programs within the program chain as a time code (hour, minute, second, and the number of video frames). This program chain playback time PGC_PB_TM further records a flag (tc_flag) representing a type of video frame, and a frame ratio (25 frames per second or 30 frames per second) and the like are specified according to the content of this flag.

Further, the program chain navigation control information PGC_NV_CTL comprises Next_PGCN representing the program chain number to be reproduced following the current program chain number, Previous_PGCN representing the program chain number (PGCN) to be quoted by a navigation command, GoUp_PGCN representing the program chain number to be returned from the program chain, "PG playback mode" representing the program playback mode such as sequential playback, random playback, shuffle playback, or the like, and "Still time value" representing still time following playback of the program chain.

Each entry of PGC information C_PBI #j comprises cell playback processing information, and cell information table.

Here, the cell playback processing information comprises a playback period, and processing information necessary for playback of a cell such as the number of repeated times, and the like.

That is to say, as illustrated in FIG. 55E, each of the PGC information C_PBI #j comprises a cell block mode CBM, cell block type CBT, seamless playback flag SPF, interleaved block allocation flag IAF, STC resetting flag STCDF, cell playback time C_PBTM, seamless angle change flag SACF, cell head VOBU start address C_FVOBU_SA, and cell end VOBU start address C_LVOBU_SA.

The cell block mode CBM represents whether or not multiple cells make up one functional block. The cell playback information of each cell making up a functional block is consecutively disposed within the PGC information, a value representing the "head cell of a block" is recorded in the CBM of the cell playback information to be disposed in the head thereof, a value representing the "end cell of a block" is recorded in the CBM of the cell playback information to be disposed in the end thereof, and a value representing the "cell within a block" is recorded in the CBM of the cell playback information to be disposed between both respectively. The cell block type CBT represents the type of a block indicated in the cell block mode CBM.

The seamless playback flag SPF is a flag for playing back multi-media data such as image, audio, secondary image, or the like without suspending each data and information. In other words, the seamless playback flag SPF is a flag representing whether or not the cell is seamlessly connected to the cell or cell block to be previously played back, and is played back. In the event that the cell to be played back is seamlessly connected to the last cell or last cell block, and is played back, a flag value 1 is set to the SPF of the cell playback information of the cell. On the other hand, that cell to be played back is not seamlessly connected to the last cell or last cell block, and is played back, a flag value 0 is set to the SPF of the cell playback information of the cell.

The interleaved block allocation flag IAF is a flag representing whether or not the cell is disposed in an interleaved region. This interleaved block allocation flag IAF is set to a flag value 1 in the event that the cell is disposed in the interleaved region, otherwise the flag is set to a flag value 0.

The STC resetting flag STCDF is information representing whether or not the STC unit 248 (see FIG. 11) used for synchronization needs to be reset at the time of playback the cell. This STC resetting flag STCDF is set to a flag value 1 in the event that resetting is necessary, otherwise this flag is set to a flag value 0.

The cell playback time C_PBTM represents the playback period of the cell using a time code.

The cell head VOBU start address C_FVOBU_SA literally represents the cell head VOBU start address using the number of sectors indicating the distance from the logical sector of the head cell of the video object set for VTS title VTSTT_VOBS.

The cell end VOBU start address C_LVOBU_SA literally represents the cell end VOBU start address using the number of sectors indicating the distance from the logical sector of the head cell of the video object set for VTS title VTSTT_VOBS.

Figure 56:
FIG. 56 is a diagram illustrating the data structure of a moving image pack according to the first embodiment.

FIG. 56 is a diagram illustrating the data structure of a moving image pack.

As illustrated in FIG. 56, the moving image pack (V) has a data structure including a pack header PKH, packet header PTH, and video data field, which are stipulated by MPEG (Moving Picture Coding Experts Group), and the data size of one pack is 2 Kbytes.

The pack header PKH includes MPEG-compliant data such as a pack start code, system clock reference SCR, and multiplex ratio.

The packet header PTH includes MPEG-compliant data such as a stream ID, packet length, PTS (Presentation Time Stamp), DTS (Decoding Time Stamp), and the like.

A code indicating that an elementary stream made up of this pack is a moving image stream is set in the stream ID within the packet header PTH. The system clock reference SCR and PTS of the moving image pack are used for adjusting synchronization with the decoding processing of an audio pack, and for adjusting synchronization with the decoding processing of a secondary image pack. More specifically, the video decoder on the disk playback device side performs matching of the reference clock based on the system clock reference SCR, decodes the moving image data within a data field, and waits until the time recorded in the PTS matches time due to the reference clock. When the time recorded in the PTS matches time due to the reference clock, the video decoder outputs the decoded results to the display side. The video decoder can dissolve a synchronous error with secondary image output, and a synchronous error with audio output by waiting output based on the recorded content of the PTS.

Figure 57:
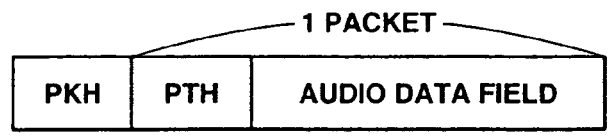
FIG. 57 is a diagram illustrating the data structure of an audio pack according to the first embodiment.

FIG. 57 is a diagram illustrating the data structure of an audio pack.

The data structure of these audio packs A1 through A3 is basically the same data structure as that of the moving image pack. The difference point between both is in that the stream ID within the packet header PTH is set to a value indicating an audio pack, and in that a sub-stream ID is provided in the head 8-bit of the data field.

Figure 58:
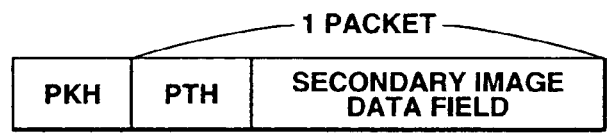
FIG. 58 is a diagram illustrating the data structure of a secondary moving image pack according to the first embodiment.

FIG. 58 is a diagram illustrating the data structure of a secondary image pack.

The data structure of this secondary image pack is basically the same data structure as that of the audio pack.

Figure 59:
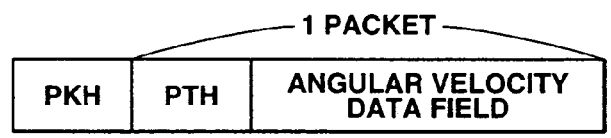
FIG. 59 is a diagram illustrating the data structure of an angular velocity pack according to the first embodiment.

FIG. 59 is a diagram illustrating the data structure of an angular velocity pack.

The data structure of the angular velocity pack (V) illustrated in FIG. 59 is basically the same data structure as that of the moving image pack. However, the data of this angular velocity pack is used only as data for editing moving image data, so a non-committal value should be set to the MPEG-compliant data such as the PTS (Presentation Time Stamp), and DTS (Decoding Time Stamp).

Figure 60:
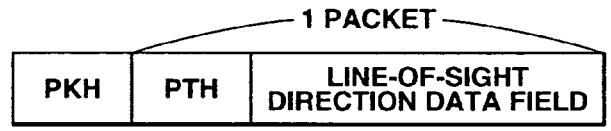
FIG. 60 is a diagram illustrating the data structure of a line-of-sight direction pack according to the first embodiment.

FIG. 60 is a diagram illustrating the data structure of a line-of-sight direction pack (V).

The data structure of the line-of-sight direction pack illustrated in FIG. 60 is basically the same data structure as that of the angular velocity pack.

Figure 61B:
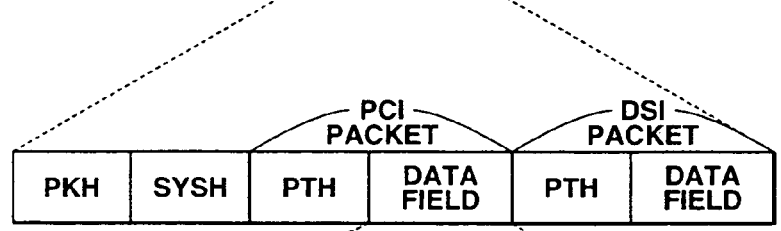
Figure 61C:

FIGS. 61A through 61C are diagrams illustrating the configuration of a navigation pack NV.

As illustrated in FIG. 54E, one navigation pack NV illustrated in FIG. 61A is always included in the head of the video object unit VOBU, and stores effective management information while playback of the video object unit VOBU is being performed. While the moving image pack, audio pack, secondary image pack, angular velocity pack serving as a biological information pack, and line-of-sight direction pack serving as a biological information pack are formed as one packet respectively as illustrated above, this navigation pack NV is made up of two packets, which is a difference point between both. Of the two packets making up the navigation pack NV, one is referred to as a PCI (Personal Control Information) packet, and the other is referred to as a DSI (Data Search Information) packet. In other words, the data structure of the navigation pack NV is different from those of the moving image pack, audio pack, and the like, comprises a pack header PKH, a system header SYSH, the packet header PTH of the PCI packet header, the data field of the PCI packet, the packet header PTH of the DSI packet, and the data field of the DSI packet, as illustrated in FIG. 61B.

The system header SYSH stores a transfer rate necessary for the entire video object unit VOBU having this navigation pack NV on the head thereof, a moving image stream, an audio stream, a transfer rate necessary for every secondary image stream, and buffer size management information, in conformity with MPEG.

Also, an identification code indicating that this pack is the navigation pack is set to the stream IDs of the two packet headers of the navigation pack NV.

The DSI packet comprises information including jump information such as fast-forward playback, fast-rewind playback, and the like.

As illustrated in FIG. 61C, the PCI packet comprises PCI general information such as playback start time of VOBU_S_PTM and playback end time VOBU_E_PTM of the attending video object unit VOBU, cell elapse time C_ELTM, and the like, highlight information serving as control information for menu items in a menu for accepting the instructions from the user, and the like.

The playback start time VOBU_S_PTM of the video object unit VOBU represents the playback start time of the video object unit VOBU including PCI information as a time stamp.

The playback end time VOBU_E_PTM of the video object unit VOBU represents the playback end time of the video object unit VOBU including PCI information as a time stamp.

The cell elapse time C_ELTM represents the relative playback time from the first video frame of the cell to the first video frame of the video object unit VOBU as a time code (hour, minute, second, and frame in the BCD format).

An identification code indicating that this is a private stream is set to the stream ID of the packet header of the navigation pack NV.

Note that as described above, information relating to the playback time of the disk 249 applied to this image recording/editing device 4 includes PGC_PB_TM representing the total playback time of the programs within the program chain PGC as a time code, the cell playback time (C_PBTM) representing the playback time of the cell as a time code, the playback start time VOBU_S_PTM and playback end time VOBU_E_PTM of the video object unit VOBU represented as a time stamp, and the cell elapse time C_ELTM represented as a time code.

Next, description will be made regarding data recording operation to the disk 249.

First, upon the first CPU 161 receiving a recording command through the first operating switch 162, the first CPU 161 reads in management data via the disk drive unit 4d, and determines a writable region on the disk 249.

Next, the first CPU 161 sets management data in the management region so as to write data in the determined writable region, sets a data-write-start address such as moving image, audio, angular velocity, line-of-sight direction, and so forth in the disk drive unit 4d, and performs preparation for recording the data.

Subsequently, the first CPU 161 controls the STC unit 248 to reset time. The STC unit 248 serves as a system timer, and the first CPU 161 performs recording and playback based on a value measured by the STC unit 248.

The first CPU 161 further performs other various types of settings.

When the observer performs image capturing using the head mounted unit 2, and the modem of the transmission/reception unit 172 of the head mounted unit 2 transmits a moving image, the image recording/editing device 4 receives the moving image using the transmission/reception circuit 163 of the communication unit 4a. Subsequently, the transmission/reception circuit 163 extracts one slot data from the received data at certain timing, extracts a synchronous signal from this one slot data, and generates a frame synchronous signal. Further, the transmission/reception circuit 163 releases scrambling or the like, and then separates the received data into moving image data, audio data, line-of-sight direction data, and angular velocity data again.

Of each separated data, the communication control circuit 151 outputs the moving image data to the image compression circuit 153 via the DSP circuit 152, the audio data to the audio compression circuit 154, the angular velocity data to the angular velocity compression circuit 155, and the line-of-sight direction data to the line-of-sight direction compression circuit 156 respectively.

The communication control circuit 151 converts the signals compressed by the corresponding compression circuits into a packet in increments of 2 Kbytes, and outputs the packet to the formatter 158. The formatter 158 determines the PTS (Presentation Time Stamp) and DTS (Decoding Time Stamp) of each packet in accordance with the value of the STC unit 248 as necessary.

In addition, the formatter 158 temporarily stores the packet data in the buffer memory 159, following which converts each input packet data into a pack, adds the navigation pack NV on the head of each group of picture GOP, and outputs this to the recording/playback data processor 231.

The recording/playback data processor 231 groups the input packs into a group made up of the certain number of packs, and outputs the grouped packs to the disk drive unit 4d. However, in the event that the disk drive unit 4d is not ready to record the grouped packs in the disk 249, the disk drive unit 4d temporarily transfers the data to be recorded to the recording/playback buffer memory 232, and waits until preparation for recording the data is complete. When the disk drive unit 4d is ready to record the data in the disk 249, the disk drive unit 4d starts recording by reading out the data from the recording/playback buffer memory 232.

Figure 62:
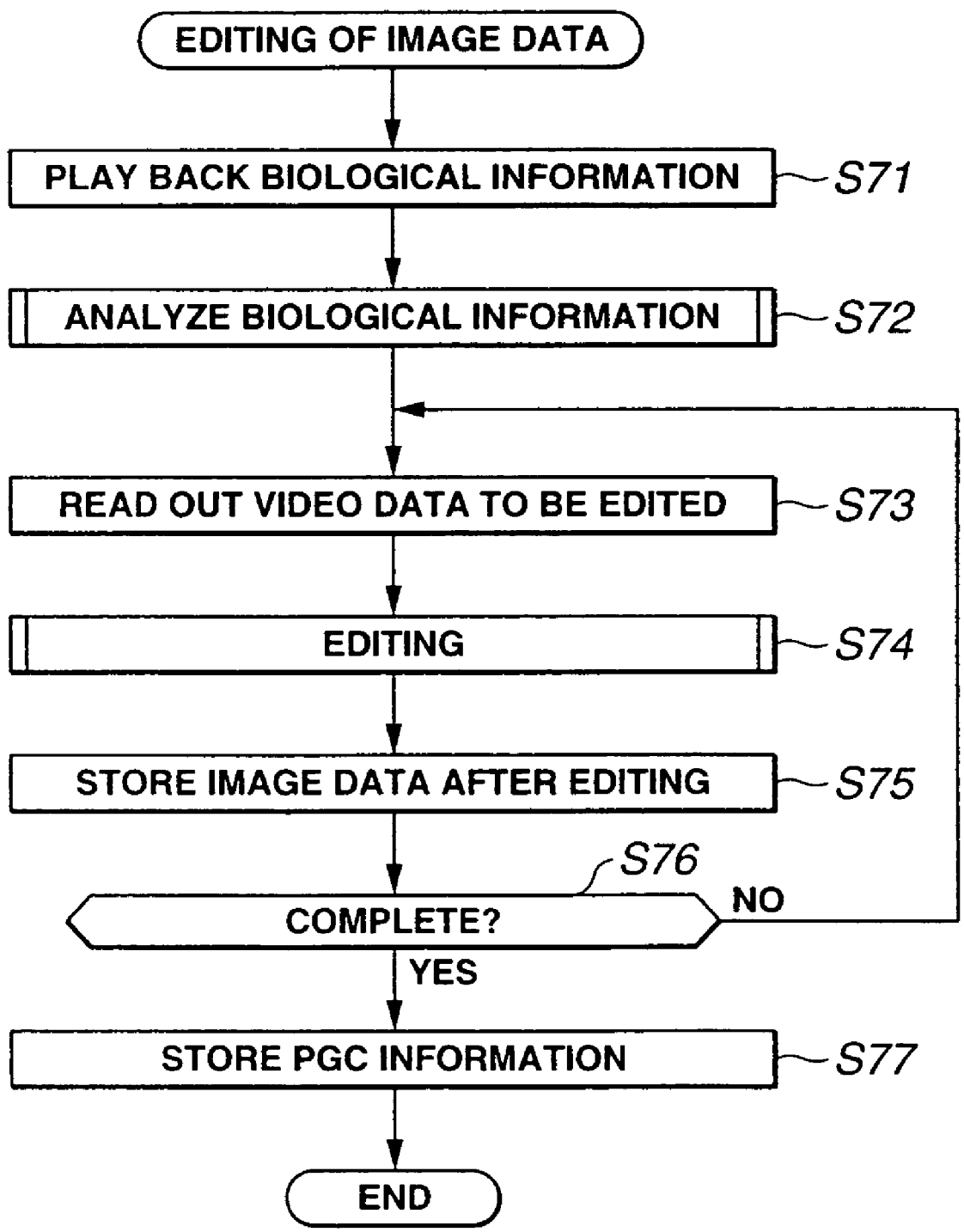
FIG. 62 is a flowchart illustrating editing processing of video data according to the first embodiment.

FIG. 62 is a flowchart illustrating editing of video data.

For example, upon the observer selecting the editing mode by operating the menu button 63, menu selection switches 66, 67, 68, and 69, determinant switch 65, or the like (see FIG. 8) of the first operating switches 162, this editing starts.

Upon the first CPU 161 receiving an editing command, the first CPU 161 reads in the data in the management region relating to biological information (angular velocity data or line-of-sight direction data) via the disk drive unit 4d and the recording/playback data processor 231, and determines an address to be played back (Step S71).

Next, the first CPU 161 transfers the address of the data to be played back determined in Step S71 and a read command to the disk drive unit 4d.

In response to this, the disk drive unit 4d reads out the sector data from the disk 249 based on the received address and read command, and stores the angular velocity data and line-of-sight direction data subjected to error corrections by the recording/playback data processor 231 in the biological information buffer memory 244.

The angular velocity data and line-of-sight direction data thus stored in the biological information buffer memory 244 is analyzed under control of the first CPU 161 (Step S72). Note that hereinafter, the analysis of the angular velocity data and line-of-sight direction data is referred to as "analysis of biological information".

Figure 64:
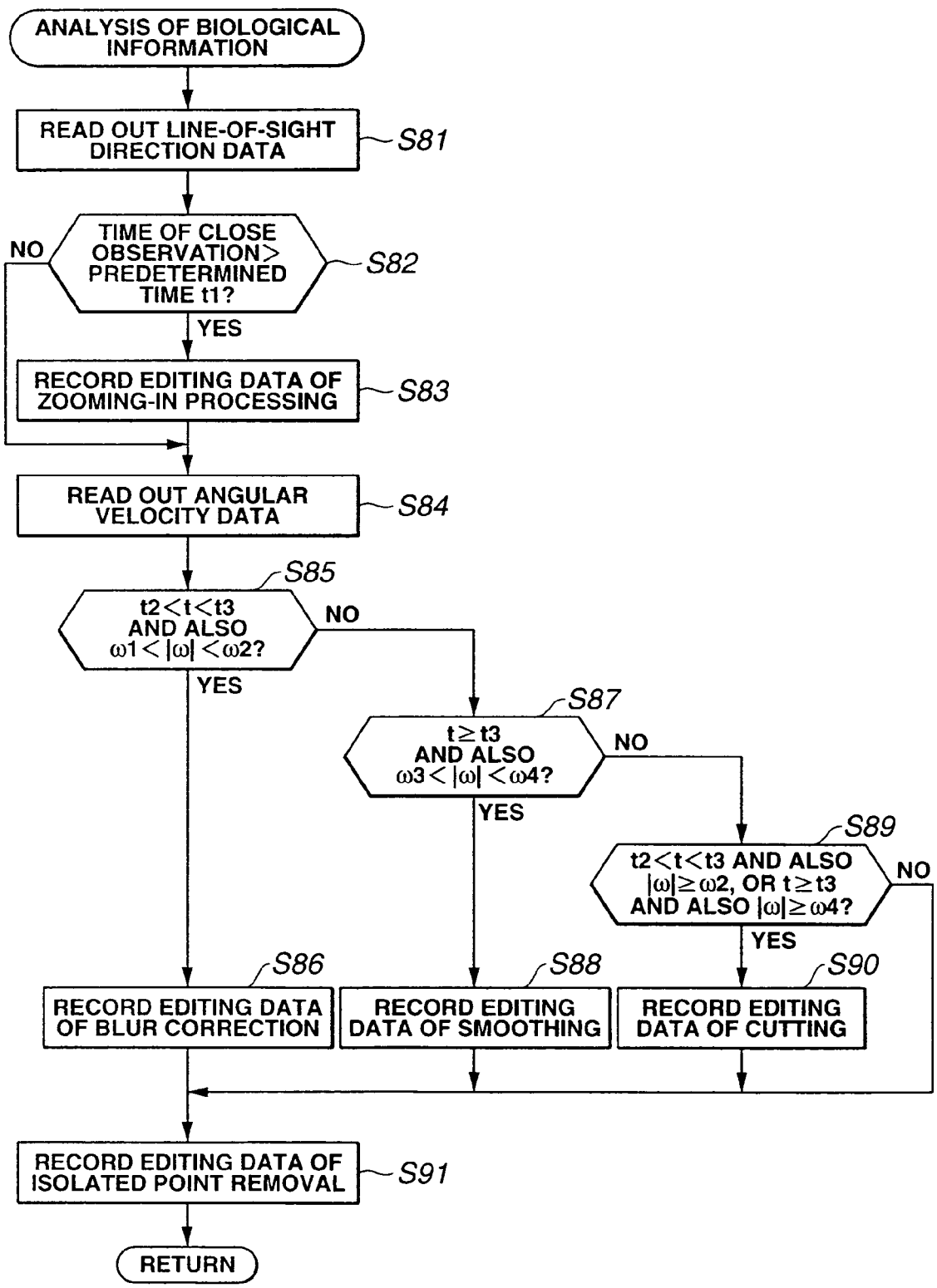
FIG. 64 is a flowchart illustrating analyzing processing of biological information according to the first embodiment.

Description will be made regarding this analysis of biological information with reference to FIG. 64. FIG. 64 is a flowchart illustrating the analytic processing of biological information.

Upon the first CPU 161 starting this analytic processing of biological information, the first CPU 161 reads out the line-of-sight direction data corresponding to certain video data (Step S81).

Subsequently, the first CPU 161 determines whether or not a gazing period is equal to or longer than a predetermined period t1 based on the readout line-of-sight direction data (Step S82). Here, with regard to determination of whether or not the observer is gazing, in the event that change in the size of vector representing the line-of-sight direction is within a certain amount, determination is made that the observer is gazing in the constant direction.

Here, when determination is made that the gazing period exceeds a certain period, the first CPU 161 records editing data for subjecting the video data within this time zone to zooming-in processing (Step S83).

FIG. 63 is a diagram illustrating the recording format of the editing data.

With this editing data, a serial number No is recorded on the head thereof, following which editing start time EDT_STM, editing end time EDT_ETM, and editing content data EDT_DAT are recorded in this order.

The serial number No is a number to be added serially for every time zone requiring editing.

The editing start time EDT_STM represents the relative time elapse from the beginning of video data photographing to the photographing of the first video data within an editing zone.

Note that the editing start time EDT_STM for editing can be obtained as follows. As described above, the PGC_PB_TM (equal to the PGC_PB_TM relating to video data) represented with a time code exists as the total playback period of programs within the program chain PGC relating to biological information. If we assume that the amount of data of the biological information recorded in the biological information buffer memory 244 is in proportional to the time elapse from the beginning of recording, the editing start time EDT_STM, which is the relative time elapse from the beginning of recording video data to the editing start position, can be obtained by proportionally distributing the PGC_PB_TM based on the relation between the entire amount of data of the biological information (angular velocity data or line-of-sight direction data) and the amount of data from the data initial position corresponding to the detection start time of the biological information to the editing start position.

Further, the editing end time EDT_ETM represents the relative time elapse from the beginning of video data photographing to the photographing of the last video data within an editing zone. This editing end time EDT_ETM is obtained in the same way as the editing start time EDT_STM.

The editing content data EDT_DAT is data representing the content of editing such as zooming-in, cutting, smoothing, and the like. Step S83 is zooming-in processing, so data unique for zooming-in processing is recorded as the editing content data EDT_DAT.

Now description will be returned to FIG. 64 again. When recording of editing data in the zooming-in processing is complete in Step S83, or when determination is made that the gazing time is equal to or shorter than the predetermined time t1 in Step S82, the first CPU 161 reads out the angular velocity data in the yew direction and in the pitch direction (Step S84).

Figure 68:
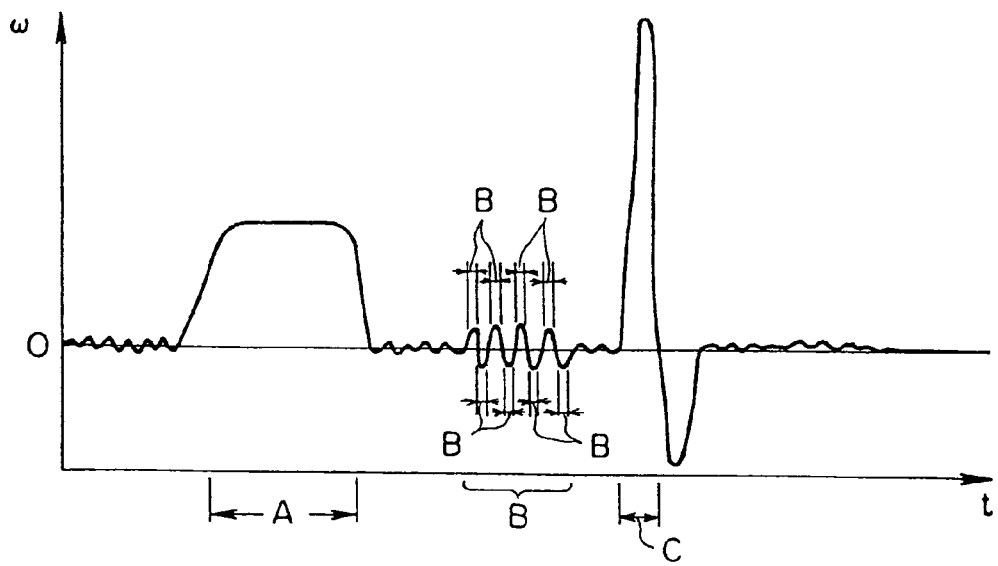
FIG. 68 is a line diagram illustrating the time changing of angular velocity according to the first embodiment.
Figure 69:
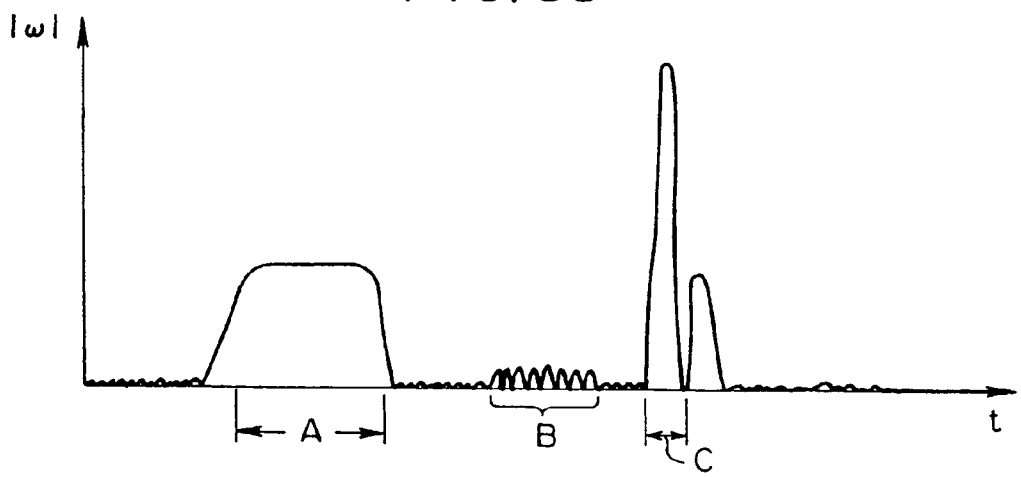
FIG. 69 is a line diagram illustrating the time changing of an angular velocity absolute value according to the first embodiment.
Figure 70:
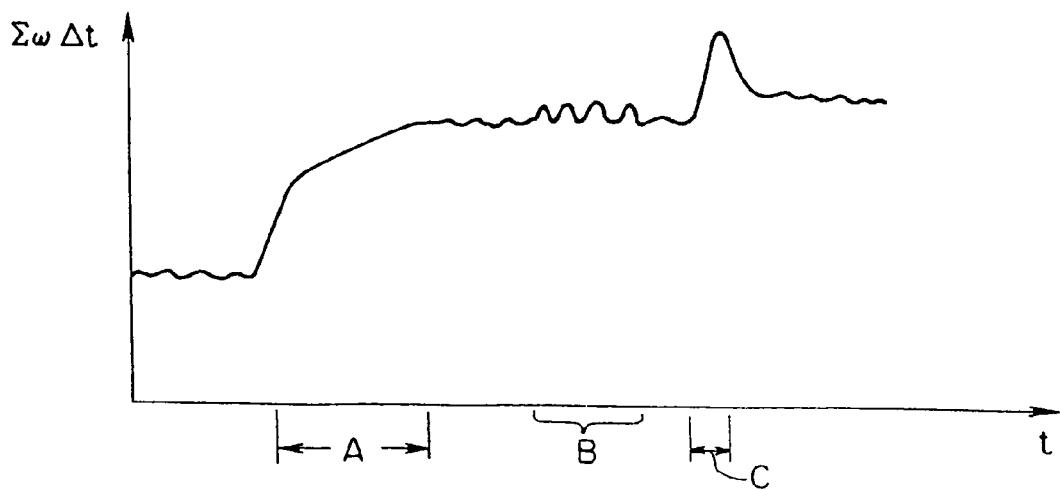
FIG. 70 is a line diagram illustrating the time-changing-integral-value of angular velocity according to the first embodiment.

Subsequently, predetermined editing can be executed based on the readout angular velocity data, but prior to description proceeding along the flowchart in FIG. 64, description will be made regarding the basic concept of this editing with reference to FIGS. 68 through 70. FIG. 68 is a line diagram illustrating the time changing of angular velocity, FIG. 69 is a line diagram illustrating the time changing of an angular velocity absolute value, and FIG. 70 is a line diagram illustrating the time-changing-integral-value of angular velocity. Note that FIGS. 68 through 70 are illustrated so that the time plotted in the horizontal axis indicates the same time at the same position. Also, time integration ($\Sigma\omega\Delta t$) of angular velocity illustrated in FIG. 70 corresponds to amplitude.

The basic concept of editing is as follows. First, change of angular velocity $\omega$ equal to or shorter than the extremely short period t2 is ignored as noise. Next, the predetermined period t3 (the t3 is longer than the t2) is taken as a threshold, and when duration t is below this t3, determination is made that change of angular velocity $\omega$ is a short cycle vibration (i.e., blurring), and when duration t is equal to or longer than the t3, determination is made that change of angular velocity $\omega$ is not blurring but change in the direction. When determination is made that change is blurring, blurring correction is preferably performed if possible, otherwise the cutting processing is performed. Similarly, when determination is made that change is not blurring but change in the direction, the smoothing processing (editing for correcting rapid change of an image so as to be smooth change, which is elongation of a recording period) is preferably performed if possible, otherwise the cutting processing is performed.

Description will be made more specifically regarding three cases of zones A, B, and C as illustrated in FIGS. 68 through 70 based on such a concept.

As illustrated in FIG. 69, with the zone A, duration t is equal to or longer than the predetermined t3, so determination is made that this change is not blurring but change in the direction, and also the angular velocity absolute value $|\omega|$ is small enough to perform the smoothing processing, and consequently, the editing data subjected to the smoothing processing is recorded.

With the zone B, duration t is shorter than the predetermined t3, so determination is made that this change is blurring, and also the angular velocity absolute value $|\omega|$ is small enough to perform the blurring correction, and consequently, the editing data subjected to the blurring correction is recorded.

With the zone C, duration t is shorter than the predetermined t3, so determination is made that this change is blurring, and also the angular velocity absolute value $|\omega|$ is too large to perform the blurring correction, and consequently, the editing data subjected to cutting processing of the image in this zone is recorded.

Each editing data EDIT_DAT for the smoothing processing, cutting processing, and blurring correction is basically the same as the editing data of the zooming-in processing, but corresponds to each editing processing.

Though not illustrated in the drawing, even in the event that duration t is equal to or longer than the predetermined t3, so determination is made that this change is not blurring but change in the direction, but the angular velocity absolute value $|\omega|$ is too large to perform the smoothing processing, the editing data subjected to cutting of the image in this zone is recorded.

Further, with the time zone prior the zone A and the time zone between the zone A and the zone B and the like, the angular velocity absolute value $|\omega|$ is too small for the blurring correction, and also is too small for the smoothing processing, and consequently, these zones do not need particular editing processing.

Figure 71:
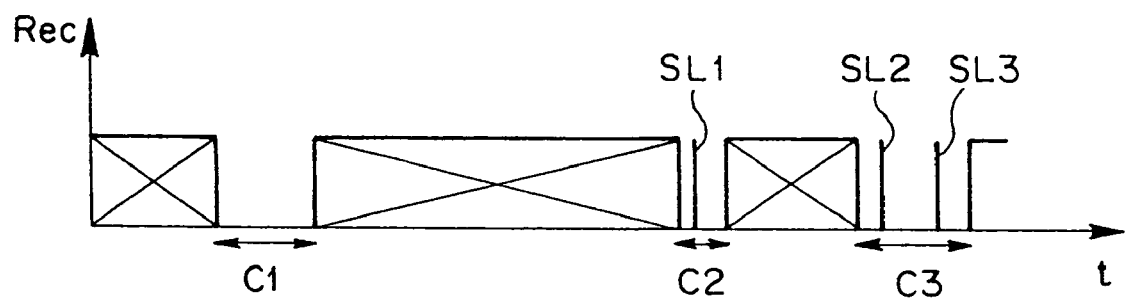
FIG. 71 is a diagram illustrating the scene wherein isolated images remain following cutting with the first embodiment.

Note that when the cutting processing is performed based on the aforementioned concept, for example, isolated images like those illustrated in FIG. 71 may be remained. FIG. 71 is a diagram illustrating a state in which isolated images are remained following the cutting processing, and also representing whether or not an image exists along the time axis with binary. With the example illustrated in FIG. 71, three zones C1, C2, and C3 are subjected to cutting, but an image SL1 in the zone C2, and images SL2 and SL3 in the zone C3 are remained as isolated images respectively. With regard to such an image, the editing data subjected to cutting processing of such an image is recorded, as described later.

Description will be returned to FIG. 64 again, and description will be made regarding the processing following Step S85 based on the aforementioned basic concept.

Of angular velocities in the two axial directions, determination is made whether or not the duration t of change in at least one angular velocity $\omega$ satisfies t2<t<t3, and when these conditions are satisfied, determination is further made whether or not the angular velocity absolute value $|\omega|$ satisfies $\omega 1 < |\omega| < \omega 2$ ($\omega 1$ represents the lower limit value of the angular velocity requiring blurring correction, and $\omega 2$ represents the upper limit value of the angular velocity making it possible to perform blurring correction) (Step S85).

Here, when determination is made that the conditions in Step S85 are satisfied, the editing data subjected to blurring correction due to known image processing is recorded (Step S86). The recording format at this time is the same as that described in Step S83.

On the other hand, when determination is made that the conditions in Step S85 are not satisfied, determination is made whether or not the duration t of change in at least one angular velocity w satisfies t2≧t3, and when this condition is satisfied, determination is further made whether or not the angular velocity absolute value $|\omega|$ satisfies $\omega 3 < |\omega| < \omega 4$ ($\omega 3$ represents the lower limit value of the angular velocity requiring smoothing, and $\omega 4$ represents the upper limit value of the angular velocity making it possible to perform smoothing) (Step S87).

Here, when determination is made that the conditions in Step S87 are satisfied, the editing data subjected to smoothing processing like that described above is recorded (Step S88). The recording format at this time is the same as that described in Step S83.

On the other hand, when determination is made that the conditions in Step S87 are not satisfied, determination is made whether this case corresponds to a case in which the duration t of change in the angular velocity $\omega$ satisfies t2<t<t3, and also the angular velocity absolute value $|\omega|$ satisfies $|\omega| \leq \omega 2$, or a case in which the duration t of change in the angular velocity $\omega$ satisfies t≧t3, and also the angular velocity absolute value $|\omega|$ satisfies $|\omega| \geq \omega 4$ (Step S89).

Here, when determination is made that the conditions in Step S89 are satisfied, the editing data subjected to cutting of the corresponding zone is recorded (Step S90). The recording format at this time is the same as that described in Step S83.

On the other hand, when determination is made that the conditions in Step S89 are not satisfied, the following three cases are conceivable.

The first case is a case in which the duration t is equivalent to blurring (t2<t<t3), but the angular velocity absolute value $|\omega|$ is equal to or smaller than the lower limit value $\omega 1$. In this case, determination is made that this change in the angular velocity is not taken as blurring necessary for correction, and no editing is performed.

The second case is a case in which the duration t is equivalent to not blurring but change in the direction (t≧t3), but the angular velocity absolute value |ω| is equal to or smaller than the lower limit value ω3. In this case, determination is made that this change in the direction is sufficiently moderate, so smoothing is unnecessary, and no editing is performed.

The third case is a case in which the duration t of change in the angular velocity ω is equal to or smaller than t2 (i.e., t2≧t), and equivalent to noise. This noise can be classified into two cases. The first case is a case in which noise exists in an ordinary zone, and the second case is a case in which noise exists a zone subjected to the cutting processing (i.e., a case in which noise is left as isolated points like those illustrated in FIG. 71). The isolated points thus remained are subjected to the processing as described next.

That is to say, when any of the processing in Step S86, Step S88, or Step S90 is complete, or when the conditions in Step S89 are not satisfied, the editing data subjected to cutting of isolated points is recorded (Step S91).

Upon the processing in Step S91 being complete, the flow returns to the processing like that shown in Step S62.

Note that with an analytic example of biological information like that illustrated in FIG. 64, the editing data subjected to zooming-in is recorded based on a gazing period of line-of-sight direction information as biological information, or cutting, smoothing, blurring correction, or the like is performed based on the size and duration in angular velocity information as biological information, but analysis of biological information is not restricted to this example. For example, an arrangement may be made wherein determination is made based on temporal variable patterns of angular velocity data whether or not the photographer is walking, and when determination is made that the photographer is walking, zooming processing is performed closer to the wide-angle side than usual. On the other hand, an arrangement may be made wherein when determination is made that the photographer is walking, part of an image is cropped so as to suppress fluctuations of the image, and the cropped image is zoomed in closer to the telescopic side. Performing such processing reduces fluctuations of the image, thereby allowing a moving image to be played back without giving visually uncomfortable feeling to the photographer.

Following returning to FIG. 62, when the processing in Step S72 is complete, the editing data recorded in Step S72 (see FIG. 63) is sequentially read out. Of the readout editing data, the video data in an editing zone from the disk 249 is read out based on the editing start time EDT_STM and editing end time EDT_ETM (Step S73).

Subsequently, the vide data in a time zone to be edited is subjected to predetermined editing processing (Step S74).

Now, description will be made regarding the flow of such processing.

With the present embodiment, the vide data in a predetermined time zone determined by the editing start time EDT_STM and editing end time EDT_ETM is subjected to image processing such as cutting, smoothing, zooming, or the like. To this end, a time zone for subjecting video data to editing is obtained as follows.

That is to say, first, the first CPU 161 sequentially adds the playback time C_PBTM of the cell (cell No. k) of the program chain, and each time the first CPU 161 obtains the elapse time PB_ELTM (i.e., PB_ELTM (k) corresponding to the cell No. k) from the playback start time, the first CPU 161 compares the obtained elapse time with the editing start time EDT_STM or editing end time EDT_ETM, and obtains the elapse time PB_ELTM (n−1) till the cell (cell No. (n−1)) immediately prior to satisfying PB_ELTM (n)>EDT_STM (or EDT_ETM).

Next, the first CPU 161 obtains the relative elapse time (PB_ELTM (n−1) (m)) from the playback start time till the first video frame of the video object unit VOBU (unit No. is m within the cell) within the cell having the cell No. (n−1) by adding C_ELTM (m) serving as the cell elapse time C_ELTM within the navigation pack of the video object unit VOBU (unit No. m within the cell) within the cell having the cell No. (n−1) to the elapse time PB_ELTM (n−1).

Subsequently, each time the first CPU 161 calculates the elapse time PB_ELTM (n−1) (m), the first CPU 161 compares the elapse time PB_ELTM (n−1) (m) with the editing start time EDT_STM or editing end time EDT_ETM, and obtains the elapse time PB_ELTM (n−1) (m−1) till the first video frame of the video object unit VOBU (unit No. (m−1)) immediately prior to satisfying PB_ELTM (n−1) (m)>EDT_STM (or EDT_ETM). Thus, the video object unit VOBU (unit No. m) belonged to the video data to be subjected to editing processing based on biological information may be determined with precision of an elapse time unit of the video object unit VOBU (around 0.5 second).

Further, in order to determine the precise position within the video object unit VOBU, the frame within the video object unit VOBU may be determined by performing proportional distribution based on the difference between the playback start time VOBU_S_PTM and playback end time VOBU_E_PTM serving as the playback time of the video object unit VOBU, and the difference between the editing start time EDT_STM (or editing end time EDT_ETM) and the elapse time PB_ELTM (n−1) (m−1) serving as the relative elapse time from the beginning of the photographing of video data till the photographing of the first video data in an editing zone.

Similarly, the editing end time EDT_ETM serving as the relative elapse time from the beginning of the photographing of video data till the photographing of the final video data in an editing zone can be obtained.

FIGS. 72A and 72B are diagrams illustrating an example when the editing start time and editing end time straddle over two cells.

FIG. 72A illustrates an example of the editing start time EDT_STM serving as a period from the video data playback start position C#1 till the editing start position (a predetermined position of the cell C#i), and an example of the editing end time EDT_ETM serving as a period from the video data playback start position C#1 till the editing end position in this editing zone (a predetermined position of the cell C#(i+1)).

With the case like that illustrated in FIG. 72A, the editing zone straddles the two cells, but this is an example, so various cases may be considerable in reality.

Next, the first CPU 161 reads out the video data of the entire cell included in the editing zone, and subjects the readout video data in the editing zone to editing processing corresponding to the content of the editing processing such as zooming-in, cutting, smoothing, or the like recorded in the editing content data EDT_DAT like that illustrated in FIG. 63.

Next, the first CPU 161 records the data of the cell subjected to editing processing in the predetermined zone in the cell different from the video data prior to editing. FIGS. 72A and 72B illustrate an example wherein of the video data recorded in the cell C#i and C# (i+1) prior to editing as illustrated in FIG. 72A, the video data within the editing zone is subjected to editing processing, and the cell C#j like that illustrated in FIG. 72B is created and recorded.

This example illustrates the case in which the video data of the two cells prior to editing is recorded in one cell as edited data, but not restricted to this example, the edited cell may be recorded by being divided into the arbitrary number of cells.

Figure 65:
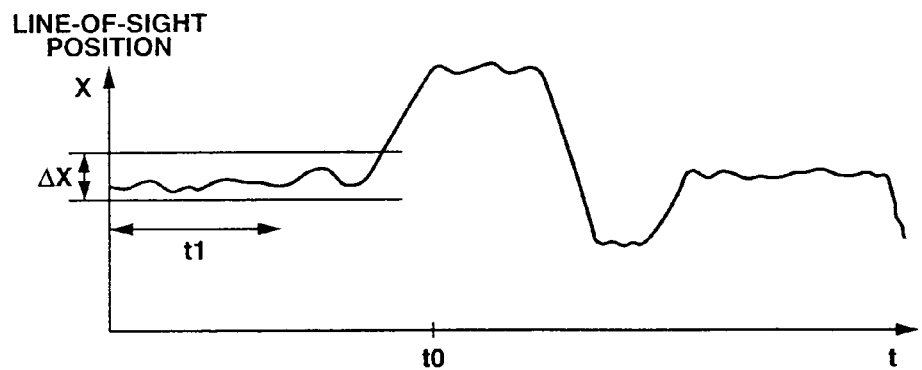
FIG. 65 is a diagram illustrating the time changing of the line-of-sight position in the X direction with the first embodiment.
Figure 66:
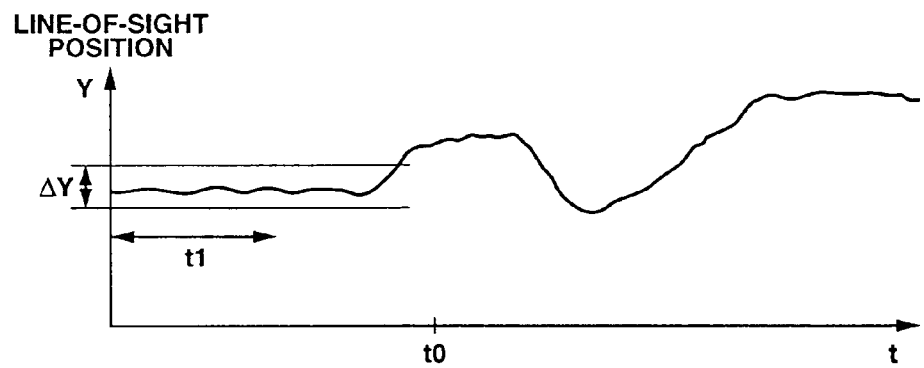
FIG. 66 is a diagram illustrating the time changing of the line-of-sight position in the Y direction with the first embodiment.
Figure 67:
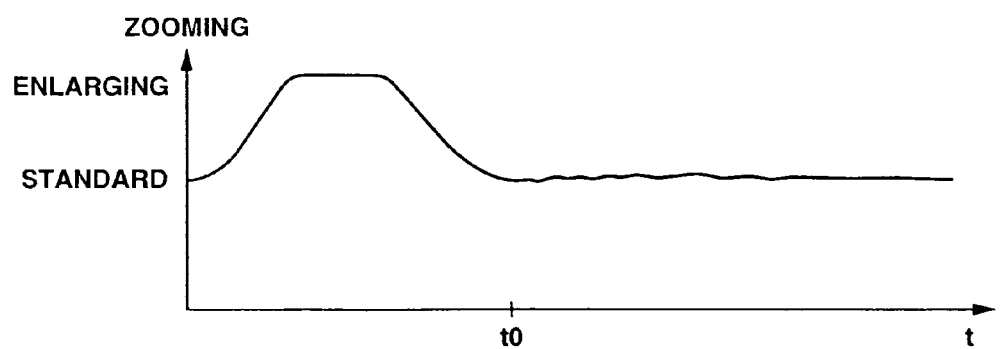
FIG. 67 is a diagram illustrating the time changing of zooming according to the first embodiment.

Now, description will be made regarding the editing processing (zooming-in processing) relating to the zooming-in with reference to FIGS. 65 through 67. FIG. 65 is a diagram illustrating the time changing of the line-of-sight position in the X direction, FIG. 66 is a diagram illustrating the time changing of the line-of-sight position in the Y direction, and FIG. 67 is a diagram illustrating the time changing of zooming. Note that FIGS. 65 through 67 are illustrated so that the time plotted in the horizontal axis indicates the same time at the same position.

In the drawings, let us say that the X and Y axes are two axes describing vector space indicating the line-of-sight direction, which are orthogonal to each other, and $\Delta X$ and $\Delta Y$ represent the amount-of-change of the line-of-sight position as to the X direction and the Y direction respectively.

In this case, when the amount-of-change of the line-of-sight position in the X direction is equal to or smaller than $\Delta X$, also the amount-of-change of the line-of-sight position in the Y direction is equal to or smaller than $\Delta Y$, and also a gazing period is equal to or longer than the predetermined period t1, the image is gradually enlarged toward the gazing point as illustrated in FIG. 67. In other words, enlargement and trimming (modification of the enlarged region) are simultaneously performed so that the gazing point gradually moves to the center of the image. When reaching a certain amount of enlargement, the state thereof is maintained for a while, and then the magnifying power is gradually reduced to the original power (standard field angle) toward the end of the gazing period t0.

For example, the zooming-in processing is performed as follows. First, the editing data EDIT_DAT is read out. In the event that this editing data EDIT_DAT is data recorded in Step S83 in FIG. 64, detection is made that the editing processing is the zooming-in processing. Subsequently, the editing zone of the video data is detected based on the data such as DDT_STM, S_FN, DDT_ETM, E_FN, and the like, and the detected video data in the editing zone is subjected to the zooming-in processing as described above.

Note that in the middle of gazing, the line-of-sight direction is instantaneously moved in another direction, and returned to the original line-of-sight direction again in some cases, but such a behavior of the line-of-sight is taken as noise, and processing is performed so as to exclude this from the factors for considering a gazing period. Such processing can be readily performed using known moving average and noise processing, so description regarding the detailed content thereof will be omitted here.

Examples of the specific methods for performing the smoothing processing include a method for inserting the frame image prior to the insertion position or the frame image following the insertion position between frame images making up a moving image by the number of times corresponding to the smoothing degree. However, with this method, the greater the smoothing degree is (the wider time changing of the image is expanded), the more awkward the movement is. In order to solve this problem, frame images should be created and inserted so as to interpolate the awkward movement based on the frame image data prior to or following the insertion position.

Further, examples of the specific methods for performing the blurring correction include a known technique for detecting the blurring direction and the amount of blurring, and cropping the image data based on the detected blurring direction and the detected amount of blurring.

Now, description will be continued regarding FIG. 62 again.

When the processing in Step S74 is complete, the first CPU 161 stores the video data subjected to editing corresponding to the video data of the entire cell included in the video data in the editing zone, in a cell different from the video data prior to editing (Step S75).

Subsequently, the first CPU 161 performs modification of the program chain. More specifically, according to the program chain information prior to editing, the cell prior to editing is read out as the cell corresponding to the editing zone. Accordingly, a new program chain representing the playback sequence of the video data subjected to editing is created by modifying the program chain so that the cell subjected to editing can be read out as the cell corresponding to the editing zone instead of the cell prior to editing. Thus, the video data subjected to editing can be played back automatically by simply referring to the new program chain.

If the example illustrated in FIGS. 72A and 72B is specifically described, the video data following editing is played back in the sequence of . . . , C# (i−1), C#j, C# (i+2), C# (i+3), . . . .

Thus, only the data of the cell subjected to editing should be recorded as the video data subjected to editing, so duplication with the moving image data prior to editing can be suppressed at the minimum, thereby saving recording capacity. This yields high effects with the moving image data to be recorded requiring large memory capacity.

When the processing in Step S75 is complete, determination is made whether or not all of the editing processing is complete (Step S76).

In Step S76, the flow returns to Step S73, and the aforementioned processing is repeatedly performed until determination is made that all of the editing processing is complete.

On the other hand, in Step S76, when determination is made that all editing processing is complete, the PGC information of the video data subjected to editing processing is recorded (Step S77).

In Step S77, the PGC information (VTS_PGCI#2, for example) representing the program chain (PGC) for controlling the playback sequence of the video data subjected to editing is created in the VTSPGC information management table VTS_PGCIT of the video title set management information VTSI (Video Title Set Information) to play back the video data subjected to editing, and is additionally recorded in the video title set management information VTSI recorded in the disk 249.

The PGC information (VTS_PGCI#2) recording the playback sequence of the video data subjected to editing is PGC information created so as to play back the video data subjected to editing recorded in Step S75 instead of playing back the cell in the time zone subjected to editing of the PGC information (VTS_PGCI#1, for example) recording the playback sequence of the video data prior to editing.

As described above, in the case in which deterioration of image quality is considerable, correction is performed for improving image quality as much as possible, or cutting is performed in the case where it is impossible to perform correction, thereby yielding eye-friendly images with high quality. Further, this editing processing is arranged so as to start automatically, so the user needs no troublesome operations, which is convenient for the user.

Next, description will be made regarding playback of video data.

Data processing at the time of playing back video data is performed as follows.

First, upon the first CPU 161 receiving a playback command, the first CPU 161 reads in data of the management region relating to video data via the recording/playback data processor 231 and the disk drive unit 4*d*, and determines an address to be played back.

Next, the first CPU 161 transfers the previously determined address of data to be played back and a read command to the disk drive unit 4*d*.

In response to this, the disk drive unit 4*d* reads out the sector data from the disk 249 based on the received address and read command, performs error corrections using the recording/playback data processor 231, converts the data into pack data, and then transfers this pack data to the separator 233.

The separator 233 separates the received pack data into moving image data, audio data, and secondary image data, and transfers these depending on the corresponding data type. More specifically, the received data is transferred to moving image decoder (VDEC) 234 in the event of moving image packet data (MPEG-2 data), to the audio decoder (ADEC) 236 in the event of audio packet data, to the secondary image decoder (SDEC) 235 in the event of secondary image packet data, to the angular velocity decoder (AVDEC) 242 in the event of angular velocity packet data, or to the line-of-sight direction decoder (EDEC) 243 in the event of line-of-sight direction packet data respectively. Also, the navigation pack NV is necessary when the first CPU 161 performs processing, so is saved in the RAM serving as internal memory of the first CPU 161, or the like.

When transfer of each packet data starts, the PTS (Presentation Time Stamp) included in the header of each packet data is loaded in the STC unit 248 (i.e., the first CPU 161 sets the PTS within the navigation pack NV in the STC unit 248, or the moving image decoder (VDEC) 234 automatically sets the PTS of the moving image data in the STC unit 248).

Subsequently, each decoder performs playback processing in sync with the value of the PTS within the packet data (while comparing the PTS with the value of the STC unit 248), the image data from the moving image decoder (VDEC) 234 and the secondary image data from the secondary image decoder (SDEC) 235 are synthesized by the moving image processor 237 timely, and the synthesized image data is played back by the monitor television 239 or the display unit 165 as moving images with audio and subtitles.

Note that with the aforementioned description, the angular velocity data and line-of-sight direction data serving as biological information have been recorded in the same recording format as the moving image data. However, the biological information is utilized for editing alone unlike the moving image data, so does not need to be recorded in the same format as the moving image data. However, in the event that the biological information is recorded in another format, it is necessary that the biological information is recorded so that the relative time elapse from the detection time is known. For example, an arrangement may be made wherein a period from the detection start time till the detection end time is recorded in the header of the biological information, and recording is performed so that the recording capacity of the biological information is proportional to the time elapse from the beginning of recording. Performing such recording facilitates recording and reading of the biological information.

Also, with the aforementioned description, an optical disk such as DVD or the like as a recording medium has been employed, but not restricted to this, a recording medium such as semiconductor memory or the like may be employed instead.

Further, with the aforementioned description, the angular velocity of the head, and the line-of-sight direction have been employed as biological information, but not restricted to this, other information may be employed instead as long as the information represents the photographing intention of the photographer.

According to the present embodiment, the biological information relating to the behavior of the photographer himself/herself is recorded beforehand, it is possible to subject the recorded image data to predetermined editing processing based on the recorded biological information in an ex post facto manner, thereby simplifying the configuration of a camera, and also allowing the photographer to perform photographing without dedicating to photographing operation. Accordingly, the photographer can behave naturally in the same way as persons other than the photographer without feeling the load due to photographing.

According to the present embodiment, image editing is performed based on the biological information of the photographer, so image editing according to the photographer's intention can be performed automatically. In the event that the recorded image data is subjected to editing, complex processing such as prediction processing necessary for performing editing in real time during photographing, or the like is unnecessary, thereby performing editing with relative ease.

In addition, according to the present embodiment, an image subjected to editing can be displayed, thereby allowing the photographer to enjoy the image with visual ease.

According to the present embodiment, the moving image data and the biological information are recorded in a separated block (cell), simply reading out the corresponding block data can perform editing in increments of block with ease.

At this time, only the data of the cell subjected to editing should be recorded as the moving image data subjected to editing, so duplication with the moving image data prior to editing can be suppressed at the minimum, thereby saving recording capacity. Also, the program chain information representing playback sequence is recorded, and playback is performed using this program chain information at the time of playback, so simply replacing the position of the cell prior to editing with the position of the cell subjected to editing can perform playback of the moving image data subjected to editing with ease.

Also, according to the present embodiment, the image capturing unit and the line-of-sight direction/angular velocity detection unit can be mounted on the photographer's head, the subject which the photographer is observing can be detected with high precision.

Further, according to the present embodiment, rotation of the photographer's head itself can be detected by angular velocity, so editing such as correction of image blurring due to blurring of the head, cutting, expansion of a recording period, or the like can be performed automatically.

Also, according to the present embodiment, the line-of-sight direction serving as the direction of the photographer's gazing point is detected, so editing such as electronic zooming (zooming-in/zooming-out), trimming, or the like can be performed automatically. At this time, at least one of the movement speed in the line-of-sight direction and the consecutive amount-of-movement in the line-of-sight direction is included as line-of-sight direction information, thereby reflecting the photographer's intent with greater fidelity.

Also, according to the present embodiment, the angle $\theta'$ as viewed from the image capturing unit corresponding to the line-of-sight direction θ detected by the line-of-sight direction/angular velocity detection unit is obtained while considering the parallax between the line-of-sight direction/angular velocity detection unit and the image capturing unit, so the photographing range by the image capturing unit corresponding to the photographer's line-of-sight direction (the photographer's gazing point in the image to be captured) can be grasped accurately even in the event of a subject at a short distance from the photographer, thereby performing editing or the like based on the line-of-sight direction information with precision.

Further, the photographer is apt to use the head-mounted-type display device with which the photographer can perform observation while behaving naturally while walking or driving an automobile or the like. Upon the photographer using the head-mounted-type display device in such a state, the photographer's mind is preoccupied by display such as photographing information and the like displayed by the display means, and has possibilities of collision with the object ahead, and the like, but with the image system according to the present embodiment, such a busy condition is detected, and when detecting such a busy condition, warning is performed, or display is inhibited, thereby preventing such a risk from occurring.

Also, according to the present embodiment, corneal reflected light extremely brighter than other regions is utilized at the time of performing line-of-sight detection, so an approximate position where the pupil exists can be detected with ease. At this time, an LED emitting infrared light is used as an illumination for obtaining corneal reflected light, and accordingly, this never hinders the observer from observing a subject.

Further, according to the present embodiment, a pixel having the minimal value is detected within a predetermined range region including the position of corneal reflected light, the value obtained by adding a predetermined value (a predetermined value greater than the minimal pixel value but smaller than the pixel value of the iris) to this minimal value is taken as a threshold, and a pixel group of which pixel value is smaller than the threshold is determined as a pixel group belonging to the image of the pupil, thereby obtaining the region of the pupil with ease and precision.

Also, according to the present embodiment, the gravity of the region corresponding to the pupil is taken as the pupillary center, so even if some noise is included in the pixel data, the position of the pupillary center may be obtained with precision in a reliable manner.

In addition, the line-of-sight direction can be obtained with ease and precision based on the position of the pupillary center and the position of corneal reflected light thus obtained.

Also, according to the present embodiment, eyesight adjusting lenses are disposed in front of the transparent optical members respectively, so even an observer having different eyesight can observe a subject which the observer directly observes in effect (i.e., observes via the eyesight adjusting lens in this case) with a predetermined image superimposed thereupon.

Further, according to the present embodiment, general eyeglass-type image capturing apparatus having a simple configuration, beautiful design, and natural feeling may be configured.

Also, according to the present embodiment, the eyesight adjusting lenses are configured so as to be detached separately from the transparent optical members with ease, so eyesight adjustment corresponding to the user for every display device may be performed with ease. In addition, at this time, even if the left eye and the right eye have different eyesight, a lens suitable for each eye may be mounted.

In addition, according to the present embodiment, the transparent optical members and the image capturing unit are integrally held on the frame portion, even if an eyesight adjusting lens is replaced, angular adjustment or the like between these transparent optical members and image capturing unit is not necessary in each case, thereby providing a handy head-mounted-type camera with eyesight adjusting lenses.

Also, according to the present embodiment, the head mounted unit and the image recording/editing device are wireless-connected so as to transmit/receive image data and operating signals between both, so the photographer is not disturbed by cables or the like, but rather can use these lightly. Thus, the head-mounted-type camera, which is convenient for carrying and excellent in mobility, may be provided.

Further, according to the present embodiment, an image of the LCD is subjected to primary image formation employing the fluid focus lens with the see-through image display unit, so the image may be displayed at a desired distance as a virtual image. Also, employing the fluid focus lens simplifies configuration of the device, resulting in downsizing and weight saving of the device, and moreover, an actuator or the like is not employed, so there is no need to worry about occurrence of noise during operation. Accordingly, the present invention can be applied to a device, which is mounted on the head for use, with particular advantage.

[Appendage]

According to the embodiment of the present invention described above in detail, the following configurations can be obtained.

1. A head mounted-type camera comprising:
   image capturing means comprising:
     photographing optical system capable of changing the focal distance; and
     an image capturing element for converting an optical subject image subjected to image formation by the photographing optical system into an electrical signal;
   display means for displaying a photographing image frame indicating a photographing range as a virtual image so that the photographing image frame can be superimposed on a subject which the photographer directly observes in effect;
   photographing image frame setting means for setting the viewing angle observed by the photographer, of the photographing image frame to be displayed as a virtual image by the display means;
   focal distance setting means for setting the focal distance of the photographing optical system so as to match the viewing angle of the photographing image frame set by the photographing image frame setting means with the photographing field angle of the image capturing means; and
   reception means for receiving a wireless signal representing operating instructions of a camera by the photographer.

2. A head mounted-type camera according to Appendage 1, further comprising:
   transmission means for transmitting the image signal captured by the image capturing means outside of the head mounted-type camera by wireless communication.

3. A head mounted-type camera comprising:
   image capturing means comprising:
     photographing optical system capable of changing the focal distance; and an image capturing element for converting an optical subject image subjected to image formation by the photographing optical system into an electrical signal;

display means for displaying a photographing image frame indicating a photographing range as a virtual image so that the photographing image frame can be superimposed on a subject which the photographer directly observes in effect;

photographing image frame setting means for setting the viewing angle observed by the photographer, of the photographing image frame to be displayed as a virtual image by the display means;

focal distance setting means for setting the focal distance of the photographing optical system so as to match the viewing angle of the photographing image frame set by the photographing image frame setting means with the photographing field angle of the image capturing means; and transmission means for transmitting the image signal captured by the image capturing means outside of the head mounted-type camera by wireless communication.

4. A display device comprising:
a display element for generating an image;
an optical element for displaying the image generated by the display element as a virtual image so that the image can be superimposed on a subject which the photographer directly observes in effect; and
a fluid focus lens, which is disposed between the display element and the optical element, for adjusting the distance from the optical element to the virtual image by adjusting the focal distance by changing the shape of the lens.

5. A display device according to Appendage 4, further comprising:
viewing angle adjusting means for adjusting the viewing angle so as to obtain the constant viewing angle when the photographer views the virtual image regardless of the distance from the optical element to the virtual image.

6. A display device according to Appendage 4 or Appendage 5, wherein the fluid focus lens adjusts the distance to the virtual image so that the distance from the optical element to the virtual image to be displayed by the optical element agrees with the distance from the optical element to a subject to be observed.

7. A display device according to Appendage 6, further comprising:
distance measurement means for measuring the distance from the optical element to the subject to be observed;
wherein the fluid focus lens adjusts the distance to the virtual image based on the distance to the subject to be observed measured by the distance measurement means.

8. A display device according to Appendage 5, wherein the viewing angle adjusting means adjusts the viewing angle by adjusting the size of an image formed on the display element so as to obtain the constant viewing angle when the photographer views the virtual image.

9. An image capturing apparatus comprising:
display means for displaying a photographing image frame indicating a photographing range as a virtual image so that the photographing image frame can be superimposed on a subject which the photographer directly observes in effect;
distance measurement means for measuring the distance to the subject;
a fluid focus lens capable of adjusting the focal distance by changing the shape of the lens so as to match the distance from the display means to a virtual image to be displayed by the display means with the distance to the subject measured by the distance measurement means;
a photographing optical system for forming the optical image of the subject;
an image capturing element for generating image data by photographing an optical subject image within a photographing range corresponding to the photographing image frame subjected to image formation by the photographing optical system; and
recording means for recording the image data generated by the image capturing element.

10. An image capturing apparatus according to Appendage 9, further comprising:
viewing angle adjusting means for adjusting the viewing angle so as to obtain the constant viewing angle when the photographer views the virtual image regardless of the distance from the display means to the virtual image.

11. An image capturing apparatus according to Appendage 9, wherein the display means is configured so that the photographer can mount the display means on the head for use.

12. An image editing device comprising:
moving-image data readout means for reading out moving image data recorded in divided multiple blocks, and moving image playback program chain information representing the playback sequence of the moving image data from a recording medium;
biological information readout means for reading out biological information recorded at the same time as the moving image data, and information for detecting relative time elapse from the time when the biological information is detected from the recording medium; and
editing processing means for subjecting the moving image data to predetermined editing processing based on the biological information temporally corresponding to the moving image data.

13. An image editing device according to Appendage 12, wherein the editing processing means perform editing processing in increments of a predetermined block, and perform playback of the moving image data subjected to the editing processing based on program chain information recording the playback sequence of a block not subjected to the editing processing and a block subjected to the editing processing, of blocks prior to editing.

14. An image editing device according to Appendage 12, wherein the moving image data is photographed by the camera mounted on the photographer's head.

15. An image editing device according to Appendage 12, wherein the biological information includes angular velocity information according to the angular velocity of the photographer's head.

16. An image editing device according to Appendage 15, wherein the editing processing means perform at least one of cutting, blurring correction, expansion of a recording period, and electronic zooming, of the recorded image data based on the angular velocity information as the editing processing.

17. An image editing device according to Appendage 12, wherein the biological information includes line-of-sight direction information according to the line-of-sight direction of the photographer.

18. An image editing device according to Appendage 17, wherein the editing processing means perform electronic zooming of the recorded image data based on the line-of-sight direction information as the editing processing.

19. An image editing program for controlling a computer to execute:

a moving-image data readout step for reading out moving image data recorded in divided multiple blocks, and moving image playback program chain information representing the playback sequence of the moving image data from a recording medium;

a biological information readout step for reading out biological information recorded at the same time as the moving image data from the recording medium; and an editing processing step for subjecting the moving image data to predetermined editing processing based on the biological information.

20. An image editing program according to Appendage 19, wherein the editing processing step performs editing processing in increments of a cell, and performs playback of the moving image data subjected to the editing processing based on program chain information recording the playback sequence of a cell not subjected to the editing processing and a cell subjected to the editing processing, of cells prior to editing.

21. A recording medium recording an image editing program for controlling a computer to execute:

a moving-image data readout step for reading out moving image data recorded in divided multiple blocks, and moving image playback program chain information representing the playback sequence of the moving image data from a recording medium;

a biological information readout step for reading out biological information recorded at the same time as the moving image data from the recording medium; and an editing processing step for subjecting the moving image data to predetermined editing processing based on the biological information.

22. An image capturing apparatus comprising:

moving-image data recording means for recording moving image data in divided multiple blocks, and also recording moving image playback program chain information representing the playback sequence of the moving image data, and relative time elapse from the time when the moving image data of each block is photographed; and biological information recording means for recording biological information, which is detected at the same time as the moving image data prior to editing, for editing the moving image data, and information for detecting relative time elapse from the time when the biological information is detected.

23. An image capturing apparatus according to Appendage 22, wherein the moving image data is photographed by the camera mounted on the photographer's head.

24. An image capturing apparatus according to Appendage 22, wherein the biological information includes angular velocity information according to the angular velocity of the photographer's head.

25. An image capturing apparatus according to Appendage 24, wherein editing processing performed as to the moving image data based on the angular velocity information includes at least one of cutting, blurring correction, expansion of a recording period, and electronic zooming, of the recorded image data.

26. An image capturing apparatus according to Appendage 22, wherein the biological information includes line-of-sight direction information according to the line-of-sight direction of the photographer.

27. An image capturing apparatus according to Appendage 26, wherein editing processing perform as to the moving image data based on the line-of-sight direction information includes electronic zooming of the recorded image data.

28. An image capturing apparatus according to Appendage 27, wherein the line-of-sight direction information includes at least one of the movement speed in the line-of-sight direction, and the consecutive amount of movement in the line-of-sight direction.

Having described the preferred embodiment of the present invention referring to the accompanying drawings, it should be understood that the present invention is not limited to those precise embodiments and various changes and modifications there of could be made by one skilled in the art without departing from the spirit or scope of the invention as defined in the appended claims.

What is claimed is:

1. A moving image and a biological information recording apparatus comprising:

a moving image data recorder to record moving image data by dividing the moving image data into multiple blocks, and also recording moving image playback program chain information indicating the playback sequence of the moving image data and the first information to get elapsed time from the playback start time; and a biological information recorder to record biological information, which is information detected at the same time as the moving image data prior to editing, for editing the moving image data, and the second information for detecting elapsed time from the start time when the biological information is detected.

2. A moving image and a biological information recording apparatus according to claim 1, wherein the moving image data is data obtained by photographing using a camera mounted on the head of a photographer.

3. A moving image and a biological information recording apparatus according to claim 1, wherein the biological information includes angular velocity information according to the angular velocity of the head of a photographer.

4. A moving image and a biological information recording apparatus according to claim 3, wherein editing performed as to the moving image data based on the angular velocity information includes at least any one of cutting, blur correction, extending of a recording period, and electronic zooming, of the recorded image data.

5. A moving image and a biological information recording apparatus according to claim 1, wherein the biological information includes line-of-sight direction information according to the line-of-sight direction of a photographer.

6. A moving image and a biological information recording apparatus according to claim 5, wherein editing performed as to the moving image data based on the line-of-sight direction information includes the electronic zooming of the recorded image data.

7. A moving image and a biological information recording apparatus according to claim 6, wherein the line-of-sight direction information is information including at least one of movement speed in the line-of-sight direction and the consecutive amount-of-movement in the line-of-sight direction.

8. A moving image and a biological information recording apparatus according to claim 1, wherein the biological information is derived from a photographer using the moving image and biological information recording apparatus.

* * * * *